United States Patent
Kubota et al.

(10) Patent No.: US 6,429,914 B1
(45) Date of Patent: Aug. 6, 2002

(54) POLYMER DISPERSION TYPE LIQUID CRYSTAL DISPLAY PANEL AND ITS MANUFACTURING METHOD

(75) Inventors: Hirofumi Kubota, Osaka; Tsuyoshi Uemura, Kadoma; Kenji Nakao, Osaka; Seiji Nishiyama, Takatsuki, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/355,011

(22) PCT Filed: Dec. 16, 1998

(86) PCT No.: PCT/JP98/05700
§ 371 (c)(1),
(2), (4) Date: Jul. 22, 1999

(87) PCT Pub. No.: WO99/31545
PCT Pub. Date: Jun. 24, 1999

(30) Foreign Application Priority Data

| Dec. 17, 1997 | (JP) | 9-347813 |
| Nov. 24, 1998 | (JP) | 10-333043 |
| Dec. 1, 1998 | (JP) | 10-342098 |

(51) Int. Cl.⁷ ............... G02F 1/1333; G02F 1/1343
(52) U.S. Cl. ............................ 349/86; 349/141
(58) Field of Search ................. 349/141, 86, 88, 349/92

(56) References Cited

U.S. PATENT DOCUMENTS

| 3,600,060 A | 8/1971 | Kettering et al. ............ 350/160 |
| 4,345,249 A | * 8/1982 | Togashi ...................... 349/141 |
| 4,688,900 A | 8/1987 | Doane et al. ................ 350/347 |

(List continued on next page.)

FOREIGN PATENT DOCUMENTS

| EP | 0 568 355 A2 | 11/1993 |
| JP | 63-21907 | 5/1988 |
| JP | 01-198725 | 8/1989 |

(List continued on next page.)

OTHER PUBLICATIONS

S. Shikama et al., Society for Information Display '95, p. 231–234 "High–Luminance LCD Projector Using a–Si TFT– PDLC Light Valves".

M. Oh–e et al., Proceedings of Asia Displayy '95, p. 577–580 "Principles and Characteristics of Electro–Optical Behaviour with In–Plane Switching Mode".

(List continued on next page.)

*Primary Examiner*—Kenneth Parker
(74) *Attorney, Agent, or Firm*—Parkhurst & Wendel, LLP

(57) ABSTRACT

The polymer dispersion type liquid crystal display panel comprises a pair of substrates 10, 11, a polymer dispersion type liquid crystal layer 12 comprising a liquid crystal 18 and a liquid crystalline polymer 17, a driving electrode 7 and an opposite electrode 8. The driving electrode 7 and the opposite electrode 8 are formed on the lower substrate 11, and an electric field is applied approximately in parallel with the above-mentioned lower substrate 11. Under no application of voltage, the above-mentioned liquid crystal 18 and the polymer 17 adjacent to the liquid crystal, which composes an interface, are aligned in approximately the same direction on a plane parallel with the substrates according to an alignment treatment of the substrates, and thereby a transparent state is obtained. Under an application of voltage, the liquid crystal 18 rotates on a plane parallel with the substrates, and the polymer 17 and the liquid crystal 18 are made a disposition state of forming angles on a plane parallel with the substrates, and thereby a scattering state is obtained.

46 Claims, 34 Drawing Sheets

U.S. PATENT DOCUMENTS

| | | | | |
|---|---|---|---|---|
| 4,946,263 | A | * | 8/1990 | Vaz et al. ............... 349/34 |
| 4,994,204 | A | | 2/1991 | Doane et al. ......... 252/299.01 |
| 5,240,636 | A | * | 8/1993 | Doanne et al. ........ 252/299.01 |
| 5,305,126 | A | * | 4/1994 | Kobayashi et al. .......... 349/94 |
| 5,929,953 | A | * | 7/1999 | Hiji et al. ............... 349/86 |
| 6,177,972 | B1 | * | 1/2001 | Held et al. ............... 349/88 |
| 6,266,109 | B1 | * | 7/2001 | Yamaguchi et al. ......... 349/86 |
| 6,278,506 | B1 | * | 8/2001 | Sumiyoshi et al. .......... 349/96 |

FOREIGN PATENT DOCUMENTS

| | | |
|---|---|---|
| JP | 04-180020 | 6/1992 |
| JP | 04-248519 | 9/1992 |
| JP | 04-281425 | 10/1992 |
| JP | 04-344614 | 12/1992 |
| JP | 05-011235 | 1/1993 |
| JP | 05-119302 | 5/1993 |
| JP | 05-173119 | 7/1993 |
| JP | 05-216020 | 8/1993 |
| JP | 05-289067 | 11/1993 |
| JP | 06-011694 | 1/1994 |
| JP | 06-051351 | 2/1994 |
| JP | 06-059246 | 3/1994 |
| JP | 06-075241 | 3/1994 |
| JP | 06-110045 | 4/1994 |
| JP | 06-175109 | 6/1994 |
| JP | 07-005444 | 1/1995 |
| JP | 07-128647 | 5/1995 |
| JP | 08-286211 | 11/1996 |
| JP | 08-313923 | 11/1996 |
| JP | 09-090352 | 4/1997 |
| JP | 09-203891 | 8/1997 |
| WO | WO89/09807 | 10/1989 |

OTHER PUBLICATIONS

M. Ohta et al., Proceedings of Asia Display '95, p. 707–710 "Development of Super–TFT–LCDs with In–Plane Switching Display Mode".

P.S. Drzaic, Liquid crystal dispersions, p. 225.

M. Oh–e et al., Liquid Crystals, 1997, vol. 22, No. 4, p. 379–390 "The in–plane switching of homogeneously aligned nematic liquid crystals".

* cited by examiner

Fig. 5
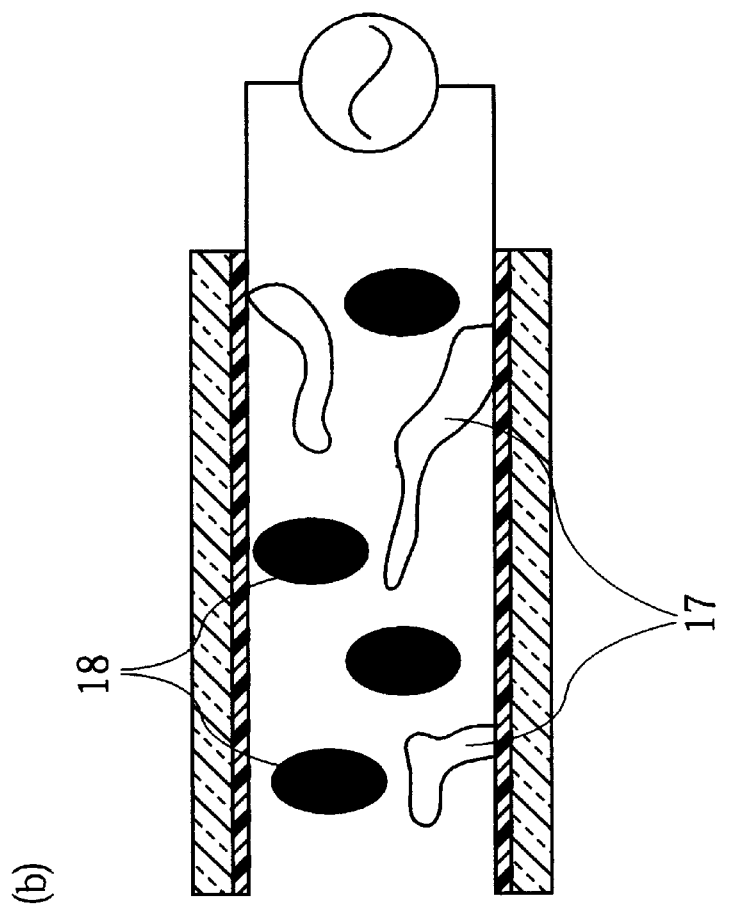
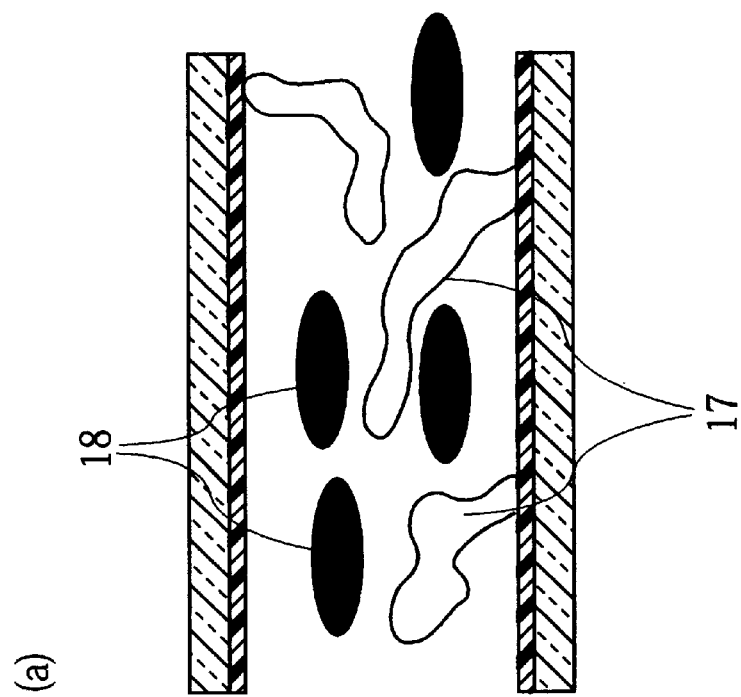

Fig. 21
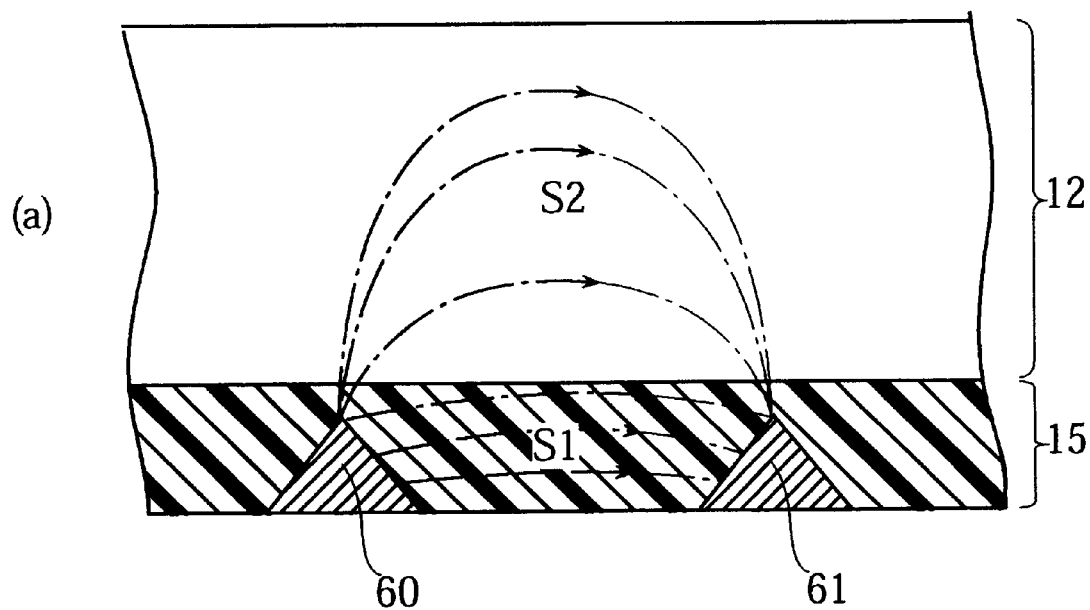
(a)
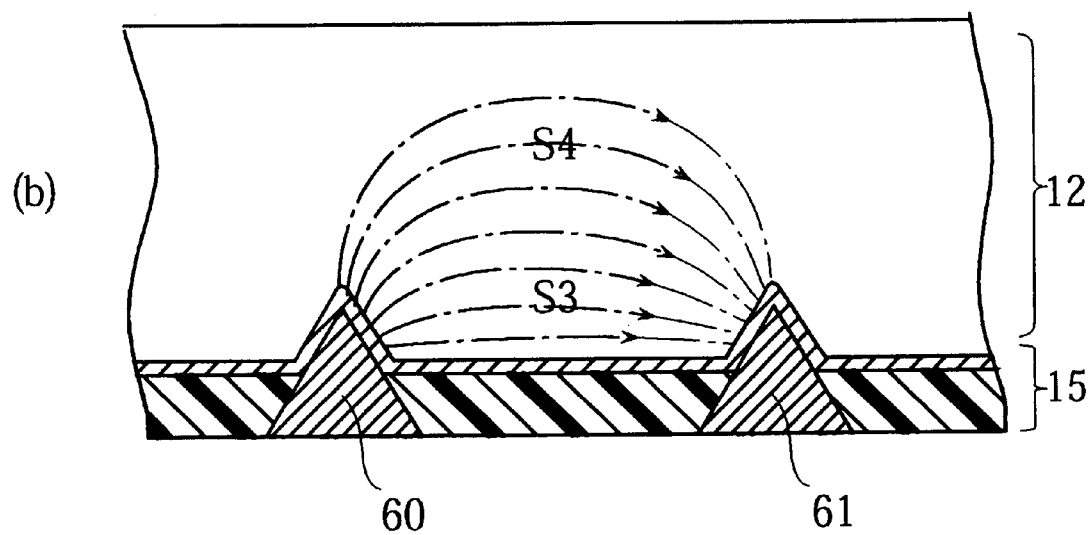
(b)

Fig. 27
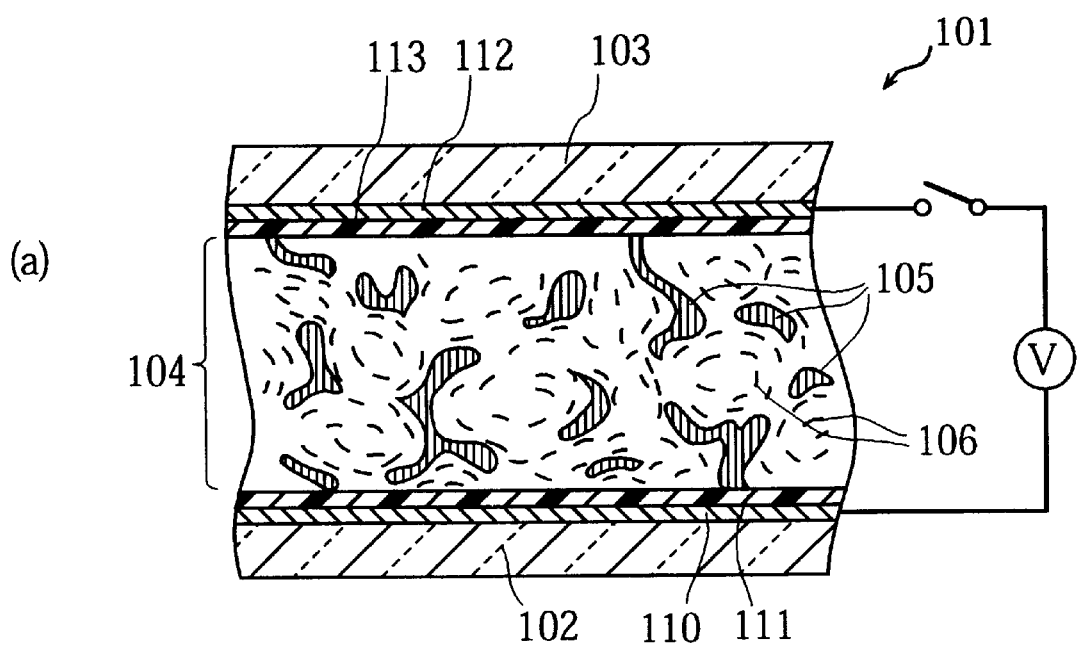
(a)
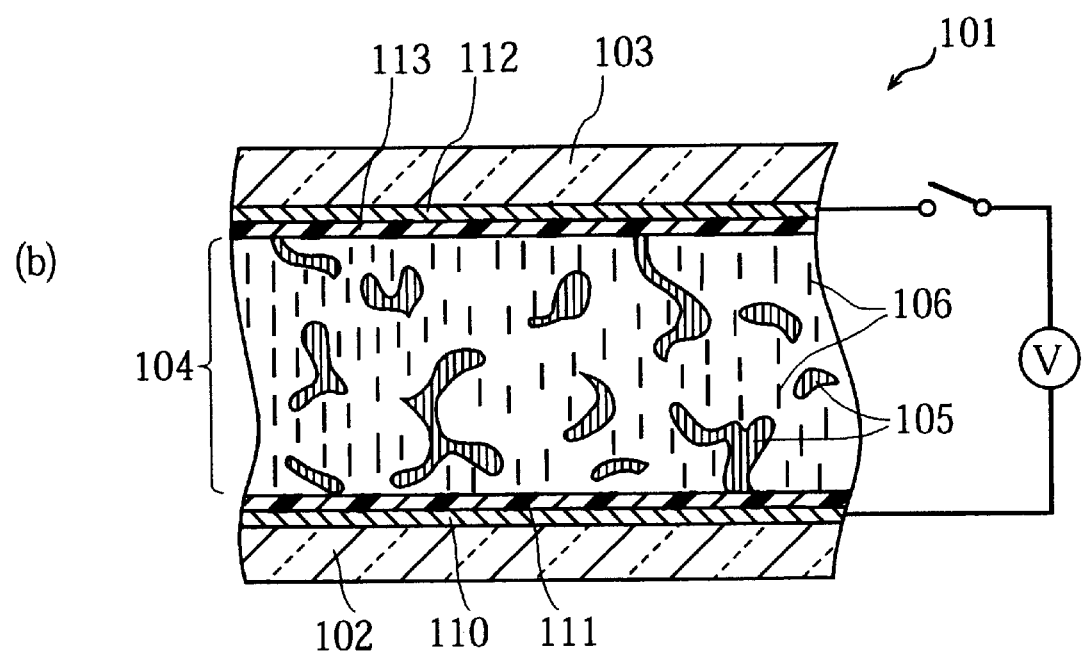
(b)

Fig. 28
(a)
a conventional example
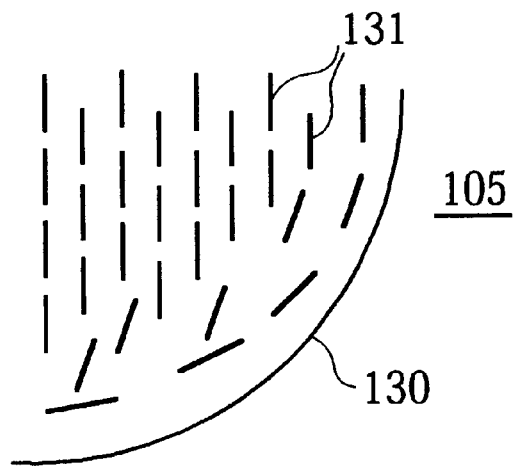
(b)
the present invention
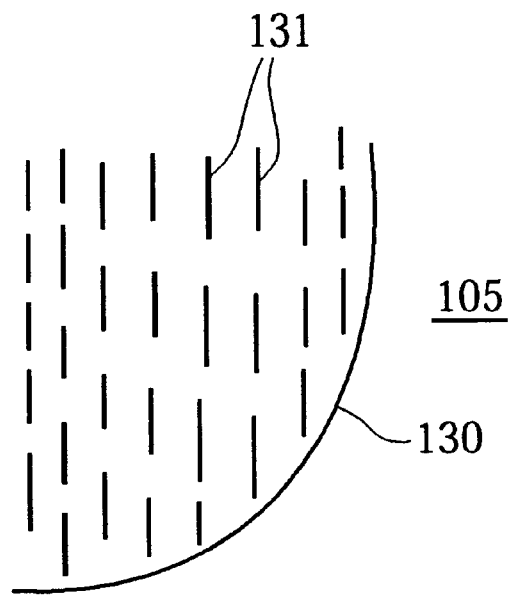

Fig. 29
a conventional example
(a) 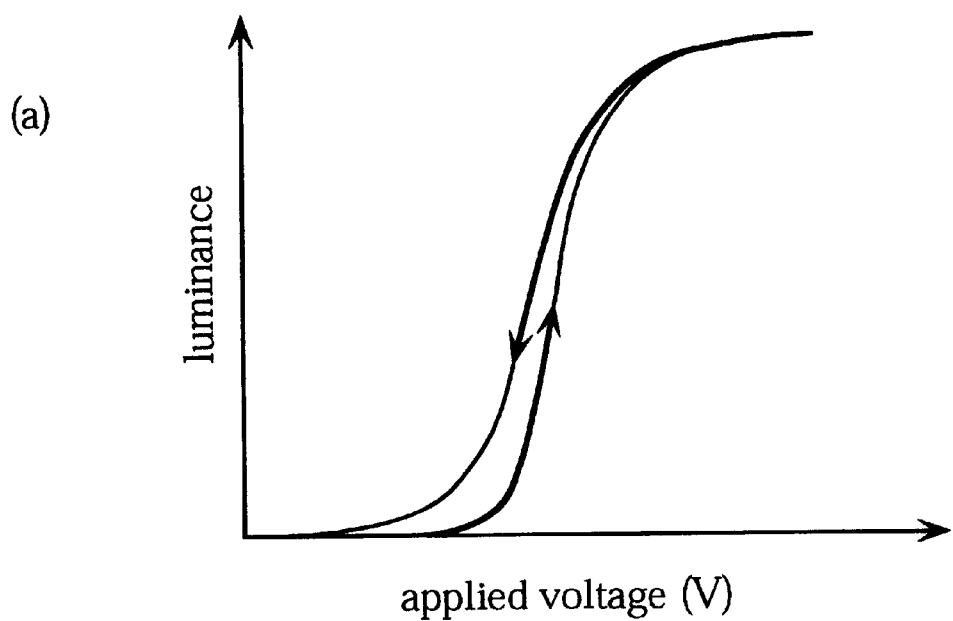
the present invention
(b) 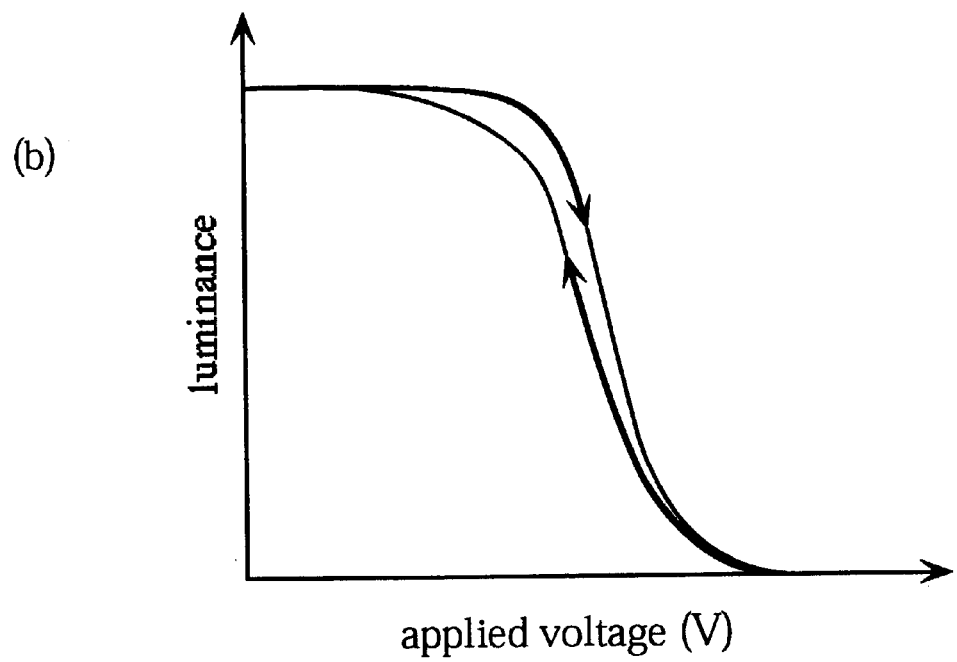

Fig. 32
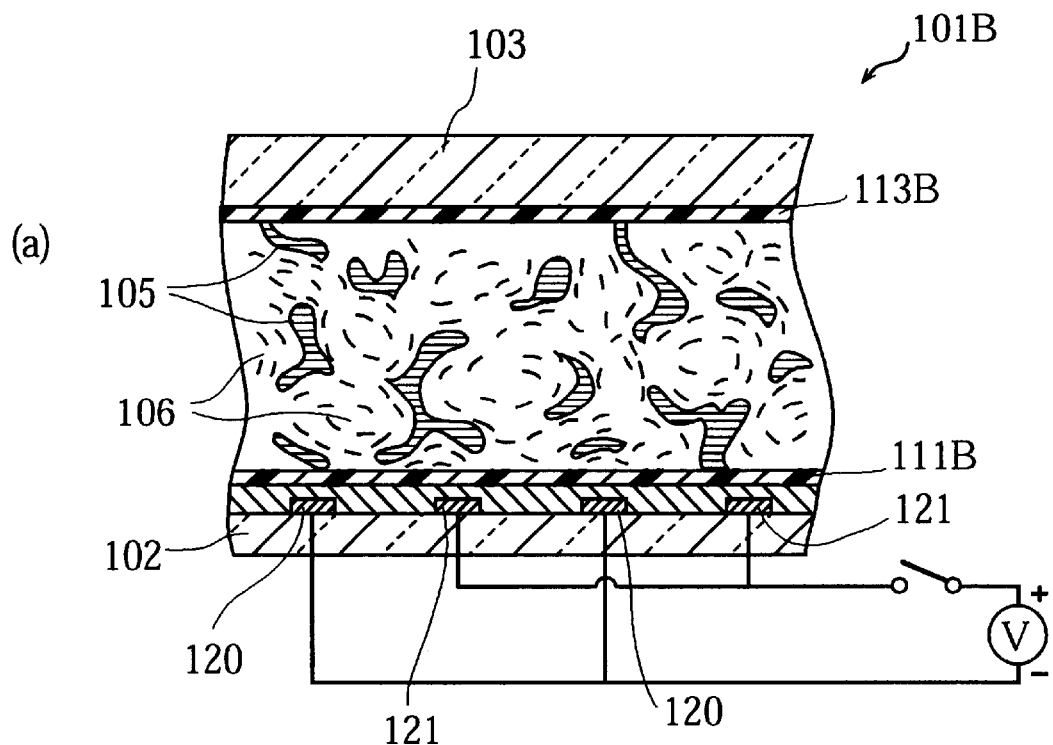
(a)
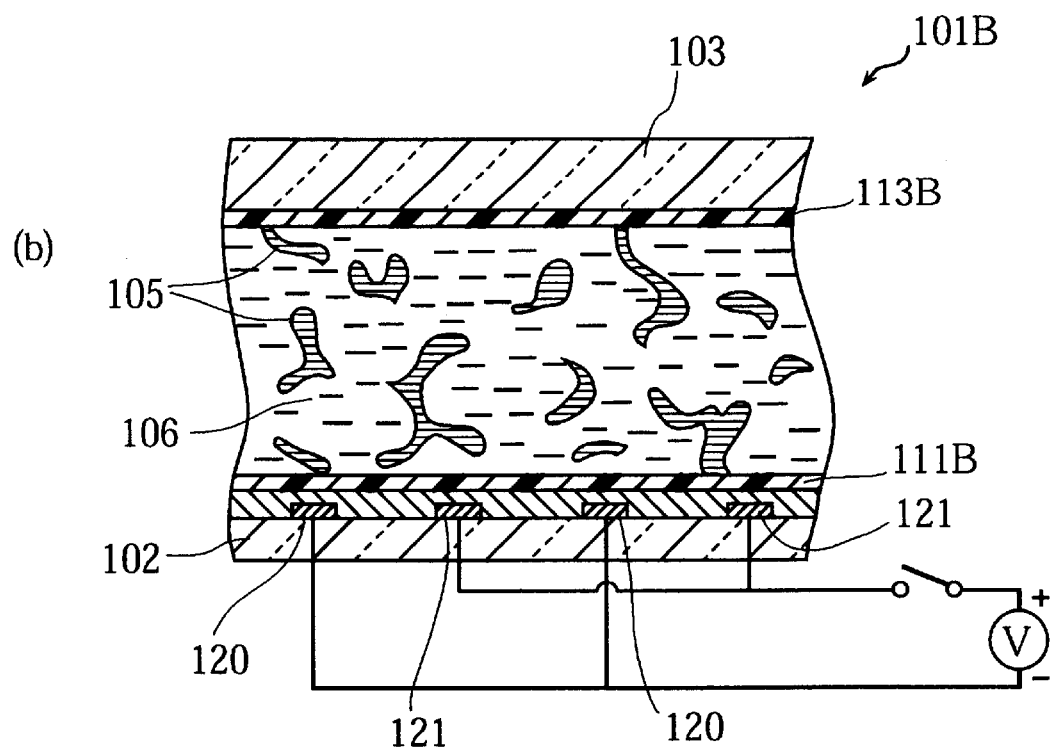
(b)

POLYMER DISPERSION TYPE LIQUID CRYSTAL DISPLAY PANEL AND ITS MANUFACTURING METHOD

TECHNICAL FIELD

The present invention relates to a polymer dispersion type liquid crystal display panel used for a portable information terminal and a manufacturing method thereof, and particularly a polymer dispersion type liquid crystal display panel appropriately applicable to a display panel in a lateral electric field mode (PS 'In-plane Switching' mode) and a manufacturing method thereof.

BACKGROUND ART

[1] In recent years, a polymer dispersion type liquid crystal display panel wherein a polymer and a liquid crystal composition are dispersed in an incompatible state is noticeable. Since the polymer dispersion type panel has such a characteristic that a polarizer is unnecessary and a display with a high luminance can be obtained easily because of using a scattering mode for displaying. (refer to S. Shikama et al, *Society for Information Display* '95, pp. 231 to 234)

A polymer dispersion type panel is characterized by displaying by utilizing a refractive index matching of a liquid crystal and a polymer. A display mode of a polymer dispersion type panel is divided roughly into two kinds by a method of the refractive index matching. The one is a normal mode wherein a scattering display is executed under no application of voltage and a transparent display is executed under an application of voltage (for instance, the specification U.S. Pat. No. 3,600,060. The other is a reverse mode wherein a transparent display is executed under no application of voltage and a scattering display is executed under an application of voltage (for instance, Japanese Unexamined Patent Applications No. 2-309316 and No. 3-13268). Both of these two display modes are characterized by holding a polymer dispersion type liquid crystal between a pair of substrates with a transparent electrode and executing a switching of light by aligning a liquid crystal molecule in a vertical direction to the substrates under an application of voltage between the substrates.

Meanwhile, in the case of a liquid crystal panel wherein a display is executed by using a birefingence and a polarizer, a liquid crystal panel in a lateral electric field mode has been developed wherein an electric field is applied in parallel with a substrate for the purpose of a wide viewing angle (for instance, Japanese Unexamined Patent Publication No. 63-21907).

A liquid crystal panel is disclosed wherein an incident light is reflected into a gap between substrates by devising an electrode structure for intending a higher luminance with a lateral electric field mode (Japanese Unexamined Patent Publication No. 8-286211).

However, the above-mentioned conventional examples have various problems.

(1) A problem in a conventional polymer dispersion type liquid crystal panel
   (a) In the case of using as a transmission type panel such as a projection type display, the panel has a defect of low contrast due to no disappearance of a black display resulting from insufficient scattering performance. Meanwhile, in order to solve such a defect, it is preferred to improve the scattering performance by increasing a panel gap and an optical length. However, the increase of a panel gap results in a high driving voltage, and the panel can not be utilized practically.
   (b) In the case of using as a reflection type panel with a color filter such as a portable type display, the panel has a defect of low white luminance due to insufficient scattering of outside light in a white display resulting from insufficient scattering performance. Also in this case, the increase of a panel gap for improving the scattering performance results in a high driving voltage similarly to the above, and the panel can not be utilized practically.
   (c) When a polymer dispersion type panel in a reverse mode as composed above is driven with a lateral electric field mode, a scattering intensity in applying voltage is increased, and a higher scattering and a higher contrast are obtained. Meanwhile, the problem is that a pixel aperture ratio is reduced and it is difficult to obtain a higher luminance since a driving electrode is arrayed in parallel at a pixel.

(2) A problem in a conventional liquid crystal display panel in a lateral electric field mode
   (a) A luminance is low due to the use of a polarizer.
   (b) An opaque electrode such as metal is usually used as an electrode used for applying an electric field in order to obtain a uniform display with a high contrast (refer to, for instance, M. Ohta et al, *Proceedings of Asia Display* '95, pp. 707 to 710). Accordingly, a pixel aperture ratio is low, approximately 30%, and the reduction of luminance is caused.
   (c) When a gap between adjacent electrodes (equivalent to a gap in a direction of electric field between a first driving electrode and a second driving electrode in the present invention) is L ($\mu$m) and a panel gap is d ($\mu$), the L and d usually satisfy L>d in view of the reduction of driving voltage, the improvement of panel luminance and the optimization of voltage-transmittance characteristic (refer to, for instance, M. Ohta et al, *Proceedings of Asia Display* '95, pp. 577–580). Accordingly, a conventional panel in a lateral electric field mode using a nematic liquid crystal and a polarizer has the restriction in increasing the panel gap.
   (d) When a conventional liquid crystal panel using a polarizer is driven with a lateral electric field mode, a wide viewing angle is actualized, while the problem is that a pixel aperture ratio is reduced and it is difficult to obtain a higher luminance due to a similar reason. As described in Japanese Unexamined Patent Publication No. 8-286211, in the case of composing so that a cross sectional form of a driving electrode is made a triangular form and incident light is reflected in a pixel aperture in order to intend a higher luminance, if an electrode exists in a liquid crystal layer, a black display does not disappear since an alignment direction of the liquid crystal is irregular on the side of the electrode, and a contrast gets lower. In the case of making an electrode a triangular form, a ratio h/W of its height h to its width W requires over 0.5. That is, in the case of electrode width W of 3 $\mu$m, electrode height h requires over 1.5 $\mu$m. Generally, a panel gap in a lateral electric field mode is 2 to 5 $\mu$m. It is necessary to uniformize a panel gap with high precision. However, it is difficult to keep the panel gap below 5 $\mu$m uniformly in a state of the electrode height of 1.5 $\mu$m. Consequently, in the case of making an electrode form a triangular form with a conventional lateral electric field mode, it is necessary to form a flattened layer on an electrode completely. Then, the flattened layer is, for instance, 1.6 μm in thickness for covering the electrode. However, when the flattened layer is thick, the problem is that display irregularity occurs since an electric field is not applied uniformly to a liquid crystal layer.

[2] A conventional liquid crystal display panel has the following problems.

That is, various scattering type display panels have been discussed since before. PDLC Polymer Dispersed Liquid Crystal) type liquid crystal display panel wherein a liquid crystal is dispersed into a polymer in a droplet (U.S. Pat. No. 4,688,900 and PNLC (Polymer Network Liquid Crystal) type liquid crystal display panel wherein a liquid crystal is dispersed into a polymer in a range of networks (No. 2724596 of Japanese Patent) are referred to as a typical example. In these conventional polymer dispersion type liquid crystal panels (hereinafter referred to as 'the first conventional example'), under an application of voltage, a liquid crystal molecule is aligned in a direction vertical to a substrate, and a refractive index of a liquid crystal molecule and a refractive index of a polymer are equalized, and thereby a transparent state is obtained. However, since a refractive index of a liquid crystal molecule and a refractive index of a polymer are different against a diagonal incident light, a sufficient transparent state is not obtained.

The solve the above-mentioned problems, a liquid crystal display panel (hereinafter referred to as 'the second conventional example'), which is disclosed in U.S. Pat. No. 4,994,204 of and Japanese Unexamined Patent Publication No. 2-503963, and a liquid crystal display panel (hereinafter referred to as 'the third conventional example'), which is disclosed in Japanese Unexamined Patent Publication No. 5-119302, are proposed.

In the second conventional example, as shown in FIG. 33(a) and (b), a liquid crystalline polymer 150 is used The polymer 150 is aligned in a direction vertical to a substrate 151. Under no application of voltage, like a usual polymer dispersion type liquid crystal, as shown in FIG. 33(a), since a liquid crystal molecule 153 in a liquid crystal droplet 152 is aligned at random, a scattering state is obtained due to a mismatch between a refractive index of a liquid crystal molecule and a refractive index of a polymer.

Under an application of voltage, as shown in FIG. 33(b), a liquid crystal molecule 153 is aligned in a direction vertical to a substrate. When a refractive index in a major axis direction of a liquid crystal molecule 153 is made nlc ∥ and a refractive index in a minor axis direction nlc ⊥ and a refractive index in a major axis direction of a polymer 150 is made np ∥ and a refractive index in a minor axis direction np ⊥, nlc ∥ and np ∥ are determined so as to be equal, and nlc ⊥ and np ⊥ to be equal.

Therefore, as to a light 154 vertical to a substrate, a transparent state is obtained like a usual polymer dispersion type liquid crystal. Moreover, as to a diagonal light 155, since an angle of a light which transmits through the polymer 150 and an angle of a light which transmits through the liquid crystal molecule 153 are equal by the above-mentioned determination of a refractive index, a mismatch of a refractive index does not occur between the polymer 150 and the liquid crystal molecule 153. Consequently, the diagonal light 155 transmits through without being scattered. Thus, as to not only the light 154 vertical to a substrate but also the diagonal light 155, a transparent state is obtained.

The third conventional example is referred to as IRIS (internal Reflection Inverted Scattering) type display panel wherein an alignment treatment is executed and a scattering state is obtained under an application of voltage.

In the third conventional example, as shown in FIG. 34(a) and (b), a polymer 50 having a birefringence is used like the second conventional example. Under no application of voltage, a polymer 150 is aligned in a direction parallel with a substrate 151 and a liquid crystal molecule 153 is aligned in a direction parallel with the substrate 151 (FIG. 34(a)). Therefore, like the second conventional example, as to not only a light 154 vertical to a substrate but also a diagonal light 155, a transparent state is obtained.

Meanwhile, as shown in FIG. 34(b), under an application of voltage, a liquid crystal molecule 153 is aligned in an electric field direction (a direction vertical to a substrate). Thus, a refractive index of a liquid crystal molecule 153 and a refractive index of a polymer 150 are different against a light 154 vertical to a substrate, and a refractive index of a liquid crystal molecule 153 and a refractive index of a polymer 50 are different against a diagonal incident light 155.

Consequently, as to both a light 154 vertical to a substrate and a diagonal light 155, scattering occurs. Therefore, a scattering state is obtained under no application of voltage.

Thus, in the second and third conventional examples, since a transparent state is possible as to a diagonal light, a transparent characteristic improves in a transparent state.

However, the above-mentioned second and third conventional examples have the following problems.

(Problems in the Second Conventional Example)

In the second conventional example, a scattering of a polymer dispersion type liquid crystal depends mainly on a scattering between a polymer and a liquid crystal.

As written in Japanese Unexamined Patent Publication No. 6-59246, a scattering between a liquid crystal and a liquid crystal is larger than a scattering between a polymer and a liquid crystal, and thereby the scattering between a liquid crystal and a liquid crystal is predominant in a scattering of a polymer dispersion type liquid crystal. Consequently, the problem is that a scattering intensity of a polymer dispersion type liquid crystal is not obtained sufficiently.

(Problems in the Third Conventional Example)

In the third conventional example, besides the above-mentioned second conventional example, under no application of voltage, the problem is that a tint of an image differs between the case of watching in a direction parallel with an alignment direction of a polymer and a liquid crystal and the case of watching in a direction vertical to the alignment direction, in other words a coloration occurs, since all of a polymer and a liquid crystal are aligned in the same direction.

In addition, another problem is that an optical hysteresis is large and afterimage remains.

An optical hysteresis is an essential problem of a polymer dispersion type liquid crystal display panel including the first conventional example.

DISCLOSURE OF THE INVENTION

The present invention aims to solve the above-mentioned problems and provide a new polymer dispersion type liquid crystal display panel wherein a high contrast, a high luminance and a low power consumption can be intended.

In addition, the present invention, in consideration of the above-mentioned problems, aims to provide a polymer dispersion type liquid crystal display panel and a manufacturing method thereof wherein both an improvement of a transparent characteristic in a transparent state and an improvement of a scattering characteristic in a scattering state can be intended, and an influence of an optical hysteresis is reduced without a coloration.

In order to achieve the above-mentioned purpose, the invention according to Claim 1 in the present invention is a polymer dispersion type liquid crystal display panel comprising a pair of substrates at least one of which is transparent, a polymer dispersion type liquid crystal layer composed of a polymer and a liquid crystal, which is held between the above-mentioned pair of substrates, and a first driving electrode and a second driving electrode which are provided at each pixel for applying an electric field to the above-mentioned polymer dispersion type liquid crystal layer and driving the polymer dispersion type liquid crystal layer as a light valve, wherein the above-mentioned polymer dispersion type liquid crystal layer is a polymer dispersion type liquid crystal layer with a high ratio of the liquid crystal to the polymer having a structure in which the liquid crystal is filled between the substrates and the polymer is dispersed into the filled liquid crystal so that the polymer and the liquid crystal can be aligned according to an alignment treatment of the substrates, the above-mentioned first driving electrode and the above-mentioned second driving electrode are formed on one of the above-mentioned pair of substrates in a disposition state of applying an electric field approximately in parallel with the above-mentioned substrates, and under no application of voltage the above-mentioned liquid crystal and the polymer, which is adjacent to the liquid crystal and composes an interface, are aligned in an approximately same direction on a plane parallel with the substrates according to an alignment treatment of the substrates as well as under an application of voltage the liquid crystal rotates on a plane parallel with the substrates and the polymer and the liquid crystal are in a disposition state of making an angle on a plane parallel with the substrates.

According to the above-mentioned composition, the liquid crystal and the polymer adjacent to the liquid crystal, which composes an interface, are aligned under no application of voltage in an approximately same direction on a plane parallel with the substrates. Therefore, a transparent state is obtained The liquid crystal rotates on a plane parallel with the substrates under an application of voltage by the electric field parallel with the substrates. Therefore, a scattering state is obtained. Thus, it is possible to actualize a polymer dispersion type liquid crystal panel in a reverse mode using a lateral electric field mode. The following effect is produced by driving such a polymer dispersion type liquid crystal panel with a lateral electric field mode.

①. It is possible to thicken a panel gap more than before without causing an increase in a driving voltage. The reason is that the driving voltage does not increase largely even if the panel gap increases since the driving voltage changes mainly depending on a distance between driving electrodes in the case of a lateral electric field mode.

②. It is possible to intend a higher luminance and a higher contrast by thickening a panel gap. The reason is that scattering performance is improved largely since an optical length of light increases by increasing the panel gap.

A term 'a ratio of a liquid crystal' means a weight percentage of a liquid crystal in a polymer dispersion type liquid crystal layer.

The invention according to Claim 2 is a polymer dispersion type liquid crystal display panel according to Claim 1, wherein the above-mentioned polymer comprises a liquid crystalline polymer.

When a polymer comprises a liquid crystalline polymer, it is possible to increase a scattering intensity even more as compared with the case of comprising no liquid crystalline polymer. The reason is that the liquid crystal rotates on a plane parallel with the substrates under an application of voltage, and the polymer and the liquid crystal are in a disposition state of making an angle on a plane parallel with the substrates, and then, when the polymer is a liquid crystalline polymer, a birefringence occurs also in the polymer and a large scattering occurs resulting from an intensity and a direction of the birefingence of the liquid crystal and the liquid crystalline polymer.

As detailed in Embodiments, in the case of driving a polymer dispersion type liquid crystal panel with a lateral electric field mode, a scattering intensity increases remarkably as compared with a conventional longitudinal electric field mode if a polymer comprises a liquid crystalline polymer. Accordingly, when panel gaps are equal, a higher contrast is intended as compared with a conventional longitudinal electric field mode.

A term 'a liquid crystalline polymer' means a polymer having a birefringence.

The invention according to Claim 3 is a polymer dispersion type liquid crystal display panel according to Claim 1, wherein d>L is satisfied when a gap in a direction of an electric field between the above-mentioned first driving electrode and the above-mentioned second driving electrode is made L and a panel gap is made d.

According to the above-mentioned composition, it is possible to intend a higher luminance, a higher contrast and a lower voltage. The reason is described below.

d<L is essential to a conventional lateral electric field mode because of optical designing.

Meanwhile, in a conventional polymer dispersion type panel, since a driving voltage is determined by a panel gap d, the increase of d for maintaining scattering performance (contrast) causes the increase of driving voltage accordingly. Therefore, it is impossible that the improvement of scattering performance and the reduction of driving voltage are compatible. As regards this point, in the present invention, the contrast can be raised by satisfYing d>L without raising the driving voltage. The reason is that the increase of d does not cause the increase of driving voltage since the present invention is composed so as to drive a polymer dispersion type panel with a lateral electric field mode.

The invention according to Claim 4 is a polymer dispersion type liquid crystal display panel according to Claim 2, wherein d>L is satisfied when a gap in a direction of an electric field between the above-mentioned first driving electrode and the above-mentioned second driving electrode is made L and a panel gap is made d.

According to the above-mentioned composition, the same effect as the above-mentioned Claim 3 is produced basically.

The invention according to Claim 5 is a polymer dispersion type liquid crystal display panel according to Claim 1, wherein the above-mentioned first driving electrode and the above-mentioned second driving electrode are transparent electrodes.

As described above, since the first driving electrode and the second driving electrode are transparent electrodes, a pixel aperture ratio gets higher. Consequently, a panel with a high luminance can be actualized.

The reason for using a transparent electrode in the present invention unlike a conventional lateral electric field mode is described below. A conventional lateral electric field mode uses such an opaque electrode as an aluminum plate for a driving electrode. This is because a uniform display can not be obtained since a liquid crystal right above the electrode does not move by an electric field or is distorted nonuniformly by an electric field nonuniformity at an end of the electrode. Meanwhile, in a polymer dispersion type liquid crystal panel, it is not always necessary that an electrode is opaque since an electric field nonuniformity at an end of the electrode is useful for the cause of scattering. As a characteristic of scattering mode, a slight nonuniformity of scattering characteristic right above the electrode or at an end of the electrode is averaged in the whole scattering, and does not cause display irregularity. Consequently, in the present invention in which a polymer dispersion type liquid crystal panel is used with a lateral electric field mode, a transparent electrode can be used as a driving electrode.

The invention according to Claim 6 is a polymer dispersion type liquid crystal display panel according to Claim 3, wherein the above-mentioned first driving electrode and the above-mentioned second driving electrode are transparent electrodes.

According to the above-mentioned composition, the same effect as the above-mentioned Claim 5 is produced basically.

The invention according to Claim 7 is a polymer dispersion type liquid crystal display panel according to Claim 4, wherein the above-mentioned first driving electrode and the above-mentioned second driving electrode are transparent electrodes.

According to the above-mentioned composition, the same effect as the above-mentioned Claim 5 is produced basically.

The invention according to Claim 8 is a polymer dispersion type liquid crystal display panel according to Claim 5, wherein a width of the above-mentioned first driving electrode and the above-mentioned second driving electrode is 6 μm or less.

The reason for making the width 6 μm or less is that a small width is effective in uniformizing a display since a liquid crystal right above the electrode has scattering by an electric field nonuniformity at an end of the electrode.

The invention according to Claim 9 is a polymer dispersion type liquid crystal display panel according to Claim 6, wherein a width of the above-mentioned first driving electrode and the above-mentioned second driving electrode is 6 μm or less.

According to the above-mentioned composition, the same effect as the above-mentioned Claim 8 is produced basically.

The invention according to Claim 10 is a polymer dispersion type liquid crystal display panel according to Claim 7, wherein a width of above-mentioned first driving electrode and the above-mentioned second driving electrode is 6 μm or less.

According to the above-mentioned composition, the same effect as the above-mentioned Claim 8 is produced basically.

The invention according to Claim 11 is a polymer dispersion type liquid crystal display panel according to Claim 1, wherein an alignment of the liquid crystal in the polymer dispersion type liquid crystal layer is a homogeneous alignment under no application of voltage, in which a major axis of a liquid crystal molecule is approximately parallel with the substrates and the major axis is not twisted.

As described above, in the case of the homogeneous alignment, it is an advantage that the scattering under an application of voltage gets higher than the case of a twisted nematic alignment.

The invention according to Claim 12 is a polymer dispersion type liquid crystal display panel according to Claim 2, wherein an alignment of the liquid crystal in the polymer dispersion type liquid crystal layer is a homogeneous alignment under no application of voltage, in which a major axis of a liquid crystal molecule is approximately parallel with the substrates and the major axis is not twisted.

According to the above-mentioned composition, the same effect as the above-mentioned Claim 11 is produced basically.

The invention according to Claim 13 is a polymer dispersion type liquid crystal display panel according to Claim 1, wherein an alignment of the liquid crystal in the polymer dispersion type liquid crystal layer is a twisted nematic alignment under no application of voltage, in which a major axis of a liquid crystal molecule is twisted successively between the substrates.

As described above, in the case of the twisted nematic alignment, it is an advantage that a viewing angle under no application of voltage gets wider than the case of a homogeneous alignment.

The invention according to Claim 14 is a polymer dispersion type liquid crystal display panel according to Claim 2, wherein an alignment of the liquid crystal in the polymer dispersion type liquid crystal layer is a twisted nematic alignment under no application of voltage, in which a major axis of a liquid crystal molecule is twisted successively between the substrates.

According to the above-mentioned composition, the same effect as the above-mentioned Claim 13 is produced basically.

The invention according to Claim 15 is a polymer dispersion type liquid crystal display panel according to Claim 13, wherein a twist angle in the above-mentioned twisted nematic alignment is 180 degrees or more.

According to the above-mentioned composition, a display panel with a large viewing angle can be actualized.

The invention according to Claim 16 is a polymer dispersion type liquid crystal display panel according to Claim 14, wherein a twist angle in the above-mentioned twisted nematic alignment is 180 degrees or more.

According to the above-mentioned composition, the same effect as the above-mentioned Claim 15 is produced basically.

The invention according to Claim 17 is a polymer dispersion type liquid crystal display panel according to Claim 11, wherein a dielectric anisotropy of the above-mentioned liquid crystal is positive, and an angle θ, which is formed by an alignment treatment direction of the above-mentioned substrates and the second driving electrode, is 45 degrees or less.

The reason for controlling the above-mentioned angle θ is described below: when the angle θ is small, an angle formed by the liquid crystal and the polymer in the case of rotating the liquid crystal under an application of voltage gets larger, and thereby a scattering intensity increases; meanwhile, when the angle θ is large, an angle formed by the liquid crystal and the polymer under an application of voltage gets smaller, and thereby a sufficient scattering intensity can not be obtained.

The invention according to Claim 18 is a polymer dispersion type liquid crystal display panel according to Claim 12, wherein a dielectric anisotropy of the above-mentioned liquid crystal is positive, and an angle θ, which is formed by an alignment treatment direction of the above-mentioned substrates and the second driving electrode, is 45 degrees or less.

According to the above-mentioned composition, the same effect as the above-mentioned Claim 17 is produced basically.

The invention according to Claim 19 is a polymer dispersion type liquid crystal display panel according to Claim 11, wherein a dielectric anisotropy of the above-mentioned liquid crystal is negative, and an angle θ, which is formed by an alignment treatment direction of the above-mentioned substrates and the second driving electrode, is 45 degrees or more and below 90 degrees.

The reason for controlling the above-mentioned angle θ is basically the same as the reason for controlling the angle θ in the above-mentioned invention according to Claim 17: however, in the invention according to Claim 19, since a dielectric anisotropy of the liquid crystal is negative, when the angle θ is large, an angle formed by the liquid crystal and the polymer in the case of rotating the liquid crystal under an application of voltage gets larger, and thereby a scattering intensity increases; meanwhile, when the angle θ is small, an angle formed by the liquid crystal and the polymer under an application of voltage gets smaller, and thereby a sufficient scattering intensity can not be obtained.

The invention according to Claim 20 is a polymer dispersion type liquid crystal display panel according to Claim 12, wherein a dielectric anisotropy of the above-mentioned liquid crystal is negative, and an angle θ, which is formed by an alignment treatment direction of the above-mentioned substrates and the second driving electrode, is 45 degrees or more and below 90 degrees.

According to the above-mentioned composition, the same effect as the above-mentioned Claim 19 is produced basically.

The invention according to Claim 21 is a polymer dispersion type liquid crystal display panel comprising a pair of substrates at least one of which is transparent, a polymer dispersion type liquid crystal layer composed of a polymer and a liquid crystal, which is held between the above-mentioned pair of substrates, and a first driving electrode and a second driving electrode which are provided at each pixel for applying an electric field to the above-mentioned polymer dispersion type liquid crystal layer and driving the polymer dispersion type liquid crystal layer as a light valve, wherein the above-mentioned polymer dispersion type liquid crystal layer is a polymer dispersion type liquid crystal layer in which the liquid crystal is a liquid crystal droplet and the liquid crystal droplet is dispersed into the polymer and a dielectric anisotropy of the liquid crystal is negative, the above-mentioned first driving electrode and the above-mentioned second driving electrode are formed on one of the above-mentioned pair of substrates in a disposition state of applying an electric field approximately in parallel with the above-mentioned substrates, and under no application of voltage an alignment direction of the liquid crystal in the above-mentioned liquid crystal droplet is aligned in a direction, which is approximately parallel with the substrates and approximately the same on a plane parallel with the substrates, as well as under an application of voltage the liquid crystal in the above-mentioned liquid crystal droplet is disposed on a plane parallel with a panel gap direction and an alignment direction of each liquid crystal droplet is disposed at random on a plane parallel with a panel gap direction.

According to the above-mentioned composition, under no application of voltage, since the alignment direction of the liquid crystal in the liquid crystal droplet is approximately parallel with the substrates, light scattering between the liquid crystal droplets does not occur and the panel in a transparent state is obtained. Under an application of voltage, since a dielectric anisotropy of the liquid crystal is negative, the liquid crystal is aligned on a plane parallel with a panel gap direction. Since an energy necessary for an inclination of a major axis of the liquid crystal in a direction vertical to an electric field direction does not depend on an azimuth angle and is equivalent in all directions, eventually the above-mentioned alignment direction of the liquid crystal in the liquid crystal droplet is disposed at random on a plane parallel with a panel gap direction. Then, the panel obtains a scattering state. Thus, when the liquid crystal is disposed at random in the panel gap direction, an effect of scattering a light crossing diagonally to the panel gap direction gets much higher.

The invention according to Claim 22 is a polymer dispersion type liquid crystal display panel according to Claim 21, wherein a liquid crystal alignment in the above-mentioned polymer dispersion type liquid crystal layer is obtained by applying an electric field parallel with the substrates while polymerizing the polymer.

When an electric field parallel with the substrates is applied while polymerizing the polymer, a liquid crystal droplet, in which a liquid crystal molecule is aligned along an electric field direction, is formed. Therefore, under an application of voltage, an alignment direction of the liquid crystal in the liquid crystal droplet is aligned in a direction, which is approximately parallel with the substrates and approximately the same on a plane parallel with the substrates.

The invention according to Claim 23 is a polymer dispersion type liquid crystal display panel according to Claim 21, wherein d>L is satisfied when a gap in a direction of an electric field between the above-mentioned first driving electrode and the above-mentioned second driving electrode is made L and a panel gap is made d.

By means of satisfying d>L, a higher luminance, a higher contrast and a lower voltage are intended by a similar function to the description of the above-mentioned invention according to Claim 3.

The invention according to Claim 24 is a polymer dispersion type liquid crystal display panel according to Claim 1, wherein the above-mentioned first driving electrode and the above-mentioned second driving electrode are a comb-shaped electrode opposite to each other.

When the driving electrode is a comb-shaped electrode, the driving electrode can be disposed uniformly at a rectangular pixel and an effect of improving a pixel aperture ratio is produced.

The invention according to Claim 25 is a polymer dispersion type liquid crystal display panel according to Claim 2, wherein the above-mentioned first driving electrode and the above-mentioned second driving electrode are a comb-shaped electrode opposite to each other.

According to the above-mentioned composition, the same effect as the above-mentioned Claim 24 is produced basically.

The invention according to Claim 26 is a polymer dispersion type liquid crystal display panel according to Claim 24, wherein the above-mentioned comb-shaped electrode has a shape in which a part of the electrode is bent.

In the case of using a shape in which a part of the electrode is bent, an effect of improving the scattering further is produced since a liquid crystal molecule rotates in a reverse direction on both sides of the bent part. A polarization dependence of scattered light by a viewing angle is averaged and a uniform characteristic of a viewing angle is obtained.

The invention according to Claim 27 is a polymer dispersion type liquid crystal display panel according to Claim 25, wherein the above-mentioned comb-shaped electrode has a shape in which a part of the electrode is bent.

According to the above-mentioned composition, the same effect as the above-mentioned Claim 26 is produced basically.

The invention according to Claim 28 is a polymer dispersion type liquid crystal display panel according to Claim 24, wherein the above-mentioned comb-shaped electrode has a shape in which a corner of an electrode is roundish.

According to the above-mentioned composition, in the case of a shape in which a corner of an electrode is roundish, the nonuniformity of alignment at an electrode end is restrained and an effect of actualizing a uniform display performance is produced since an influence of the concentration of electric field on the corner is relaxed.

The invention according to Claim 29 is a polymer dispersion type liquid crystal display panel according to Claim 25, wherein the above-mentioned comb-shaped electrode has a shape in which a corner of an electrode is roundish.

According to the above-mentioned composition, the same effect as the above-mentioned Claim 28 is produced basically.

The invention according to Claim 30 is a polymer dispersion type liquid crystal display panel comprising a pair of substrates at least one of which is transparent, a polymer dispersion type liquid crystal layer composed of a polymer and a liquid crystal, which is held between the above-mentioned pair of substrates, and a first driving electrode and a second driving electrode which are provided at each pixel for applying an electric field to the above-mentioned polymer dispersion type liquid crystal layer and driving the polymer dispersion type liquid crystal layer as a light valve, wherein the above-mentioned polymer dispersion type liquid crystal layer is a polymer dispersion type liquid crystal layer in which the liquid crystal is a liquid crystal droplet and the liquid crystal droplet is dispersed into the polymer and a dielectric anisotropy of the liquid crystal is positive, the above-mentioned first driving electrode and the above-mentioned second driving electrode are formed on one of the above-mentioned pair of substrates in a disposition state of applying an electric field approximately in parallel with the above-mentioned substrates, and under no application of voltage the liquid crystal in the above-mentioned liquid crystal droplet is aligned in a three-dimensionally random direction as well as under an application of voltage the liquid crystal in the above-mentioned liquid crystal droplet is aligned in a direction parallel with the substrates.

According to the above-mentioned composition, it is possible to actualize a polymer dispersion type liquid crystal display panel in a lateral electric field mode using a normal mode.

The invention according to Claim 31 is a polymer dispersion type liquid crystal display panel comprising a pair of substrates which are transparent, a polymer dispersion type liquid crystal layer composed of a polymer and a liquid crystal, which is held between the above-mentioned pair of substrates, and a first driving electrode and a second driving electrode which are provided at each pixel for applying an electric field to the above-mentioned polymer dispersion type liquid crystal layer and driving the polymer dispersion type liquid crystal layer as a light valve, wherein the above-mentioned polymer dispersion type liquid crystal layer is a polymer dispersion type liquid crystal layer with a high ratio of the liquid crystal to the polymer having a structure in which the liquid crystal is filled between the substrates and the polymer is dispersed into the filled liquid crystal so that the polymer and the liquid crystal can be aligned according to an alignment treatment of the substrates, the above-mentioned first driving electrode and the above-mentioned second driving electrode are formed on one of the above-mentioned pair of substrates in a disposition state of applying an electric field approximately in parallel with the above-mentioned substrates and further have a shape in which at least a part of an incident light into the driving electrode can be reflected in a pixel aperture, and under no application of voltage the above-mentioned liquid crystal and the polymer, which is adjacent to the liquid crystal and composes an interface, are aligned in an approximately same direction on a plane parallel with the substrates according to an alignment treatment of the substrates as well as under an application of voltage the liquid crystal rotates on a plane parallel with the substrates and the polymer and the liquid crystal are in a disposition state of making an angle on a plane parallel with the substrates.

According to the above-mentioned composition, a light which transmits through a panel increases under no application of voltage and a higher luminance is actualized since at least a part of an incident light into the driving electrode can be reflected in a pixel aperture.

The invention according to Claim 32 is a polymer dispersion type liquid crystal display panel according to Claim 31, wherein the above-mentioned polymer comprises a liquid crystalline polymer.

According to the above-mentioned composition, in addition to the effect of the above-mentioned invention according to Claim 31, a higher luminance and a higher contrast can be intended without increasing the driving voltage since the polymer comprises a liquid crystalline polymer.

The invention according to Claim 33 is a polymer dispersion type liquid crystal display panel according to Claim 31, wherein a cross sectional form of the above-mentioned first driving electrode and the above-mentioned second driving electrode is a triangular form so that at least a part of an incident light can be reflected in a pixel aperture.

According to the above-mentioned composition, an incident light into a panel can be reflected in a pixel aperture through the side of the triangle, and thereby a light which transmits through a panel increases under no application of voltage and a higher luminance is actualized.

The invention according to Claim 34 is a polymer dispersion type liquid crystal display panel according to Claim 32, wherein a cross sectional form of the above-mentioned first driving electrode and the above-mentioned second driving electrode is a triangular form so that at least a part of an incident light can be reflected in a pixel aperture.

According to the above-mentioned composition, the same effect as the above-mentioned Claim 33 is produced basically.

The invention according to Claim 35 is a polymer dispersion type liquid crystal display panel according to Claim 31, wherein a cross sectional form of the above-mentioned first driving electrode and the above-mentioned second driving electrode is a trapezoidal form so that at least a part of an incident light can be reflected in a pixel aperture.

According to the above-mentioned composition, an incident light into a panel can be reflected in a pixel aperture through the side of the trapezoid, and thereby a light which transmits through a panel increases under no application of voltage and a higher luminance is actualized.

The invention according to Claim 36 is a polymer dispersion type liquid crystal display panel according to Claim 32, wherein a cross sectional form of the above-mentioned first driving electrode and the above-mentioned second driving electrode is a trapezoidal form so that at least a part of an incident light can be reflected in a pixel aperture.

According to the above-mentioned composition, the same effect as the above-mentioned Claim 35 is produced basically.

The invention according to Claim 37 is a polymer dispersion type liquid crystal display panel according to Claim 33, wherein a flattened layer is formed on a substrate with the above-mentioned first driving electrode and the above-mentioned second driving electrode, a lower area of each driving electrode is covered with the above-mentioned flattened layer, and an upper area of each driving electrode projects into the above-mentioned polymer dispersion type liquid crystal layer.

According to the above-mentioned composition, it is possible to apply a uniform electric field to the polymer dispersion type liquid crystal layer as well as to reduce an alignment irregularity of the liquid crystal and the polymer by the irregularities of the electrodes.

The invention according to Claim 38 is a polymer dispersion type liquid crystal display panel according to Claim 34, wherein a flattened layer is formed on a substrate with the above-mentioned first driving electrode and the above-mentioned second driving electrode, a lower area of each driving electrode is covered with the above-mentioned flattened layer, and an upper area of each driving electrode projects into the above-mentioned polymer dispersion type liquid crystal layer.

According to the above-mentioned composition, the same effect as the above-mentioned Claim 37 is produced basically.

The invention according to Claim 39 is a polymer dispersion type liquid crystal display panel according to Claim 35, wherein a flattened layer is formed on a substrate with the above-mentioned first driving electrode and the above-mentioned second driving electrode, a lower area of each driving electrode is covered with the above-mentioned flattened layer, and an upper area of each driving electrode projects into the above-mentioned polymer dispersion type liquid crystal layer.

According to the above-mentioned composition, the same effect as the above-mentioned Claim 37 is produced basically.

The invention according to Claim 40 is a polymer dispersion type liquid crystal display panel according to Claim 36, wherein a flattened layer is formed on a substrate with the above-mentioned first driving electrode and the above-mentioned second driving electrode, a lower area of each driving electrode is covered with the above-mentioned flattened layer, and an upper area of each driving electrode projects into the above-mentioned polymer dispersion type liquid crystal layer.

According to the above-mentioned composition, the same effect as the above-mentioned Claim 37 is produced basically.

The invention according to Claim 41 is a polymer dispersion type liquid crystal display panel according to Claim 31, wherein a flattened layer is formed on a substrate with the above-mentioned first and second driving electrodes, a lower area of each driving electrode is covered with the above-mentioned flattened layer, and an upper area of each driving electrode projects into the above-mentioned polymer dispersion type liquid crystal layer.

By means of satisfying d>L as the above-mentioned composition, a higher contrast and a lower voltage are intended.

The invention according to Claim 42 is a polymer dispersion type liquid crystal display panel according to Claim 32, wherein a flattened layer is formed on a substrate with the above-mentioned first and second driving electrodes, a lower area of each driving electrode is covered with the above-mentioned flattened layer, and an upper area of each driving electrode projects into the above-mentioned polymer dispersion type liquid crystal layer.

According to the above-mentioned composition, the same effect as the above-mentioned Claim 41 is produced basically.

The invention according to Claim 43 is a polymer dispersion type liquid crystal display panel comprising a pair of substrates, a polymer dispersion type liquid crystal layer composed of a polymer and a liquid crystal, which is held between the above-mentioned pair of substrates, and a first driving electrode and a second driving electrode which are provided at each pixel for applying an electric field to the above-mentioned polymer dispersion type liquid crystal layer and driving the polymer dispersion type liquid crystal layer as a light valve, wherein one of the above-mentioned pair of substrates is a transparent substrate and the other substrate forms a saw-toothed reflection layer inside the substrate, the above-mentioned polymer dispersion type liquid crystal layer is a polymer dispersion type liquid crystal layer with a high ratio of the liquid crystal to the polymer having a structure in which the liquid crystal is filled between the substrates and the polymer is dispersed into the filled liquid crystal so that the polymer and the liquid crystal can be aligned according to an alignment treatment of the substrates, the above-mentioned first driving electrode and the above-mentioned second driving electrode are formed on one of the above-mentioned pair of substrates in a disposition state of applying an electric field approximately in parallel with the above-mentioned substrates and further have a shape in which at least a part of an incident light into the driving electrode can be reflected at a different angle from a regular reflection direction when a light enters a plane parallel with the substrates, and under no application of voltage the above-mentioned liquid crystal and the polymer, which is adjacent to the liquid crystal and composes an interface, are aligned in an approximately same direction on a plane parallel with the substrates according to an alignment treatment of the substrates as well as under an application of voltage the liquid crystal rotates on a plane parallel with the substrates and the polymer and the liquid crystal are in a disposition state of making an angle on a plane parallel with the substrates.

According to the above-mentioned composition, it is possible to actualize a reflection type and polymer dispersion type liquid crystal display panel wherein a regularly reflected light in a reflection layer can be restrained, and a tone reversal and a reflection of peripheral light can be reduced.

The invention according to Claim 44 is a polymer dispersion type liquid crystal display panel according to Claim 43, wherein the above-mentioned polymer comprises a liquid crystalline polymer.

According to the above-mentioned composition, in addition to the effect according to the above-mentioned Claim 43, a higher luminance and a higher contrast are intended without increasing the driving voltage since the polymer comprises a liquid crystalline polymer.

The invention according to Claim 45 is a polymer dispersion type liquid crystal display panel according to Claim 43, wherein a cross sectional form of the above-mentioned driving electrodes is a triangular form.

The invention according to Claim 46 is a polymer dispersion type liquid crystal display panel according to Claim 44, wherein a cross sectional form of the above-mentioned driving electrodes is a triangular form.

An incident light into a panel can be reflected in a pixel aperture through the side of the triangle.

The invention according to Claim 43 is a polymer dispersion type liquid crystal display panel according to Claim 45, wherein a flattened layer is formed on a substrate with the above-mentioned first and second driving electrodes, a lower area of each driving electrode is covered with the above-mentioned flattened layer, and an upper area of each driving electrode projects into the above-mentioned polymer dispersion type liquid crystal layer.

According to the above-mentioned composition, a uniform electric field can be applied to the polymer dispersion type liquid crystal layer as well as an alignment irregularity of the liquid crystal and the polymer by the irregularities of the electrodes can be reduced.

The invention according to Claim 44 is a polymer dispersion type liquid crystal display panel according to Claim 46, wherein a flattened layer is formed on a substrate with the above-mentioned first and second driving electrodes, a lower area of each driving electrode is covered with the above-mentioned flattened layer, and an upper area of each driving electrode projects into the above-mentioned polymer dispersion type liquid crystal layer.

According to the above-mentioned composition, the same effect as the above-mentioned Claim 43 is produced basically.

The invention according to Claim 45 is a polymer dispersion type liquid crystal display panel according to Claim 43, wherein d>L is satisfied when a gap in a direction of an electric field between the above-mentioned first driving electrode and the above-mentioned second driving electrode is made L and a panel gap is made d.

By means of satisfying d>L as the above-mentioned composition, a higher contrast and a lower voltage are intended.

The invention according to Claim 46 is a polymer dispersion type liquid crystal display panel according to Claim 44, wherein d>L is satisfied when a gap in a direction of an electric field between the above-mentioned first driving electrode and the above-mentioned second driving electrode is made L and a panel gap is made d.

According to the above-mentioned composition, the same effect as the above-mentioned Claim 45 is produced basically.

The invention according to Claim 1 is a polymer dispersion type liquid crystal display panel wherein a polymer dispersion type liquid crystal layer comprising a liquid crystal and a polymer having a birefringence is held between a pair of substrates, and a display is executed by changing a light scattering state of the above-mentioned polymer dispersion type liquid crystal layer while applying an electric field in a predetermined direction to the polymer dispersion type liquid crystal layer with a means of applying an electric field, wherein an alignment treatment is executed on each of the above-mentioned pair of substrates so that the above-mentioned polymer is aligned in a predetermined direction, and under no application of voltage the above-mentioned liquid crystal is aligned so as to be along a wall surface of the above-mentioned polymer as well as under an application of voltage the above-mentioned liquid crystal is aligned in the same direction as an alignment direction of the above-mentioned polymer.

According to the above-mentioned composition, since the liquid crystal is aligned under no application of electric field so as to be along a wall surface of the polymer, the liquid crystal is aligned at random in view of the whole polymer dispersion type liquid crystal layer. Therefore, in addition to a scattering between a polymer and a liquid crystal, a scattering between a liquid crystal and a liquid crystal occurs and thereby a scattering intensity is improved. Meanwhile, since the liquid crystal is aligned under an application of electric field in the same direction as an alignment direction of the polymer, both an incident light vertical to a substrate and a diagonal incident light transmits through without being scattered when a refractive index of the liquid crystal is approximately equal to the refractive index of a polymer. Therefore, a transparency in a transparent state is improved. Consequently, it is possible to intend both an improvement of a transparent characteristic in a transparent state and an improvement of a scattering characteristic in a scattering state.

The invention, is a polymer dispersion type liquid crystal display panel wherein an alignment treatment of the above-mentioned substrates is a vertical alignment treatment, and the above-mentioned liquid crystal has a positive dielectric anisotropy.

According to the above-mentioned composition, it is possible to intend both an improvement of a transparent characteristic in a transparent state and an improvement of a scattering characteristic in a scattering state. However, in the case of using an alignment layer for the alignment treatment of the substrates, a horizontal alignment is general as an alignment layer. Consequently, a choice of materials is limited in order to obtain a uniform alignment as a vertical alignment layer. As regards this point, a horizontal alignment layer has a merit such as an easy choice of materials and a high uniformity.

The invention, is a polymer dispersion type liquid crystal display panel wherein an alignment treatment of the above-mentioned substrates is a horizontal alignment treatment, and the above-mentioned liquid crystal has a negative dielectric anisotropy.

According to the above-mentioned composition, the same effect as the above-mentioned Claim 1 is produced basically.

The invention is a polymer dispersion type liquid crystal display panel wherein a weight ratio of the liquid crystal to the above-mentioned polymer dispersion type liquid crystal layer is 60% or more.

When the weight ratio of the liquid crystal is low, a transparency in a transparent state is reduced and additionally a scattering between a liquid crystal and a liquid crystal is not sufficiently obtained.

The invention is a polymer dispersion type liquid crystal display panel wherein a weight ratio of the liquid crystal to the above-mentioned polymer dispersion type liquid crystal layer is 60% or more.

According to the above-mentioned composition, the same effect as the above-mentioned Claim 1 is produced basically.

The invention is a polymer dispersion type liquid crystal display panel wherein a weight ratio of the liquid crystal to the above-mentioned polymer dispersion type liquid crystal layer is 60% or more.

According to the above-mentioned composition, the same effect as the above-mentioned Claim 1 is produced basically.

The invention is a polymer dispersion type liquid crystal display panel wherein the above-mentioned means of applying an electric field is a means of applying an electric field in a direction on a substrate plane.

According to the above-mentioned composition, a liquid crystal display panel in a lateral electric field mode is actualized.

The invention is a polymer dispersion type liquid crystal display panel wherein an alignment treatment of the above-mentioned substrates is a horizontal alignment treatment in which a horizontal alignment direction is approximately equal to an electric field direction of the above-mentioned means of applying an electric field, and the above-mentioned liquid crystal has a positive dielectric anisotropy.

According to the above-mentioned composition, a transparent characteristic in a transparent state is improved further.

The invention is a method of manufacturing a polymer dispersion type liquid crystal display panel comprising the steps of forming a vertical alignment layer on a pair of substrates with an electrode, injecting a mixture in a solution comprising a liquid crystalline monomer and a liquid crystal material with a positive dielectric anisotropy between the pair of substrates after disposing the above-mentioned pair of substrates opposite, and forming a polymer dispersion type liquid crystal layer comprising a polymer which is aligned in a direction vertical to the substrates and a liquid crystal which is aligned so as to be along a wall surface of the polymer after phase-separating the polymer and the liquid crystal in a state in which the liquid crystalline monomer and the liquid crystal material in the above-mentioned mixture are aligned in a direction vertical to the substrates by an alignment treatment of the vertical alignment layer.

According to the above-mentioned composition, when the liquid crystalline monomer is used as a polymer precursor, the mixture in a solution indicates a liquid crystalline phase. The mixture is aligned in a direction of an alignment treatment of the substrates. Consequently, after polymerizing, the polymer is in a state of being aligned and fixed in the above-mentioned direction of an alignment treatment. Meanwhile, the liquid crystal is in a state of a random alignment, in view of the whole polymer dispersion type liquid crystal layer, by aligning the liquid crystal so as to be along a wall surface of the polymer. Therefore, a scattering between a liquid crystal and a liquid crystal is obtained and a liquid crystal display panel wherein a scattering intensity is improved can be actualized.

The invention is a method of manufacturing a polymer dispersion type liquid crystal display panel comprising the steps of forming a horizontal alignment layer on a pair of substrates with an electrode, injecting a mixture in a solution comprising a liquid crystalline monomer and a liquid crystal material with a negative dielectric anisotropy between the pair of substrates after disposing the above-mentioned pair of substrates opposite, and forming a polymer dispersion type liquid crystal layer comprising a polymer which is aligned in a direction parallel with the substrates and a liquid crystal which is aligned so as to along a wall surface of the polymer after phase-separating the polymer and the liquid crystal in a state in which the liquid crystalline monomer and the liquid crystal material in the above-mentioned mixture are aligned in a direction parallel with the substrates by an alignment treatment of the horizontal alignment layer.

According to the above-mentioned composition, it is possible to manufacture a liquid crystal display panel, wherein an improvement of a transparent characteristic in a transparent state and an improvement of a scattering characteristic in a scattering state can be intended.

The invention is a method of manufacturing a polymer dispersion type liquid crystal display panel comprising the steps of forming a horizontal alignment layer on a substrate with a pair of comb-shaped electrodes and forming a horizontal alignment layer on the other substrate without an electrode, injecting a mixture in a solution comprising a liquid crystalline monomer and a liquid crystal material with a positive dielectric anisotropy between the substrates after disposing the above-mentioned substrate and the above-mentioned other substrate opposite, and forming a polymer dispersion type liquid crystal layer comprising a polymer which is aligned in a direction parallel with the substrates and a liquid crystal which is aligned so as to be along a wall surface of the polymer after phase-separating the polymer and the liquid crystal in a state in which the liquid crystalline monomer and the liquid crystal material in the above-mentioned mixture are aligned in a direction parallel with the substrates by an alignment treatment of the horizontal alignment layer.

According to the above-mentioned composition, it is possible to manufacture a liquid crystal display panel in an IPS mode, wherein an improvement of a transparent characteristic in a transparent state and an improvement of a scattering characteristic in a scattering state can be intended.

The invention is a method of manufacturing a polymer dispersion type liquid crystal display panel wherein the above-mentioned liquid crystalline monomer comprises a bi-functional monomer.

When the liquid crystalline monomer is a bi-functional monomer, the liquid crystal tends greatly to be aligned along a surface form of the polymer after polymerizing. The reason is detailed in Embodiments described below.

The invention is a method of manufacturing a polymer dispersion type liquid crystal display panel wherein the above-mentioned liquid crystalline monomer comprises a bi-functional monomer.

According to the above-mentioned composition, the same effect as the above-mentioned Claim 1 is produced basically.

The invention is a method of manufacturing a polymer dispersion type liquid crystal display panel, wherein the above-mentioned liquid crystalline monomer comprises a bi-functional monomer.

According to the above-mentioned composition, the same effect as the above-mentioned Claim 1 is produced basically.

The invention is a method of manufacturing a polymer dispersion type liquid crystal display panel, wherein a heat treatment is executed on the polymer dispersion type liquid crystal layer after a step of forming the above-mentioned polymer dispersion type liquid crystal layer.

It was confirmed that a part of the liquid crystal was not aligned along a surface form of the polymer in a step of forming the polymer dispersion type liquid crystal layer in the case of a low content of the bi-functional monomer in the liquid crystalline monomer. It was confirmed that a polymerization was promoted and the above-mentioned part of the liquid crystal tended to be aligned along a surface form of the polymer by further executing a heat treatment even in such a state. Consequently, it is possible to obtain a liquid crystal display panel with the same scattering characteristic as a liquid crystal display panel manufactured in the case of a proper content of the bi-functional monomer.

The invention is a method of manufacturing a polymer dispersion type liquid crystal display panel, wherein a heat treatment is executed on the polymer dispersion type liquid crystal layer after a step of forming the above-mentioned polymer dispersion type liquid crystal layer.

According to the above-mentioned composition, the same effect as the above-mentioned Claim 1 is produced basically.

BRIEF DESCRIPTION OF THE DRAWINGS

FIG. 5 is a view showing a conventional display principle of a polymer dispersion type panel in a reverse mode.

FIG. 21 is a view for describing a direction of an electric field of electrodes 60, 61.

FIG. 27 is a view for describing a display action of a liquid crystal display panel 101.

FIG. 28 is a view showing an alignment state of a liquid crystal molecule near an interface between a liquid crystal and a polymer.

FIG. 29 is a graph showing an optical hysteresis.

FIG. 32 is a schematic cross sectional view of a liquid crystal display panel 101B according to Embodiment 2-4.

DETAILED DESCRIPTION OF THE PREFERRED EMBODIMENTS

EMBODIMENT 1

The summary of Embodiment 1 is, basically, a composition wherein a polymer dispersion type liquid crystal display panel in a reverse mode is driven with a lateral electric field mode. Embodiment 1 comprises a composition wherein a cross sectional form of an electrode is made a triangle or a trapezoid, and additionally, only a lower area of an electrode is covered with a flattened layer. According to Embodiment 1, a luminance and a contrast can be improved without increasing a driving voltage. The contents of Embodiment 1 will be detailed by exemplifying Embodiments 1-1 to 1-14 below.

(Embodiment 1-1)

Figure 1:
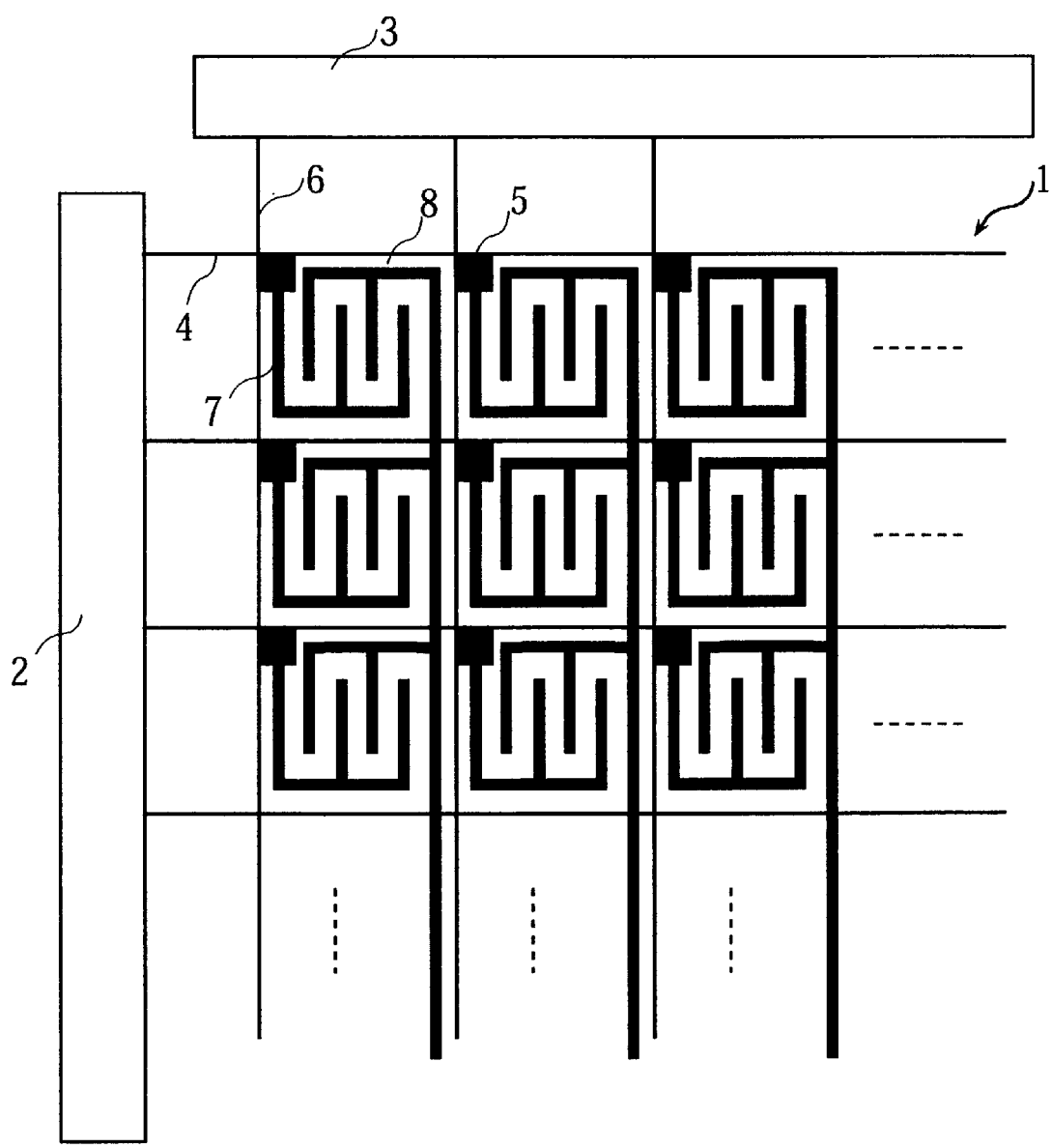
FIG. 1 is a general view of a liquid crystal display device to which a polymer dispersion type liquid crystal panel according to Embodiment 1-1 is applied.
Figure 2:
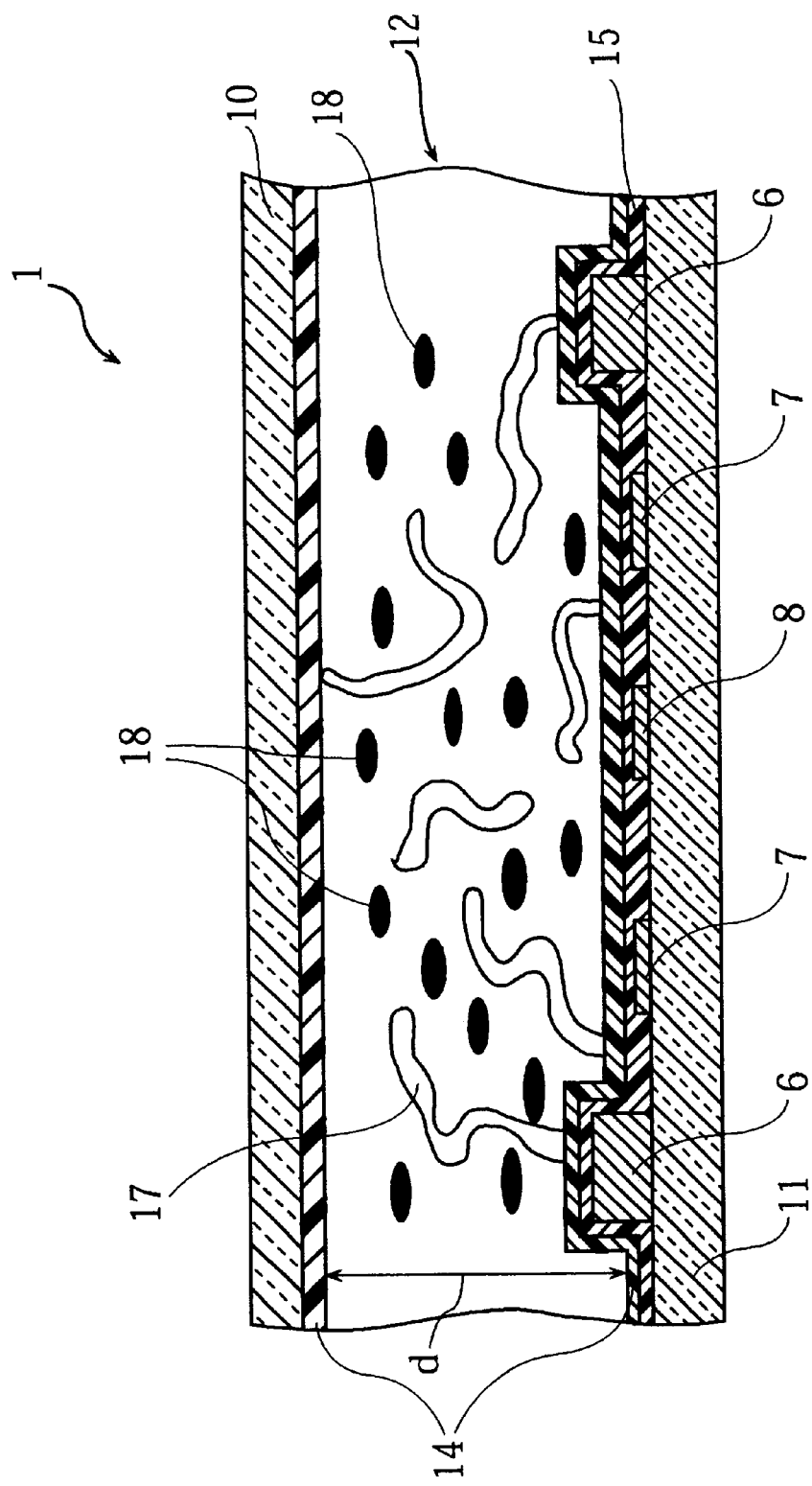
FIG. 2 is a cross sectional view of a polymer dispersion type liquid crystal panel according to Embodiment 1-1.

FIG. 1 is a general view of a liquid crystal display device to which a polymer dispersion type liquid crystal panel according to Embodiment 1-1 is applied, and FIG. 2 is a cross sectional view of the polymer dispersion type liquid crystal panel. FIG. 2 shows a section regarding a pixel. First, referring to FIG. 1, in the liquid crystal display device, external driver circuits 2, 3 are added to a polymer dispersion type liquid crystal display panel 1 wherein a pixel is arrayed in a matrix. The external driver circuit 2 is a driver circuit for scanning and the external driver circuit 3 is a driver circuit for a signal. When a thin film transistor (TFT) 5 is made an ON state by applying a scanning signal to a scanning line 4, a signal voltage from a signal line 6 is stored at a driving electrode 7. By means of a voltage between the driving electrode 7 and an opposite electrode 8, an electric field in a direction approximately parallel with a substrate occurs and a liquid crystal is driven.

The above-mentioned liquid crystal display panel 1 is a liquid crystal panel in a reverse mode and its concrete structure is shown in FIG. 2. The liquid crystal display panel 1 has a pair of upper and lower transparent substrates 10, 11 and a polymer dispersion type liquid crystal layer 12 held between the substrates 10 and 11, and the driving electrode 7 and the opposite electrode 8 provided corresponding to each pixel. For instance, a glass substrate is exemplified as the upper substrate 10 and the lower substrate 11.

Figure 3:
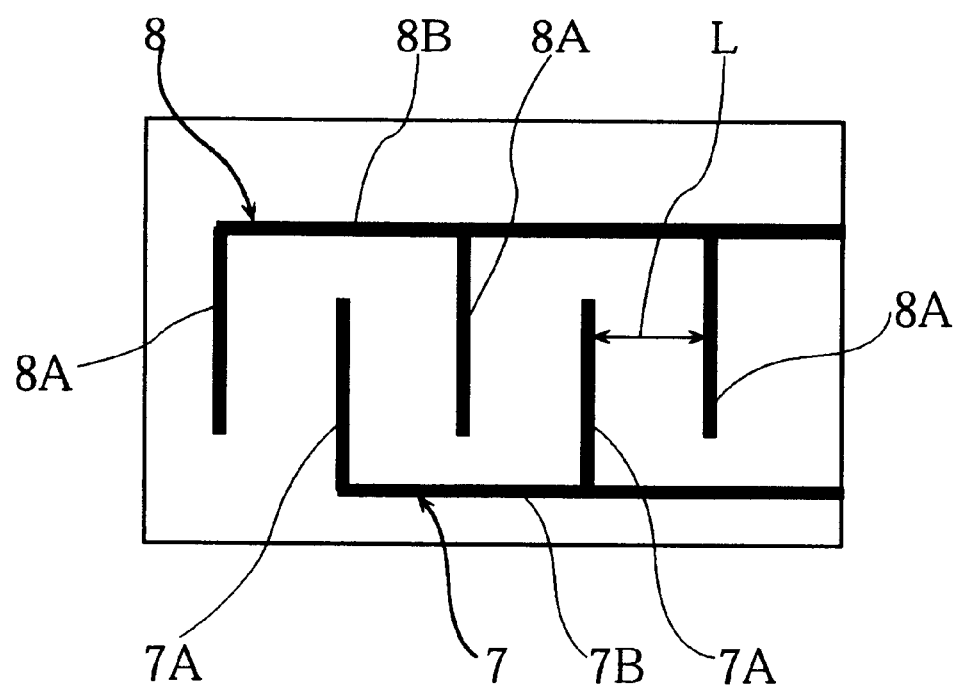
FIG. 3 is a n enlarged plan view of a driving electrode and an opposite electrode.

The above-mentioned driving electrode 7 is a first driving electrode for driving the polymer dispersion type liquid crystal layer 12 as a light valve, and the opposite electrode 8 is a second driving electrode for driving the polymer dispersion type liquid crystal layer 12 as a light valve. The driving electrode 7 and the opposite electrode 8 are a comb-shaped electrode and are formed inside the lower substrate 11. The driving electrode 7, as shown in FIGS. 1 and 3, has a plurality of comb-toothed electrodes 7A and a connecting electrode 7 for connecting each comb-toothed electrode 7A, and the comb-toothed electrodes 7A are parallel with each other. The opposite electrode 8 is composed similarly to the driving electrode 7, and has a plurality of comb-toothed electrodes 8A and a connecting electrode 8B. The driving electrode 7 and the opposite electrode 8 are disposed in a state of engaging the comb-toothed electrodes 7A and the comb-toothed electrodes 8A. When an electrode gap which is a gap in a direction of an electric field between the driving electrode 7 and the opposite electrode 8 (equivalent to a gap between the comb-toothed electrode 7A and the comb-toothed electrode 8A in Embodiment 1-1) is L ($\mu$m) and a panel gap is d ($\mu$m), d>L is satisfied. An opaque electrode made of aluminum is used for the driving electrode 7 and the opposite electrode 8. An electric field Lateral electric field) can be applied in parallel with a substrate by such an electrode composition.

In FIG. 2, only two comb-toothed electrodes 7A and a comb-toothed electrode 8A are drawn, and this FIG. is intended for a simple illustration. Actually, a multiple comb-toothed electrodes 7A and 8A are provided.

Figure 4:
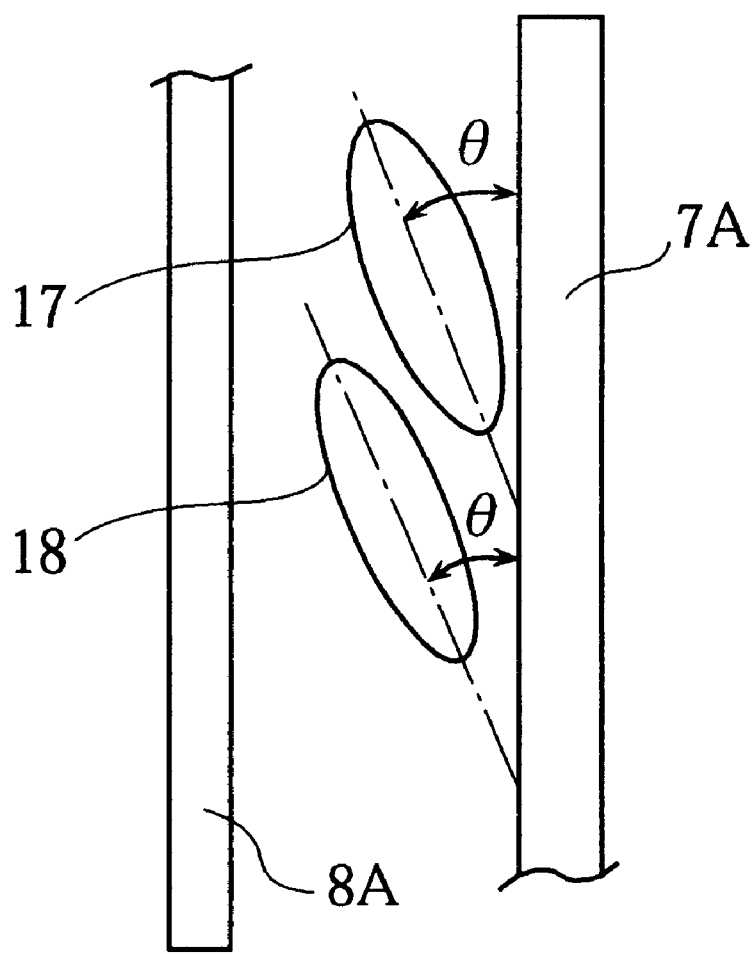
FIG. 4 is a view showing an alignment state of a liquid crystal.

The above-mentioned polymer dispersion type liquid crystal layer 12 is a network type and polymer dispersion type liquid crystal layer comprising a polymer 17 and a liquid crystal 18. The above-mentioned polymer 17 is a liquid crystalline polymer and the liquid crystal 18 is a liquid crystal with a positive dielectric anisotropy A term 'a liquid crystalline polymer' means a polymer having a birefingence. The polymer 17 and the liquid crystal 18 have a homogeneous alignment wherein the polymer 17 and the liquid crystal 18 form an angle θ (refer to FIG. 4) with the comb-toothed electrode 7A by an alignment treatment of the above-mentioned substrates 10, 11. Then, the angle θ ranges from 0 degree or more to 45 degrees or less.

The polymer dispersion type liquid crystal layer 12 is composed so that a ratio of the liquid crystal to the polymer is approximately 86%. Accordingly, the ratio in the polymer dispersion type liquid crystal layer 12 is higher as compared with the ratio of approximately 70 to 80% in a usual polymer dispersion type liquid crystal layer. Consequently, the liquid crystal 18 is filled closely between the substrates 10, 11 and the polymer is dispersed into the liquid crystal 18. A term 'a ratio of a liquid crystal' means a weight percentage of a liquid crystal in a polymer dispersion type liquid crystal layer.

In FIG. 2, the liquid crystal 18 shows a liquid crystal molecule and is drawn so that space exists among each liquid crystal molecule for convenience in order to understand an alignment state of the liquid crystal. However, actually, the liquid crystal 18 is filled in the whole space except the polymer 17. The reason for using the polymer dispersion type liquid crystal layer with such a high ratio is that the liquid crystal is affected by an alignment treatment of the substrates and has a predetermined alignment (a homogeneous alignment in Embodiment 1-1). When the ratio is low, approximately 70 to 80%, the liquid crystal changes into a droplet and is in a state wherein a liquid crystal droplet is dispersed into the polymer. Therefore, the liquid crystal is not affected by an alignment treatment of the substrates and can not have a predetermined alignment (a homogeneous alignment in Embodiment 1-1). In FIG. 2, 14 indicates an alignment layer, and rubbing treatment is executed in a predetermined direction. 15 indicates a flattened layer.

A display action of the above-mentioned liquid crystal display panel is described below. Under no application of voltage, since the polymer 17 and the liquid crystal 18 are aligned in the same direction on a plane parallel with the substrates, the polymer 17 and the liquid crystal 18 do not have any difference in a refractive index and an incident light transmits through without being scattered. Accordingly, a transparent state is obtained. Under an application of voltage, an electric field occurs in parallel with the substrates and then a major axis of the liquid crystal 18 is aligned in a direction of an electric field since a dielectric anisotropy of the liquid crystal 18 is positive. Therefore, the liquid crystal 18 rotates on a plane parallel with the substrates 10, 11 and an angle formed by the polymer 17 and the liquid crystal 18 gets larger. Consequently, an axial direction of the birefringence differs largely between the polymer 17 and the liquid crystal 18, and a difference in the refractive index between the polymer 17 and the liquid crystal 18 increases, and thereby a scattering intensity increases and a scattering state is obtained. Thus, it is possible to actualize a polymer dispersion type liquid crystal panel in a lateral electric field mode using a reverse mode, and as described below, to intend a higher luminance, a higher contrast and a lower power consumption of the panel.

A function according to a composition of Embodiment 1 is described specifically, and it is clarified below that a higher luminance, a higher contrast and a lower power consumption of the panel can be intended.

(A) A function by driving polymer dispersion type liquid crystal panel in a reverse mode with a lateral electric field mode (1) The function is described while compared with a conventional polymer dispersion type panel in a reverse mode. FIG. 5 is a view showing a conventional display principle of a polymer dispersion type panel in a reverse mode. Under no application of voltage, as shown in FIG. 5(a), the polymer 17 and the liquid crystal 18 are aligned in an approximately predetermined direction. At the moment, if a refractive index in a direction of a minor axis of the liquid crystal 18 is approximately equalized to a refractive index of the polymer 17, a transparent state is obtained without causing a scattering. Under an application of voltage, as shown in FIG. 5(b), since the liquid crystal 12 is aligned in a direction approximately vertical to the substrates, a difference in the refractive index between the polymer 17 and the liquid crystal 18 occurs and the panel is made a scattering state. Then, a scattering performance of the panel depends largely on a difference in the refractive index against an incident light into the panel between the polymer 17 and the liquid crystal 18. In the case of a high ratio of the liquid crystal to the polymer, the scattering performance depends also on a difference in a refractive index between the adjacent domains of a minute liquid crystal, and a larger difference in the refractive index causes a higher scattering performance. Consequently, it is important to raise a difference in a refractive index between the polymer 17 and the liquid crystal 18 as well as between the liquid crystal domains for improving the scattering performance in the polymer dispersion type panel. A term liquid crystal domain means a minute liquid crystal area in which a liquid crystal molecule is aligned in the same direction.

Figure 6:
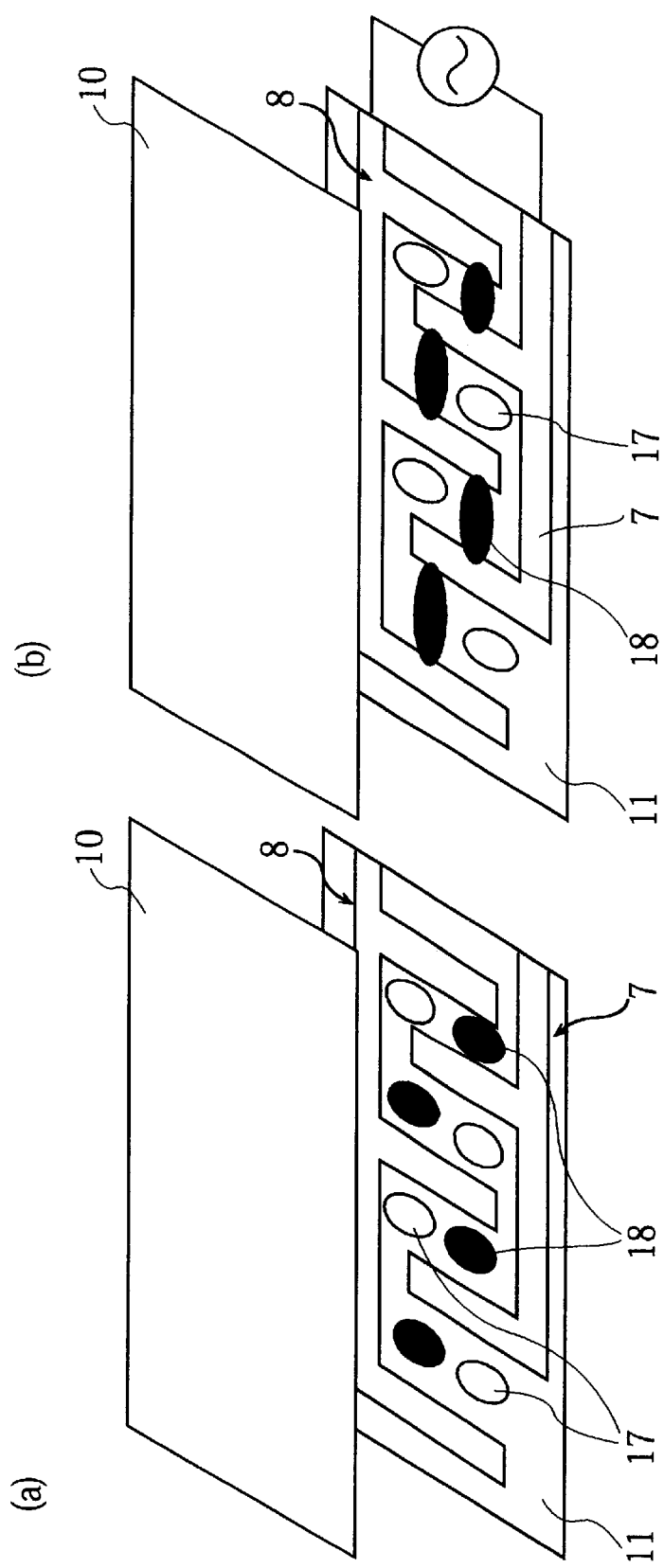
FIG. 6 is a view showing a display principle of a polymer dispersion type panel in a reverse mode according to the present invention.

A display principle in the case (the case of the present invention) of driving polymer dispersion type panel in a reverse mode with a lateral electric field mode is shown in FIG. 6. FIG. 6 is a bird's-eye view of a liquid crystal panel. Under no application of voltage, as shown in FIG. 6(a), the polymer 17 and the liquid crystal 18 are aligned in a predetermined direction between the upper substrate 10 and the lower substrate 11 and thereby a transparent state is obtained. Under an application of voltage between the driving electrode 7 and the opposite electrode 8, as shown in FIG. 6(b), the liquid crystal 18 rotates on a plane parallel with the substrates 10, 11. Therefore, a difference in the refractive index between the liquid crystal 18 and the peripheral polymer 17 (meaning a liquid crystalline polymer with birefringence) increases and a scattering state is obtained.

Accordingly, the present invention and a conventional example are the same in respect of obtaining a scattering state by a difference in the refractive index between the liquid crystal 18 and the peripheral polymer 17. However, in the case of rotating the liquid crystal 18 on a substrate plane, the difference in the refractive index between the liquid crystal 18 and the peripheral polymer 17 is higher than a conventional case wherein the liquid crystal 18 is aligned vertically to a substrate. Therefore, in the present invention, a higher contrast is obtained than a conventional example. The reason is detailed below.

Figure 7:
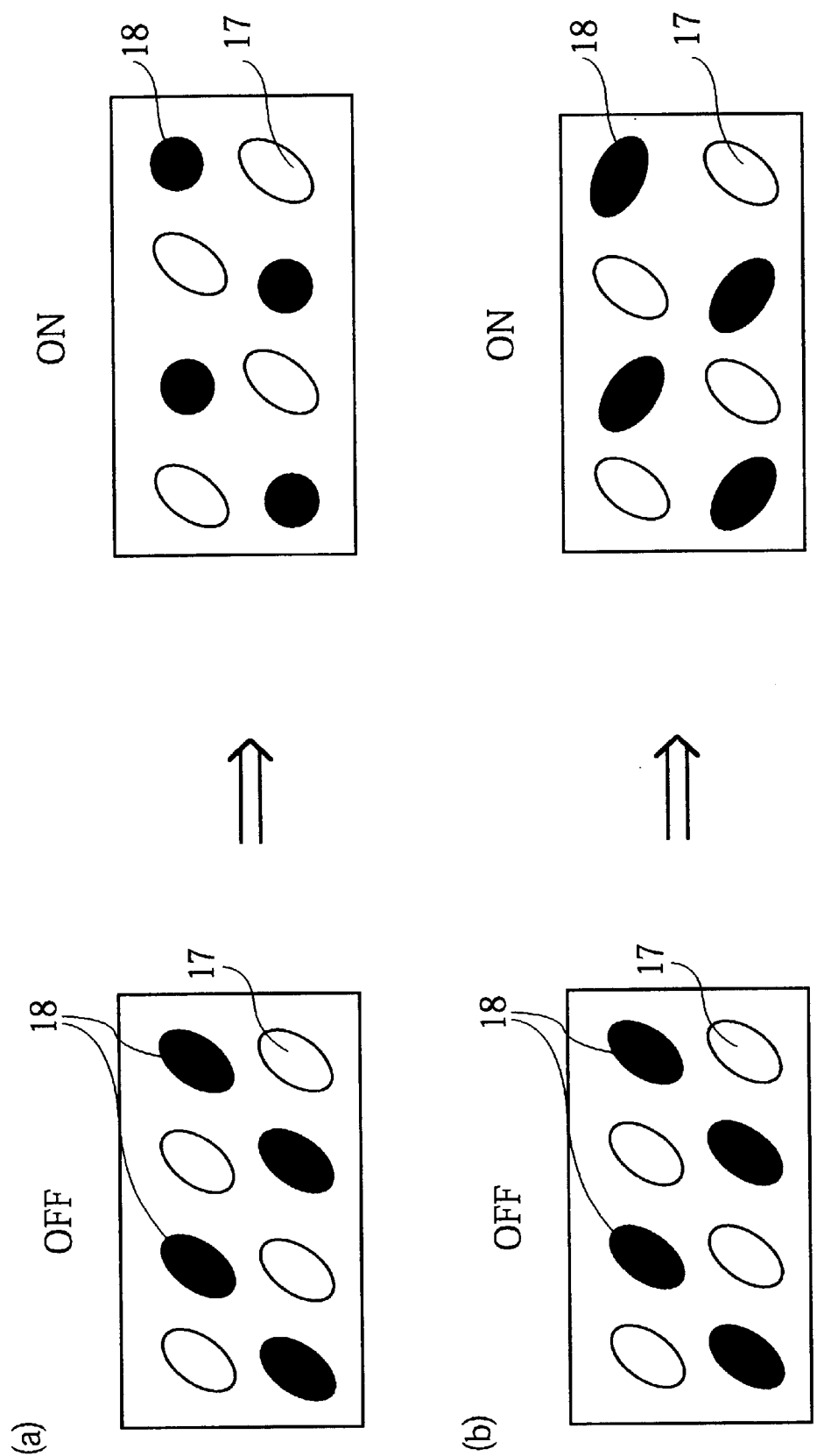
FIG. 7 is a view for describing a principle in which the present invention wherein a liquid crystal is rotated on a substrate plane has a higher scattering than a conventional case wherein a liquid crystal is aligned vertically to a substrate.

FIG. 7 is a view showing an alignment state of the liquid crystal 18 and the polymer 17, which is observed from the upper side. FIG. 7(*a*) shows the case of a conventional longitudinal electric field mode, and FIG. 7(*b*) shows the case of a lateral electric field mode in the present invention. In FIG. 7, the liquid crystal 18 indicates a liquid crystal molecule.

The intensity of scattering in a polymer dispersion type liquid crystal is determined by an absolute value of a difference in a refractive index between a liquid crystal and a polymer, an intensity of the birefringence of the liquid crystal and the polymer, and an angle formed by the axes of the liquid crystal and the polymer. Then, a larger difference in the refractive index between the liquid crystal and the polymer causes a higher scattering. A higher intensity of the birefringence of the liquid crystal and the polymer and a larger angle formed by the axial directions of them causes a higher scattering. An effect of the scattering in the latter is larger than the former.

In a display using a conventional longitudinal electric field mode, since the liquid crystal 18 is aligned in an electric field direction under an application of voltage, an absolute value of a refractive index of the liquid crystal 18 increases, and thereby a difference in the refractive index between the liquid crystal 18 and the polymer 17 increases. However, as shown in FIG. 7(*a*), in view of an orthogonal projection of a liquid crystal molecule on a plane parallel with the substrates, the apparent birefringence of the liquid crystal 18 decreases under an application of voltage. Since the liquid crystal 18 are aligned in a predetermined direction under no application of voltage, a direction of the birefringence of the liquid crystal 18 is the same as an axial direction of the polymer also under an application of voltage. Consequently, in a conventional display, a scattering resulting from an intensity and a direction of the birefringence of the liquid crystal and the polymer decreases greatly, and eventually the scattering performance of a panel is low.

Meanwhile, in the case of using a lateral electric field mode for displaying, as shown in FIG. 7(*b*), since the liquid crystal 18 rotates on a plane, an axial direction of the birefringence differs largely between the polymer 17 and the liquid crystal 18 under an application of voltage. Moreover, the birefringence of the liquid crystal 18 is always high. Consequently, although an absolute value of a difference in a refractive index between the liquid crystal 18 and the polymer 17 does not change, a scattering resulting from an intensity and a direction of the birefringence of the liquid crystal 18 and the polymer 17 increases, and eventually scattering performance of a panel is higher than a conventional display mode.

Figure 8:
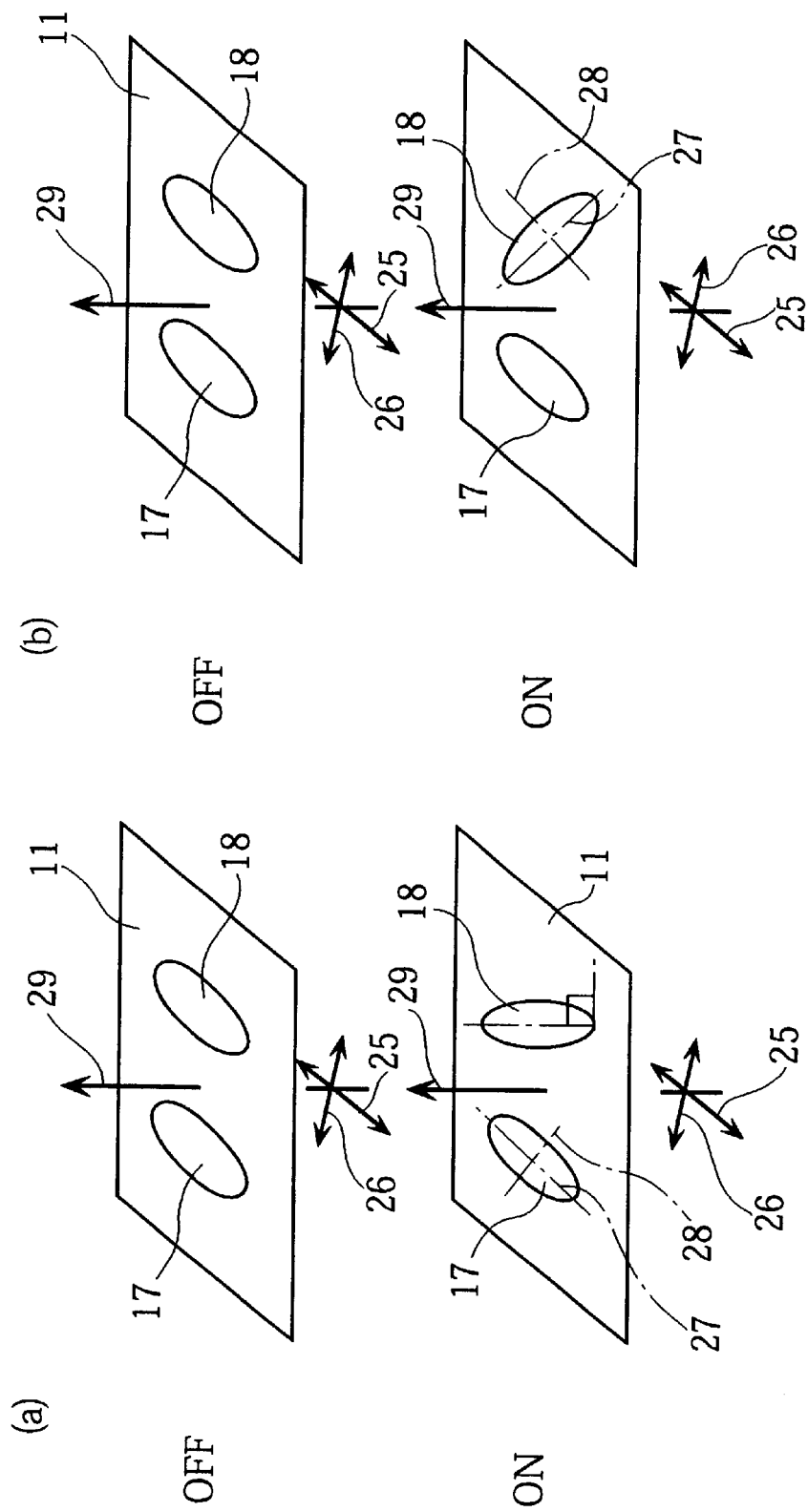
FIG. 8 is a view for describing a principle in which the present invention wherein a liquid crystal is rotated on a substrate plane has a higher scattering than a conventional case wherein a liquid crystal is aligned vertically to a substrate.

A difference in a display principle between the above-mentioned conventional longitudinal electric field and a lateral electric field of the present invention is described in further detail referring to FIG. 8. FIG. 8(*a*) shows an action of a liquid crystal and a polymer in the case of using a conventional longitudinal electric field, and FIG. 8(*b*) shows the action in the case of using a lateral electric field in the present invention. The liquid crystal 18 indicates a liquid crystal molecule, and in FIG. 7, 27 indicates an axial direction of an extraordinary refractive index, 28 indicates an axial direction of an ordinary refractive index, and 29 indicates a transmitted light.

The value of a phase shift $\phi$ of a transmitted light, which is a standard of a scattering intensity in a polymer dispersion type liquid crystal panel, is generally defined as the following Formula 1 (generalizing a description on page 225 of *Liquid Crystal Dispersions* written by P. S. Drzaic from World Scientific Co. Pte. Ltd. 1995).

$$\phi = |nliq - npol| \cdot K \cdot R \qquad \text{[Formula 1]}$$

In the formula, nliq indicates a refractive index of a liquid crystal against a polarized direction of an incident light, npol indicates a refractive index of a polymer against a polarized direction of an incident light, K indicates a wave number and R indicates an area of each liquid crystal domain.

The phase shift $\phi$ is a quantity depending on a difference in a refractive index between the liquid crystal and the polymer, and a higher value of $\phi$ causes a higher scattering intensity.

An incident light into a panel is generally expected in all polarized directions. However, the case of a linearly polarized light orthogonal to each other (polarized lights A and B in FIG. 8) is considered for simplicity. In FIG. 8, the polarized light A is polarized in a direction indicated by reference number 25, and the polarized light B is polarized in a direction indicated by reference number 26. A polarized direction 25 of the polarized light A is parallel with an axial direction 27 of an extraordinary refractive index, and a polarized direction 26 of the polarized light B is parallel with an axial direction 28 of an ordinary refractive index. In a conventional panel, only the liquid crystal 18 is aligned in a direction vertical to the substrate 10 in a scattering state under a voltage of ON (FIG. 8(*a*)). In a panel of the present invention, the polymer 17 and the liquid crystal 18 form an angle of approximately 90° in a scattering state (FIG. 8(*b*)). The value and sum of a phase shift $\phi$ against the polarized lights A and B are shown in the following Table 1.

TABLE 1

| polarized direction | a conventional panel | a panel of the present invention |
|---|---|---|
| A | $|n_o - n_e| \cdot K \cdot R$ | $|n_o - n_e| \cdot K \cdot R$ |
| B | $|n_o - n_o| \cdot K \cdot R$ | $|n_e - n_o| \cdot K \cdot R$ |
| total | $|n_o - n_e| \cdot K \cdot R$ | $2 \times |n_o - n_e| \cdot K \cdot R$ |

In Table 1, $n_o$ indicates an ordinary refractive index and $n_e$ indicates an extraordinary refractive index. It is presumed that $n_o$ and $n_e$ of a polymer are equal to those of a liquid crystal for simplicity.

In a conventional panel, since a liquid crystal molecule is aligned vertically in a scattering state, a refractive index of a polymer and a liquid crystal against the polarized light B is equalized to $n_o$ and a scattering does not occur. Meanwhile, in a panel of the present invention, since a polymer and a liquid crystal form an angle of approximately 90°, a phase shift exists against both of the polarized lights A and B. A sum of the phase shift in the present invention doubles as compared with the conventional panel. Therefore, in principle, when driven with a lateral electric field like the present invention, it is understood that scattering intensity doubles as compared with a conventional longitudinal electric field and a contrast increases greatly.

(2) The following function is obtained. That is, in the case of a lateral electric field mode, a driving voltage changes chiefly depending on a distance between driving electrodes. Consequently, the driving voltage does not increase largely even if a panel gap is increased. Meanwhile, when a panel gap is increased, scattering performance is improved largely since an optical length of light increases. Consequently, since the panel gap can be increased more than before by driving a polymer dispersion type panel with a lateral electric field mode, it is possible to intend a higher luminance, a higher contrast and a lower driving voltage.

(B) A function by satisfying d>L

In a conventional lateral electric field mode, a birefringence is utilized by using a nematic liquid crystal, and a display is executed by using a polarizer. Accordingly, an optical design of a panel is important. A gap between the electrodes is determined at usually 10 or 20 $\mu$m for securing a panel aperture ratio, and a panel gap is usually 3 to 7 $\mu$m in terms of an optical design for intending the decrease of a driving voltage. Therefore, when a gap between the electrodes is L ($\mu$m) and a panel gap is d ($\mu$m), d<L is satisfied in a conventional lateral electric field mode.

In a panel in a conventional lateral electric field mode, a display is executed with the use of a birefringence by rotating a liquid crystal in a homogeneous alignment with a lateral electric field. Consequently, a panel transmittance depends greatly on a panel gap, and an optimum range exits for obtaining a high transmittance. Then, a gap between the electrodes L ($\mu$m) and a panel gap d ($\mu$m) generally satisfies L>d. In the case of L=15 $\mu$m, a value of a panel transmittance in the case of changing the panel gap d is shown in the following Table 2. (M. Oh-e et al, *Liquid Crystals* '97, Vol. 22, No. 4, pp. 379 to 390)

TABLE 2

| panel gap d ($\mu$m) | 4.6 | 5.3 | 5.6 | 6.2 | 7.0 |
|---|---|---|---|---|---|
| transmittance (%) | 22 | 23 | 28 | 32 | 30 |

In a conventional lateral electric field mode, a panel gap d for maximizing a panel transmittance exists, and in this case, an optimum value is around 6.2 $\mu$m. Then, because of L=15 $\mu$m, L>d is generally satisfied in the past. If a gap between the electrodes L is formed below 6 $\mu$m, of course, L<d is satisfied. However, in this case, since it is necessary to form twice as many electrodes in the same area as the above, a pixel aperture ratio is made less than half of the above. Therefore, a panel transmittance is reduced greatly to less than half, and it is difficult to use this case practically. Thus, a design of L>d is essential to a panel in a conventional lateral electric field mode.

Meanwhile, in a conventional polymer dispersion type liquid crystal panel, it is a defect that the increase of a panel gap d for improving a scattering performance results in the increase of a driving voltage. However, in the case of driving a polymer dispersion type panel with a lateral electric field mode, since a driving electrode is on only one of the substrates, as described above, a driving voltage does not increase largely even if a panel gap d is above a gap between the electrodes L. A larger panel gap d causes a higher scattering performance and a higher contrast. Accordingly, in a polymer dispersion type panel, it is effective in intending a higher luminance and a higher contrast that the above-mentioned d and L satisfy L<d. Even if the gap between the electrodes L is decreased, the scattering performance does not change. Therefore, a lower driving voltage can be intended.

Thus, as described in the above-mentioned (A) and (B), in a liquid crystal display panel of Embodiment 1-1, it is possible to intend a higher luminance, a higher contrast and a lower power consumption of the panel.

Next, a method of manufacturing a liquid crystal display panel having the above-mentioned composition is described.

First, 1.5% of Irgacure 651 (trade name: manufactured by Ciba-Geigy Japan, Inc.) was added as a polymerization initiator to UV curable liquid crystal (manufactured by Dainippon Ink & Chemicals, Inc.) which is nematic at room temperature. A p-channel nematic liquid crystal E 44 (trade name: manufactured by Melc, Inc.) was mixed as another material of a liquid crystal so that a weight ratio of the E 44 to totality is 86%, and thus a liquid crystal composition was manufactured.

An active matrix substrate was obtained by manufacturing a driving electrode 7, an opposite electrode 8, a flattened layer 15, a signal line 6 and a scanning line 4 on a lower substrate 11 made of glass by using vacuum evaporation and etching. Then, the driving electrode 7 and the opposite electrode 8 were manufactured by using aluminum, and a width of the electrode was determined at 6 $\mu$m and a distance between adjacent electrodes (an electrode gap L) was determined at 10 $\mu$m. An electrode with a form shown in FIG. 3 was used as the electrode. An alignment layer 14 was cured with an oven after printing the alignment layer 14 on the lower substrate 11 by using a printing method. Optomer AL 1051 (trade name: manufactured by JSR Corp.) was used as the alignment layer 14. The alignment layer 14 is an alignment layer with a pretilt angle of 1.5° during alignment. The rubbing treatment was executed by using a nylon cloth in a direction at an angle of 10° with the driving electrode 7.

A similar alignment layer 14 was applied and cured also on an upper substrate 10 made of glass. The rubbing treatment was executed on the upper substrate 10 in a contrary parallel direction to a rubbing direction of the lower substrate 11. Later, the upper substrate 10 and the lower substrate 11 were stuck at a gap of 13 $\mu$m with a glass spacer. The above-mentioned liquid crystal composition was injected between the stuck substrates 10 and 11 by using vacuum injection, and the sealing was executed.

The UV curable liquid crystal was polymerized by irradiating ultraviolet rays to the above-mentioned panel for 400 seconds, and a polymer dispersion type liquid crystal panel in a reverse mode was manufactured When an intensity of the ultraviolet rays was measured with an illuminometer, the intensity was 30 m W/cm$^2$.

When a liquid crystal display panel thus manufactured by the above-mentioned method was observed with a polarizer, it was confirmed that an alignment state of the mixed nematic liquid crystal was a homogeneous alignment along a rubbing direction on the substrate. Since a cured section of the UV curable liquid crystal comprises a liquid crystalline polymer in its composition and thereby has a similar birefringence to the nematic liquid crystal, the panel was in a transparent state.

Next, electrooptic characteristics of a liquid crystal display panel manufactured by the above-mentioned method were measured in the following procedure.

A driver circuit was connected to the liquid crystal panel and TFT driving was executed. A panel transmittance was measured by applying a potential difference having a minimum of 0V and a maximum of 10V consecutively between the driving electrodes of the liquid crystal panel. The panel transmittance was measured with a liquid crystal evaluation device (LCD 5000 (trade name: manufactured by Otsuka Electronics, Inc.)).

When a liquid crystal molecule rotated on a substrate surface by applying an electric field, a scattering state was obtained by the increase of a difference in a refractive index between a cured section of the UV curable liquid crystal and a nematic liquid crystal. The nematic liquid crystal, which rotates on a substrate surface, maintains birefingence against an incident light. Therefore, the incident light was scattered regardless of a polarized direction of the incident light and a contrast was improved. Then, the contrast measured by a wavelength of 540 nm was 90. When a driving voltage V10 by which 10% of a maximum transmittance is obtained is made a standard of a driving voltage of a panel, the V10 was 15V.

A contrast and a V10 were measured after changing a rubbing direction. is shown in Table 3.

TABLE 3

| rubbing direction (°) | contrast | V10 (V) | evaluation |
| --- | --- | --- | --- |
| 0 | 125 | 16.5 | ⊚ |
| 5 | 110 | 16.1 | ⊚ |
| 10 | 102 | 15 | ⊚ |
| 20 | 84 | 14.5 | ○ |
| 45 | 73 | 14 | Δ |
| 60 | 52 | 13.2 | ▲ |
| 80 | 20 | 12 | × |

⊚: excellent,
○: good,
Δ: average,
▲: poor,
×: very poor

As clarified in Table 3, the doser a rubbing direction was to a driving the more a contrast was improved. The reason is that an angle, which by a nematic liquid crystal and a liquid crystalline polymer in a cured the UV curable liquid crystal, is dose to 90° under an application of voltage, thereby scattering performance is improved.

A contrast and a V10 were measured after changing a panel gap d while maintaining a distance between driving electrodes at 10 $\mu$m. The result is shown in Table 4.

TABLE 4

| panel gap ($\mu$m) | contrast | V10 (V) | evaluation |
| --- | --- | --- | --- |
| 8.2 | 50 | 14.3 | × |
| 10 | 75 | 14.5 | Δ |
| 13 | 102 | 15 | ⊚ |
| 15 | 150 | 15.5 | ⊚ |
| 20 | 210 | 16 | ⊚ |

⊚: excellent,
Δ: average,
×: very poor

It is approved in Table 4 that the increase of a panel gap d results in increasing scattering intensity and improving a contrast. Meanwhile, although a V10 also increases somewhat, a quantity of the increase of the V10 was less than the usual case of driving by an electric field between the opposite substrates. The reason is that, in a composition of the present invention, an electric field intensity which is applied to a liquid crystal depends mainly on a distance between electrodes and scarcely on a panel gap.

The reason why the increase of a panel gap d results in the increase of a V10 somewhat is described below. When a panel gap d increases, a distribution of an electric field occurs above and below the panel gap d and thereby an electric field near an upper substrate is reduced. Consequently, an even higher voltage is necessary for moving a liquid crystal near an upper substrate. It was proved through the above results that a panel with a high contrast is obtained without increasing a driving voltage V10 largely by driving a polymer dispersion type panel in a reverse mode with a lateral electric field mode.

In the above-mentioned example, although a cured section of the UV curable liquid crystal had a shape in which a part of the cured section is connected to each other, the cured section may have an independent shape. Although an alignment of the nematic liquid crystal was a homogeneous alignment, the alignment may be a twisted nematic alignment in which an alignment direction of a liquid crystal is twisted. In particular, when a twist angle is above 180°, an effect of increasing a randomness of an alignment direction of a nematic liquid crystal molecule and improving a scattering performance is produced on a plane parallel with a substrate under an application of voltage.

An electrode gap L is not limited to the above-mentioned examples and may be above 5 $\mu$m. The reason is that a shorter electrode gap L causes a lower driving voltage; however, in a transmission type panel, a short electrode gap L reduces a pixel aperture ratio and a long electrode gap L increases a driving voltage. A width of an electrode may be above 3 $\mu$m. The reason is that a large width of an electrode reduces a pixel aperture ratio, while a small width causes a nonuniform distribution of an electric field on a panel and thereby a uniform display can not be obtained.

A relation between a panel gap d and an electrode gap L is not limited to the above-mentioned examples, and when d>L is satisfied, it is possible to intend both the improvement of scattering intensity and a lower power consumption.

Figure 9:
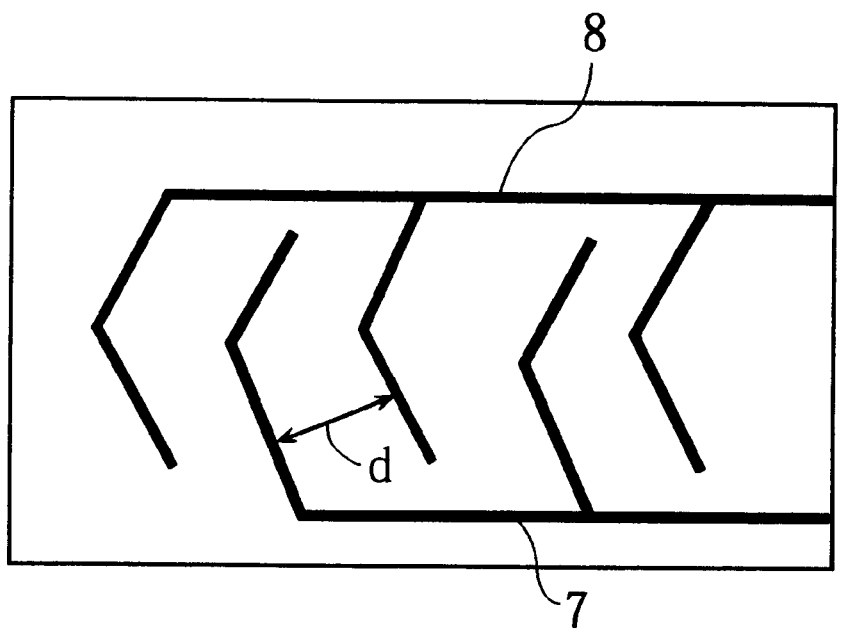
FIG. 9 is a view showing another variant example of a driving electrode and an opposite electrode.
Figure 10:
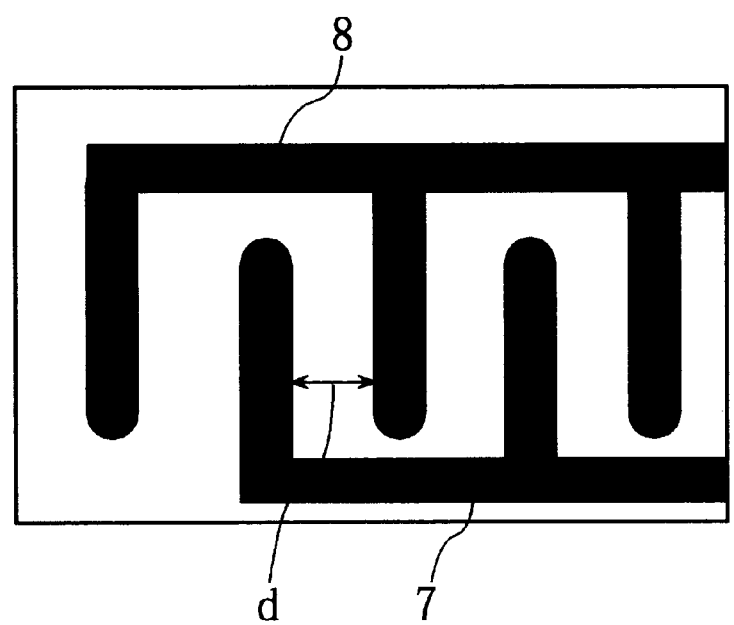
FIG. 10 is a view showing another variant example of a driving electrode and an opposite electrode.

It is possible to use an electrode, a comb-shaped part of which is bent as shown in FIG. 9 and a corner of which is roundish as shown in FIG. 10. In the case of a shape as shown in FIG. 9, under an application of voltage, a liquid crystal rotates in a reverse direction above and below the bent part and thereby a scattering state is obtained. Consequently, an angle, which is formed by an axis of a liquid crystal molecule and a polymer, gets more random on a plane, and thereby scattering was increased and a contrast was improved. In this case, an angle of the bent part may be above 90° and below 170°. In the case of a shape as shown in FIG. 10, under an application of voltage, since an electric field does not concentrate on the corner of an electrode, particularly, the corner of a tip of an electrode, the nonuniformity of an alignment of a liquid crystal was restrained at a tip of an electrode. Consequently, the scattering at a tip of an electrode increased and an effect of a uniform display was produced.

A rubbing direction of a substrate is not limited to the above-mentioned examples and may be above 0° and below 45°. A rubbing direction can be determined by a relation between a scattering performance and a driving voltage.

An alignment layer is not limited to the above-mentioned examples, and both polyimide type and polyamic acid type can be used. It is desirable to use an alignment layer wherein a pretilt angle of a liquid crystal is below 3° in an alignment of a liquid crystal. The reason is that the liquid crystal is affected by an electric field in a panel gap direction and thereby a scattering intensity is reduced if a pretilt angle is large.

A combination of a liquid crystal and a polymer is not limited to the above-mentioned examples, and it is possible to use a combination wherein, generally, a liquid crystal and a polymer are mixed and a polymer dispersion type liquid crystal display panel in a reverse mode is obtained by copolymerizing with ultraviolet rays. For instance, except the above, TL-202 and BL-007 (trade name: manufactured by Melc, Inc.) can be used as a liquid crystal, and such methacrylate-based polymer as biphenyl methacrylate can be used as a polymer. An intensity of ultraviolet rays and the necessary time for polymerizing are not limited to the above-mentioned examples, and can be determined according to a combination of a liquid crystal and a polymer.

(Embodiment 1-2)

Embodiment 1-2 is similar to the above-mentioned Embodiment 1-1. The point at which Embodiment 1-2 is different from Embodiment 1- 1 is that a liquid crystal with a negative dielectric anisotropy is substituted for a liquid crystal with a positive dielectric anisotropy, and an angle $\theta$ which is formed by comb-toothed electrodes 7A, 8A and an alignment treatment direction is determined within a range from 45 degrees or more to below 90 degrees. According to such a composition, like Embodiment 1, under an application of voltage, a scattering intensity can be increased by rotating a liquid crystal on a plane parallel with a substrate and increasing an angle formed by the liquid crystal and the polymer.

The reason for making the angle $\theta$ below 90 degrees is that there is a possibility that a nonuniform display is caused by a slight difference in an angle between a liquid crystal and an alignment treatment direction if the angle $\theta$ is made 90 degrees. Strictly, a liquid crystal is aligned not precisely in an alignment treatment direction, but in a direction which is slightly different in an angle from the alignment treatment direction. In addition, a liquid crystal is aligned in a vertical direction to an electric field direction because of using a liquid crystal with a negative dielectric anisotropy Accordingly, there is a possibility that a liquid crystal is not rotated on a plane parallel with a substrate when an alignment of a liquid crystal is slightly inclined in a longitudinal direction to a substrate plane. However, since the inclination in a longitudinal direction is slight, a liquid crystal is expected to be rotated on a plane approximately parallel with a substrate if the angle $\theta$ is below 90 degrees. Meanwhile, when the angle $\theta$ is 90 degrees and a liquid crystal is slightly inclined in the above-mentioned longitudinal direction, a liquid crystal has an angular displacement in a direction for standing up toward a plane vertical to a substrate under an application of voltage. Therefore, a nonuniform display is caused under an application of voltage.

Next, a liquid crystal display panel according to Embodiment 1-2 was manufactured by the following method. Basically, the liquid crystal display panel was manufactured by the same method as a manufacturing method in the above-mentioned Embodiment 1-1. However, in Embodiment 1-2, an angle of a rubbing direction on a substrate with an electrode was 80°. A liquid crystal with a negative dielectric anisotropy MJ951152 (trade name: manufactured by Melc, Inc.) was used so that a weight ratio of the liquid crystal to totality is 85%. The conditions of polymerizing were the same as Embodiment 1.

When optical characteristics of a liquid crystal display panel thus manufactured were measured, such a preferable display characteristic was obtained that a driving voltage V10 was 16V and a contrast was 90. Even if a panel gap increases, a driving voltage does not increase. Both high scattering and the reduction of a driving voltage were achieved.

When a liquid crystal display panel was manufactured on condition that an angle of a rubbing direction is above 45° and below 90° besides the above, both high scattering and the reduction of a driving voltage were achieved.

(Embodiment 1-3)

Embodiment 1-3 is similar to the above-mentioned Embodiment 1-1. The point at which Embodiment 1-3 is different from Embodiment 1 is that a twisted nematic alignment is substituted for a homogeneous alignment as a liquid crystal alignment in a polymer dispersion type liquid crystal layer. In the case of such a twisted nematic alignment, under no application of voltage, the liquid crystal 18 and the polymer 17 adjacent to the liquid crystal, which composes an interface, are aligned in the same direction on a plane parallel with a substrate and aligned in a state in which they are twisted between the substrates 10, 11. Accordingly, under no application of voltage, a transparent state is obtained. Under an application of voltage, the liquid crystal 18 rotates on a plane parallel with the substrates, and the polymer 17 and the liquid crystal 18 are aligned in a state of forming an angle, and a scattering state is obtained. Therefore, also in the case of Embodiment 1-3, a scattering intensity like Embodiment 1-1 is obtained and an effect like Embodiment 1-1 is produced.

For reference, in the case of a twisted nematic alignment, it is an advantage that a viewing angle under no application of voltage is larger than the case of a homogeneous alignment. Meanwhile, in the case of a homogeneous alignment, the scattering under an application of voltage is higher than the case of a twisted nematic alignment; therefore, it is an advantage that the luminance of a white display is higher than the case of a twisted nematic alignment.

(Embodiment 1-4)

Embodiment 1-4 is similar to Embodiment 1-2. The point at which Embodiment 1-4 is different from Embodiment 1-2 is that a twisted nematic alignment is substituted for a homogeneous alignment as a liquid crystal alignment in a polymer dispersion type liquid crystal layer. According to such a composition, an effect similar to Embodiment 2 is produced.

(Embodiment 1-5)

Figure 11:
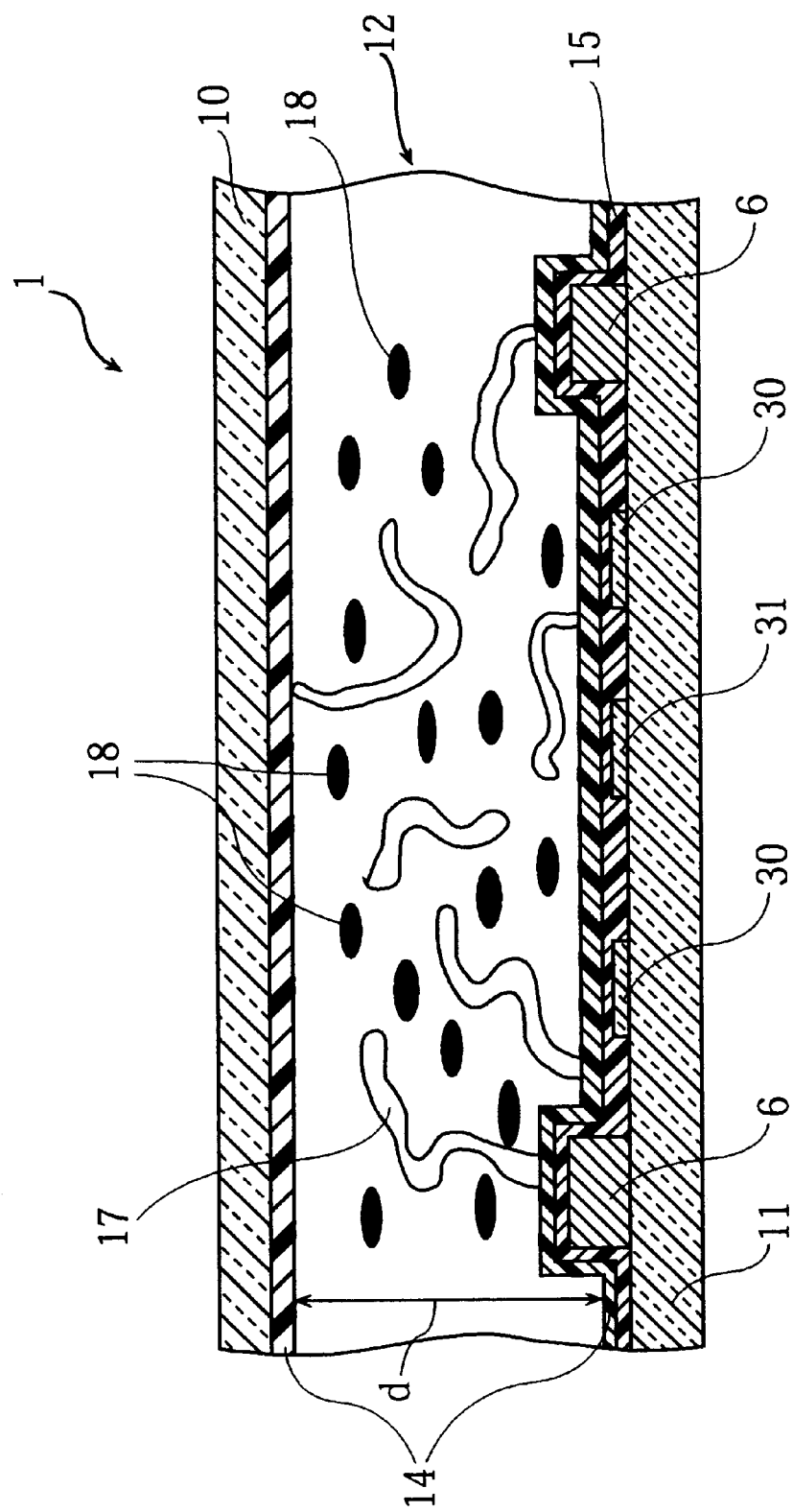
FIG. 11 is a cross sectional view of a liquid crystal display panel according to Embodiment 1-5.

FIG. 11 is a cross sectional view of a liquid crystal display panel according to Embodiment 1-5. Embodiment 1-5 is similar to Embodiment 1-1 and the same reference number is given for a corresponding part. The point at which Embodiment 1-5 is different from Embodiment 1-1 is that the driving electrode 7 and the opposite electrode 8 is made transparent electrodes 30, 31 respectively. A conventional lateral electric field mode uses such an opaque electrode as an aluminum plate for a driving electrode. This is because a uniform display can not be obtained since a liquid crystal right above the electrode does not move by an electric field or is distorted nonuniformly by an electric field nonuniformity at an end of the electrode.

Meanwhile, in a polymer dispersion type liquid crystal panel, it is not always necessary that an electrode is opaque since an electric field nonuniformity at an end of the electrode is useful for the cause of scattering. As a characteristic of scattering mode, a slight nonuniformity of scattering characteristic right above the electrode or at an end of the electrode is averaged in the whole scattering, and thereby does not cause display irregularity. Consequently, in the case of using a polymer dispersion type liquid crystal panel with a lateral electric field mode, a transparent electrode can be used as an electrode. Then, an electrode width below 6 $\mu$m is effective in uniformizing the display since a liquid crystal right above the electrode indicates scattering by an electric field nonuniformity at an end of the electrode. In this case, the reduction of a pixel aperture ratio, a low luminance and the increase of power consumption, which are the problems in a conventional lateral electric field mode, do not occur, and it is possible to actualize a panel with extremely high pixel aperture ratio and luminance.

Next, a contrast and a luminance of a liquid crystal display panel having the above-mentioned composition were measured while changing a width of the electrode. The result is shown in Table 5. The conditions of an experiment were as follows:

①. A transparent electrode, ITO (indium titanium oxide) electrode, was used for the driving electrode 7 and the opposite electrode 8.
②. A panel gap was determined at 15 $\mu$m, an electrode gap was determined at 10 $\mu$m.
③. A width of the electrode was determined at five kinds of 2 $\mu$m, 4 $\mu$m, 6 $\mu$m, 8 $\mu$m and 10 $\mu$m.

TABLE 5

| a width of an electrode ($\mu$m) | contrast | luminance (cd/cm$^2$) | evaluation |
|---|---|---|---|
| 2 | 120 | 280 | ⊚ |
| 4 | 105 | 300 | ⊚ |
| 6 | 80 | 350 | ○ |
| 8 | 40 | 400 | × |
| 10 | 20 | 600 | × |

⊚: excellent,
○: good,
×: very poor

As clarified in Table 5, since an electrode is a transparent electrode, a pixel aperture ratio increased largely to 70% as compared with 30% formerly. Consequently, a panel luminance in a white display under no application of voltage was 2.3 times as high as before and thereby an extremely bright white display was obtained. In a black display under an application of voltage, since an electric field nonuniformity at an end of the electrode affects an area right above the electrode due to an electrode width below 6 $\mu$m, the scattering occurred in a liquid crystal right above the electrode. Therefore, a contrast was above 70 and a preferable display was obtained. Meanwhile, in the case of an electrode width above 7 $\mu$m, an electric field nonuniformity at an end of the electrode does not affect an area right above the electrode sufficiently and a part of an area right above the electrode indicated transparency. Therefore, a contrast was reduced and a preferable display was not obtained.

The above-mentioned example was applied to a transmission type panel and was applicable to a direct-vision type panel and a reflection type panel, and a similar effect was obtained. A panel gap may be other values than the above. When an electrode width is large, a panel gap should be large. A large panel gap increases scattering inside a panel and brings an effect of improving a contrast.

(Embodiment 1-6)

Figure 12:
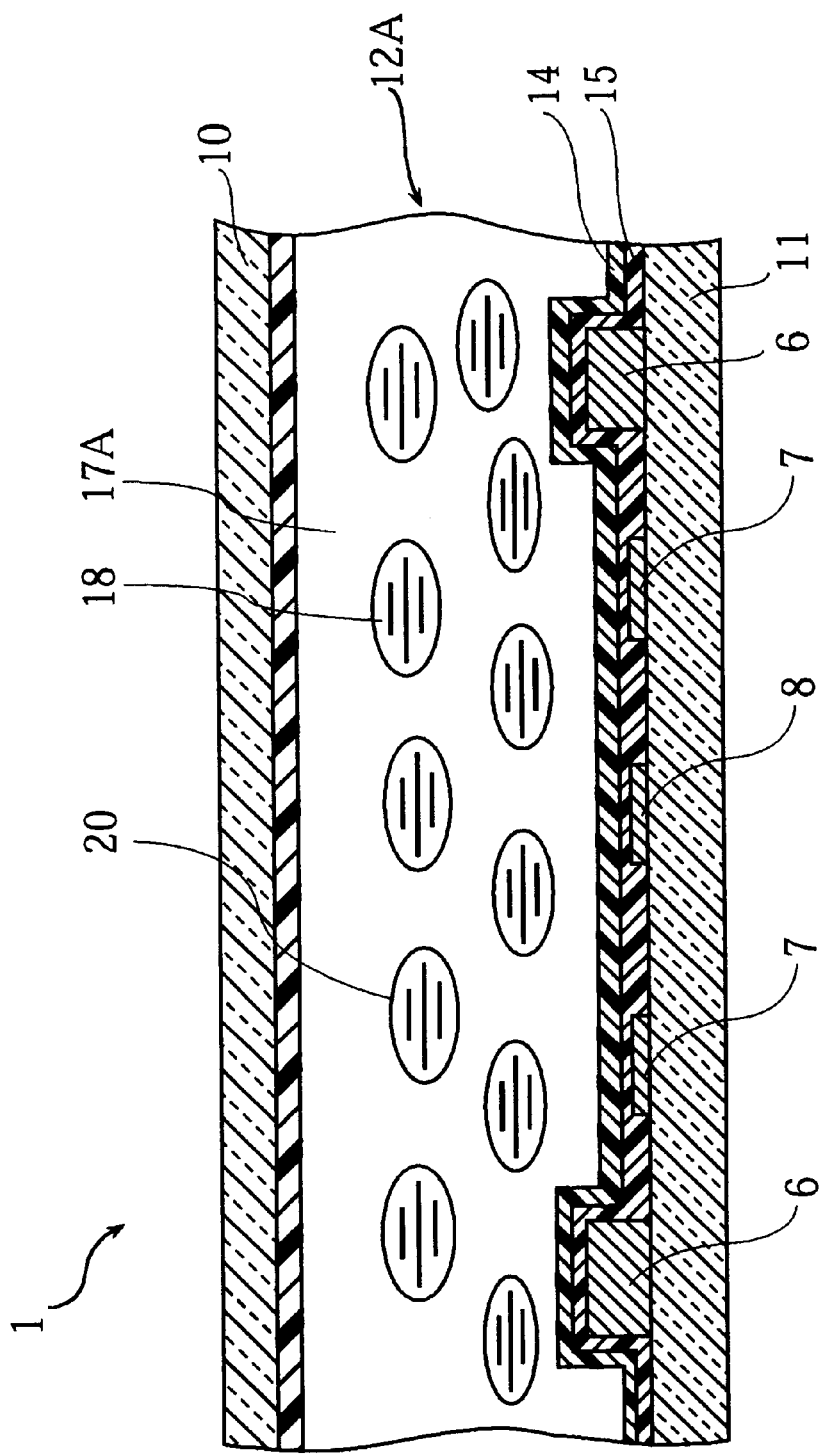
FIG. 12 is a cross sectional view of a liquid crystal display panel according to Embodiment 1-6.

FIG. 12 is a cross sectional view of a liquid crystal display panel according to Embodiment 1-6. Embodiment 1-6 is similar to Embodiment 1-1 and the same reference number is given for a corresponding part. In Embodiment 1-6, a polymer dispersion type liquid crystal layer 12A has a lower ratio of a liquid crystal to a polymer than Embodiment 1-1, and a structure in which the liquid crystal is a liquid crystal droplet and the liquid crystal droplet 20 is dispersed into a polymer 17A. The polymer 17A used in Embodiment 1-6 is different from the polymer 17 used in the above-mentioned Embodiment 1-1, and is a polymer which is not liquid crystalline. If a liquid crystalline polymer is used in Embodiment 1-6, the liquid crystalline polymer restrains scattering even more.

In polymerizing the polymer 17A, since the polymer 17A is polymerized while applying an electric field in a direction parallel with the substrate 10, the liquid crystal droplet 20 has an oblate shape, long in a direction parallel with the substrate 10 and short in a direction of a panel gap. A liquid crystal in the liquid crystal droplet 20 is aligned approximately in parallel with the substrates 10 and in approximately the same direction on a plane parallel with the substrate 10. A liquid crystal with a negative dielectric anisotropy is used as the liquid crystal 18.

According to the above-mentioned composition, a polymer dispersion type liquid crystal panel in a reverse mode can be driven with a lateral electric field mode.

Figure 13:
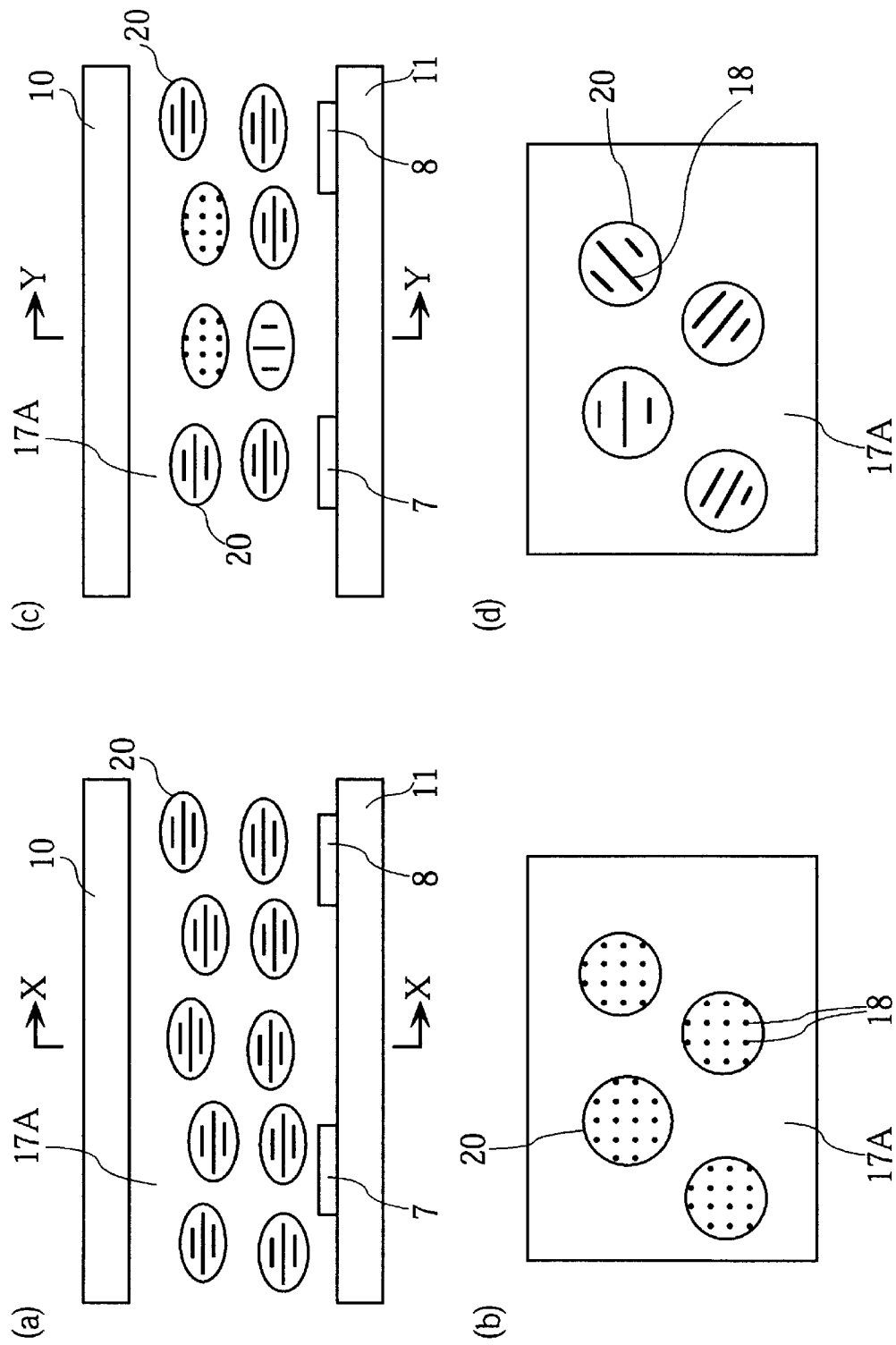
FIG. 13 is a view for describing a display principle in Embodiment 1-6.

A display principle in Embodiment 1-6 is described referring to FIG. 13. FIG. 13(*a*) is a cross sectional view of a display panel under no application of voltage, FIG. 13(*b*) is a cross sectional view taken along the line X—X in FIG. 13(*a*), FIG. 13(*c*) is a cross sectional view of a display panel under an application of voltage and FIG. 13(*d*) is a cross sectional view taken along the line Y—Y in FIG. 13(*c*). Under no application of voltage, as shown in FIG. 13(*a*) and FIG. 13(*b*), the liquid crystal 18 in the liquid crystal droplet 20 is aligned approximately in parallel with a substrate and in approximately the same direction on a plane parallel with a substrate. Accordingly, light scattering between the liquid crystal droplets 20 does not occur and a panel in a transparent state is obtained.

Figure 14:
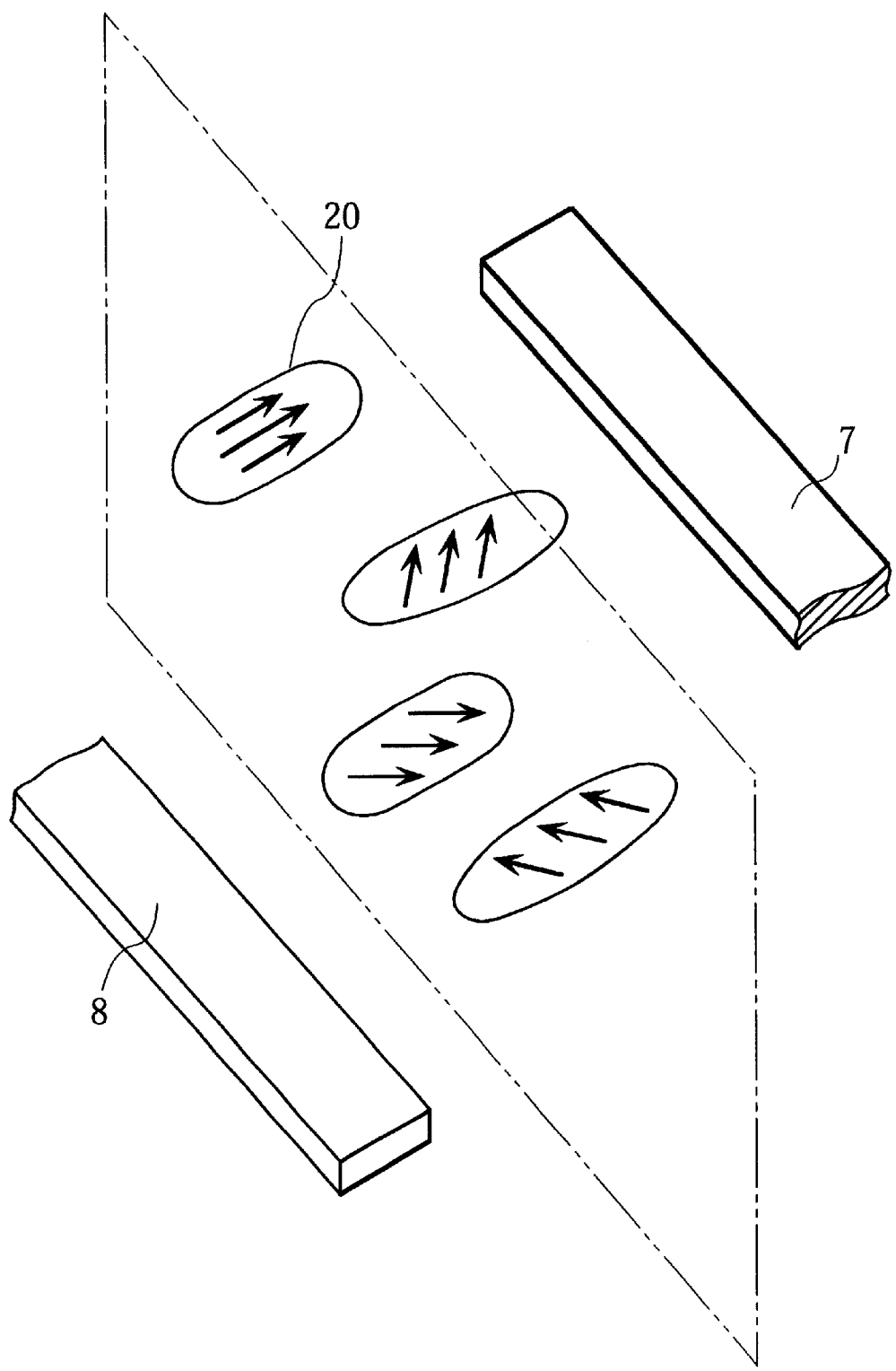
FIG. 14 is a perspective view showing an alignment of a liquid crystal droplet under an application of voltage in Embodiment 1-6.
Figure 15:
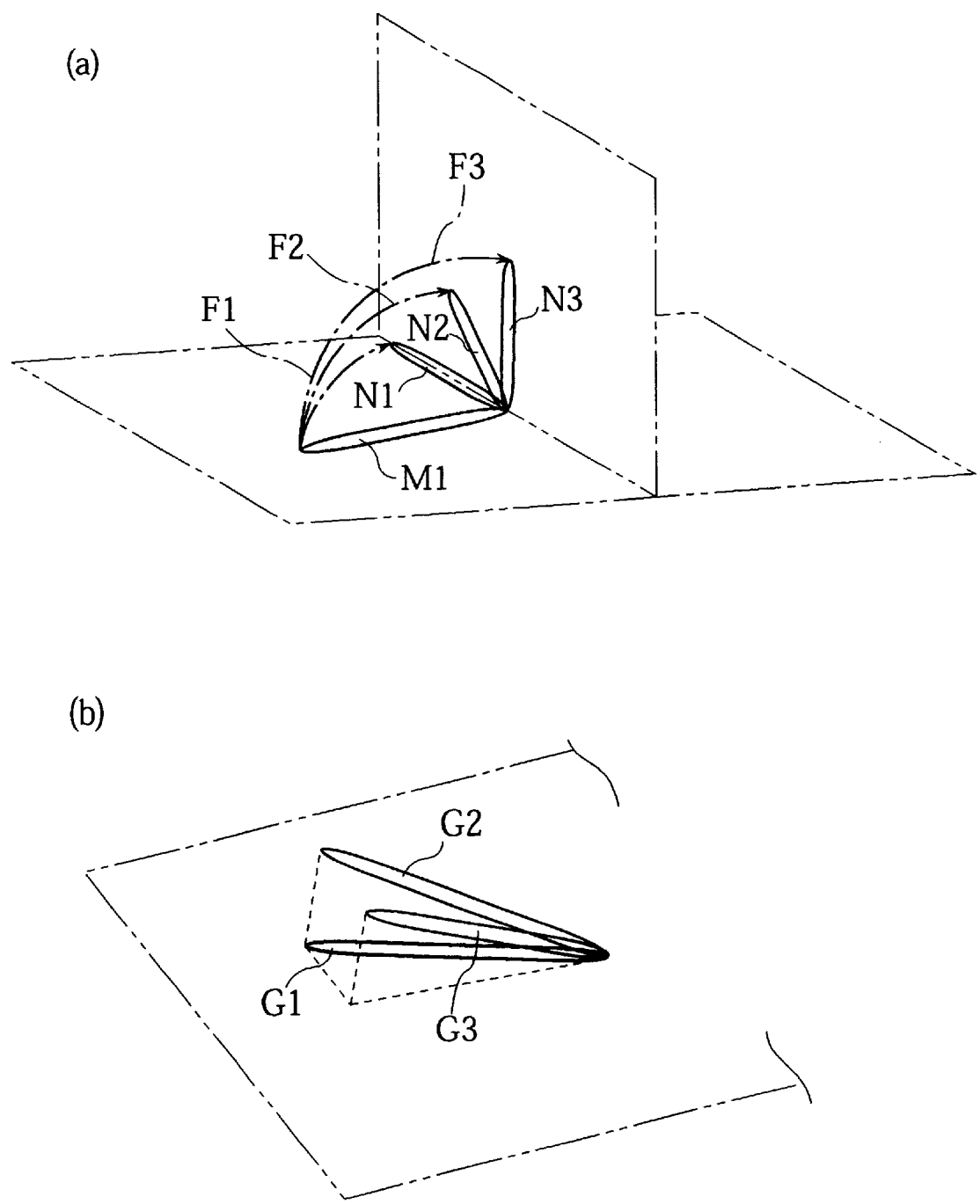
FIG. 15 is a view for describing a principle of an alignment of a liquid crystal droplet under an application of voltage in Embodiment 1-6.

Under an application of voltage, since a dielectric anisotropy of the liquid crystal 18 is negative, as shown in FIG. 13(*c*) and FIG. 13(*d*), the liquid crystal in the liquid crystal droplet is aligned on a plane parallel with a panel gap direction and aligned at random on the parallel plane as clearly shown in FIG. 14. The reason for such an alignment is described below. An energy necessary for an inclination of a major axis of the liquid crystal in a direction vertical to an electric field direction does not depend on an azimuth angle and is equivalent in all directions. For instance, as shown in FIG. 15(*a*), when a liquid crystal molecule in a state M1 on a horizontal plane has an angular displacement to a vertical plane, an energy necessary for an angular displacement is equal even in the case of an angular displacement to any of three states N1, N2 and N3 on a vertical plane. Meanwhile, even if a liquid crystal is aligned in the same direction, strictly all liquid crystal molecules are aligned not precisely in an alignment treatment direction, but at each liquid crystal droplet in a direction which is slightly different in an angle from the alignment treatment direction. In this case, a liquid crystal molecule has an angular displacement through a path based on a direction of the slight difference in an angle so as to select a path for a minimum energy. For instance, when a liquid crystal molecule is in a state G1 in which a direction of the liquid crystal molecule is different horizontally from the alignment treatment direction (refer to FIG. 15(*b*)), the liquid crystal molecule has an angular displacement through a path F1 to a state N1. When a liquid crystal molecule is in a state G2 in which a direction of the liquid crystal molecule is different diagonally from the alignment treatment direction (refer to FIG. 15(*b*)), the liquid crystal molecule has an angular displacement through a path F2 to a state N2. When a liquid crystal molecule is in a state G3 in which a direction of the liquid crystal molecule is different upward from the alignment treatment direction (refer to FIG. 15(*b*)), the liquid crystal molecule has an angular displacement through a path F3 to a state N3. Eventually an alignment direction of the liquid crystal 18 in the liquid crystal droplet 20, as clearly shown in FIG. 14, is disposed at random on a plane parallel with a panel gap direction by such an angular displacement of a liquid crystal molecule under an application of voltage. Therefore, the panel obtains a scattering state. Thus, when the liquid crystal is disposed at random in the panel gap direction, the scattering effect of a light crossing diagonally to the panel gap direction gets very high. Consequently, a panel with a high scattering characteristic can be actualized under an application of voltage.

In Embodiment 1-6, in order to align a liquid crystal in the liquid crystal droplet 20 approximately in parallel with the substrates and in an approximately same direction on a plane parallel with the substrates, a liquid crystal droplet is formed by applying an electric field in a direction parallel with the substrates while polymerizing. However, the present invention is not limited to such an application of an electric field. If it is possible to align a liquid crystal in the liquid crystal droplet 20 approximately in parallel with the substrates and in an approximately same direction on a plane parallel with the substrates, other methods may be used. Therefore, a shape of a liquid crystal droplet is not limited to Embodiment 1-6 and may be a shape according to a method for obtaining the above-mentioned alignment of a liquid crystal.

Next, a method of manufacturing a liquid crystal display panel having the above-mentioned composition is described. 1% of Irgacure 651 (trade name: manufactured by Ciba-Geigy Japan, Inc.) was added as a polymerization initiator to 89% of a polymeric monomer (2-ethylhexyl acrylate) and 9% of an oligomer (Biscoat 828, manufactured by Osaka Organic Chemical Industry, Inc.). An n-channel nematic liquid crystal MJ951152 (trade name: manufactured by Melc, Inc.) as another material of a liquid crystal was mixed so that a weight ratio of the liquid crystal to totality is 74%, and thus a liquid crystal composition was manufactured.

An array substrate was obtained by manufacturing an electrode and the like with the same method as Embodiment 1-1. Optomer AL 8534 (trade name: manufactured by JSR Corp.) was used as the alignment layer 14. The alignment layer 14 is an alignment layer with a pretilt angle of 8° during alignment. A similar alignment layer 14 was applied and cured on an upper substrate 10. The rubbing treatment on the upper substrate 10 and the lower substrate 11 was executed in a vertical direction to the driving electrode 7 and the opposite electrode 8. Later, the upper substrate 10 and the lower substrate 11 were stuck at a gap of 13 μm with a glass spacer. The above-mentioned liquid crystal composition was injected between the stuck substrates 10 and 11 by using vacuum injection, and the sealing was executed.

After polymerizing a part of a polymer in a network by irradiating ultraviolet rays with an intensity of 90 mW/cm$^2$ for 8 seconds while applying an electric field to the above-mentioned panel in parallel with a substrate and in a direction between the electrodes, a polymer dispersion type liquid crystal display panel was manufactured by polymerizing the polymer completely through an irradiation of ultraviolet rays with an intensity of 200 mW/cm$^2$ for 30 seconds.

When a liquid crystal display panel manufactured by the above-mentioned method was observed, a formed liquid crystal droplet had an oblate shape, long in a direction parallel with the substrate since an electric field was applied in irradiating the first ultraviolet rays. A liquid crystal in the liquid crystal droplet was aligned approximately in parallel with the substrates and in approximately the same direction (a direction between the electrodes) on a plane parallel with the substrate. A liquid crystal near the substrate was aligned in a direction between the electrodes along a rubbing direction. Therefore, a panel under no application of voltage was in a transparent state.

Under an application of voltage, a liquid crystal molecule rotated and was aligned at random in a plane parallel with a panel gap, whereby a scattering state was obtained.

When optical characteristics of the panel were measured, a driving voltage V10 was low, 10V. Such a preferable display was obtained that and a contrast was high, 80.

The above-mentioned example is applied to a transmission type panel and is applicable to a direct-vision type panel and a reflection type panel, and a similar effect is obtained. In this example, a scattering against a diagonal incident light increased largely. Consequently, when this example was used for a reflection type panel, a contrast was increased. When an incident light from outside enters at an incident angle of 30°, a front contrast was 15 and a preferable display was obtained.

(Embodiment 1-7)

Figure 16:
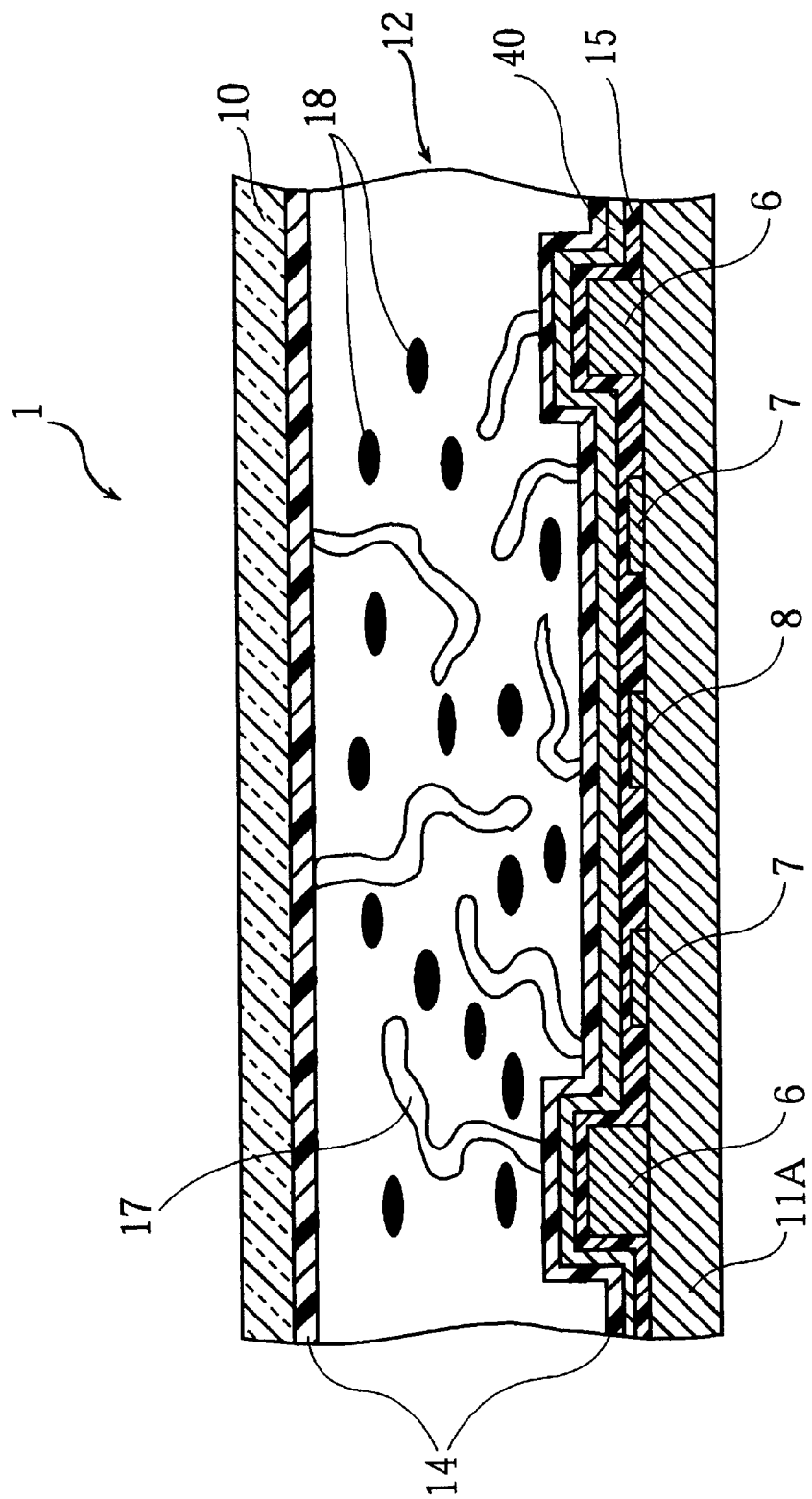
FIG. 16 is a cross sectional view of a liquid crystal display panel according to Embodiment 1-7.

FIG. 16 is a cross sectional view of a liquid crystal display panel according to Embodiment 1-7. The point at which Embodiment 1-7 is different from Embodiment 1-1 is that an opaque substrate 11A is substituted for the lower transparent substrate 11, and a reflection layer 40 is provided between an alignment layer 14 and a flattened layer 15. Thus, a reflection type and polymer dispersion type panel is obtained.

Embodiment 1-7 is described concretely below referring to FIG. 16. Embodiment 1-7 is characterized by a reflection type and polymer dispersion type panel wherein an opaque substrate is obtained by forming a reflection layer 40 on the lower substrate 11 of the polymer dispersion type panel 1. An insulated reflection layer with multiple layers of dielectric film was used as the reflection layer 40.

In the case of a reflection type and polymer dispersion type panel in a lateral electric field mode, since a nonuniform electric field occurs at an end of the electrode and inside the electrode, under an application of voltage, a scattered light occurred inside the electrode and a white display was obtained. Consequently, a substantial panel aperture ratio was extremely high as compared with a lateral electric field mode using usual nematic liquid crystal and polarizer. A panel aperture ratio in a usual lateral electric field mode is approximately 30%, while a panel aperture ratio in the case of driving a reflection type and polymer dispersion type liquid crystal with a lateral electric field mode was substantially over 60%, and additionally, an extremely bright white display was obtained because of no polarizers. For the same reason as the above-mentioned embodiment, even if a panel gap increased, a driving voltage did not increase largely. In the case of an incident angle of 30°, a contrast to an incident light from outside was 20 and thereby a higher contrast and the reduction of a driving voltage were actualized.

An opaque substrate is not limited to the above-mentioned examples and may be an opaque substrate which is generally used for a reflection type liquid crystal panel. Another reflection layer may be formed or disposed on the backside of a substrate by using a transparent substrate. A reflection layer may be formed on a crystalline silicon substrate. A reflection layer may be an insulated or high-resistance reflection layer besides the above. Then, resistivity is desirably above $10^9$ Ω·cm. According to a reflection layer with such a composition, a lateral electric field between the electrodes is formed uniformly and thereby a preferable display is obtained.

(Embodiment 1-8)

Although the above-mentioned Embodiments 1-1 to 1-7 are liquid crystal panels in a reverse mode, Embodiment 1-8 differs in a liquid crystal panel in a normal mode.

Embodiment 1-8 is basically similar to Embodiment 1-6 in a reverse mode. That is, a polymer dispersion type liquid crystal layer in Embodiment 1-8 has a structure in which a liquid crystal droplet is dispersed into a polymer. The polymer is a polymer which is not liquid crystalline because of the same reason as Embodiment 6, and a dielectric anisotropy of the liquid crystal is positive. However, such an application of an electric field while polymering as Embodiment 6 is not executed, and the polymer dispersion type liquid crystal layer is manufactured by a usual polymerization. Therefore, the liquid crystal droplet is globular and the liquid crystal in the liquid crystal droplet is aligned in a three-dimensionally random direction. Accordingly, under no application of voltage, a scattering state is obtained.

In the case of driving with a lateral electric field mode, since an alignment axis of a liquid crystal is aligned in a direction parallel with a substrate, a scattering state is shifted to a transparent state. Thus, according to the above-mentioned composition, it is possible to execute a switching of a scattering state and a transparent state even if a polymer dispersion type liquid crystal panel in a normal mode is driven with a lateral electric field mode.

An alignment treatment may be executed on upper and lower substrates so that an alignment layer is formed on the substrates and a liquid crystal is aligned along a direction between a driving electrode and an opposite electrode on the substrates. Thus, an effect of improving a luminance in a transparent state is obtained. Since a liquid crystal, which is fixed firmly on the substrate with the alignment layer, does not move by an electric field, an alignment direction differs between a liquid crystal on the alignment layer and a liquid crystal right above the liquid crystal on the alignment layer under an application of voltage if an alignment treatment is not executed. Consequently, under an application of voltage, a scattering state remains and a luminance is reduced. By means of executing an alignment treatment, since alignment directions of a liquid crystal on the alignment layer and a liquid crystal right above the liquid crystal on the alignment layer are the same as a direction between the electrodes under an application of voltage, a panel with a high luminance is obtained.

Next, a method of manufacturing a liquid crystal display panel having the above-mentioned composition is described. A liquid crystal composition was manufactured by mixing a polymeric monomer, an oligomer, a polymerization initiator and a p-channel nematic liquid crystal. A weight ratio of the liquid crystal to totality is 74%. Next, a lower substrate was manufactured by the same method as Embodiment 1. An electrode gap L on the lower substrate was determined at 10 $\mu$m. After applying and curing an alignment layer on the lower substrate, rubbing treatment was executed along a direction between a driving electrode and an opposite electrode on the lower substrate. After forming an alignment layer also on an upper substrate, an alignment treatment was executed in parallel with an alignment treatment direction of the lower substrate.

After sticking the upper and lower substrates at a panel gap d of 13 $\mu$m with a spacer, the liquid crystal composition was injected and the sealing was executed. A polymer dispersion type panel in a normal mode was manufactured by polymerizing the monomer through an irradiation of ultraviolet rays to the above-mentioned panel.

When optical characteristics of the manufactured liquid crystal display panel were measured, a driving voltage V10 was low, 9.8V. Such a preferable display was obtained that a contrast was high, 95.
(Embodiment 1-9)

Figure 17:
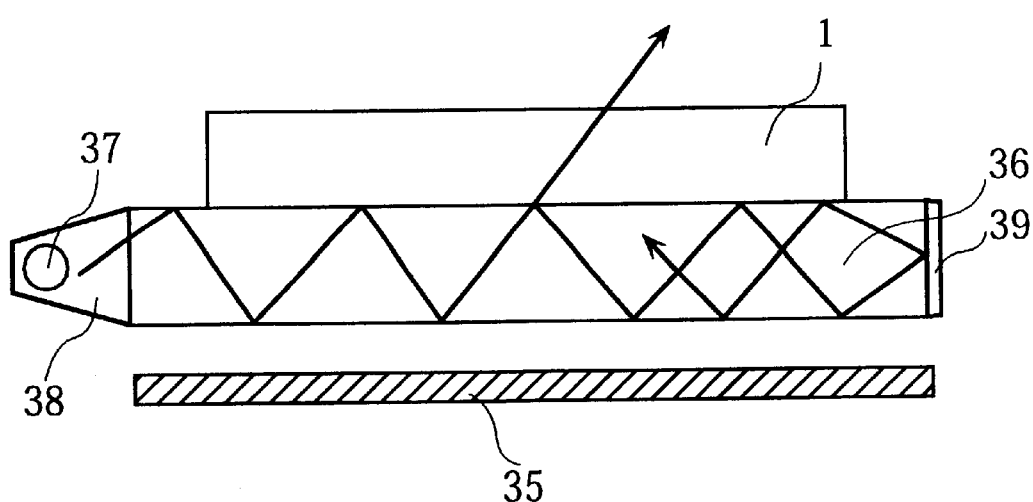
FIG. 17 is a cross sectional view of a liquid crystal display panel according to Embodiment 1-9.

FIG. 17 is a cross sectional view of a liquid crystal display panel according to Embodiment 1-9. Embodiment 1-9 is an example wherein the liquid crystal panel 1 of the above-mentioned Embodiment 1-1 is applied to a direct-vision type panel. Embodiment 1-9 is described below referring to FIG. 17. A direct-vision type and polymer dispersion type panel was manufactured by disposing a light absorber plate 35, a light guide plate 36, a light source 37 and the like behind the polymer dispersion type panel 1 described in Embodiment 1-1. A black plate was used as the light absorber plate 35. The light guide plate 36 was made of acrylic resin. A direct-vision type and polymer dispersion type panel was obtained by guiding a light from the light source 37 to the light guide plate 36 and matching the polymer dispersion type panel 1 with the light guide plate 36 optically. In this case, a black display was obtained by the light absorber plate 35 behind in a transparent state under no application of voltage, and a white display was obtained in a scattering state under an application of voltage.

Next, when an electrode gap L was 10 $\mu$m and a panel gap d was 15 $\mu$m, the characteristics of the above-mentioned direct-vision type and polymer dispersion type panel were evaluated. In this case, since the panel gap d was large, scattering performance was high and a white display with a high luminance was obtained. Meanwhile, since an electrode gap L was 10 $\mu$m, a driving voltage V10 was low, 15V Consequently, a preferable transparent state was obtained under no application of voltage and a distinctly black display was obtained. A contrast was high, 30 and thereby a display equivalent to paper white was obtained.

A composition of a direct-vision type and polymer dispersion type panel is not limited to the above-mentioned examples and may be a composition of a direct-vision type and polymer dispersion type panel in a reverse mode. A color display may be executed with the use of a color filter.
(Embodiment 1-10)

Figure 18:
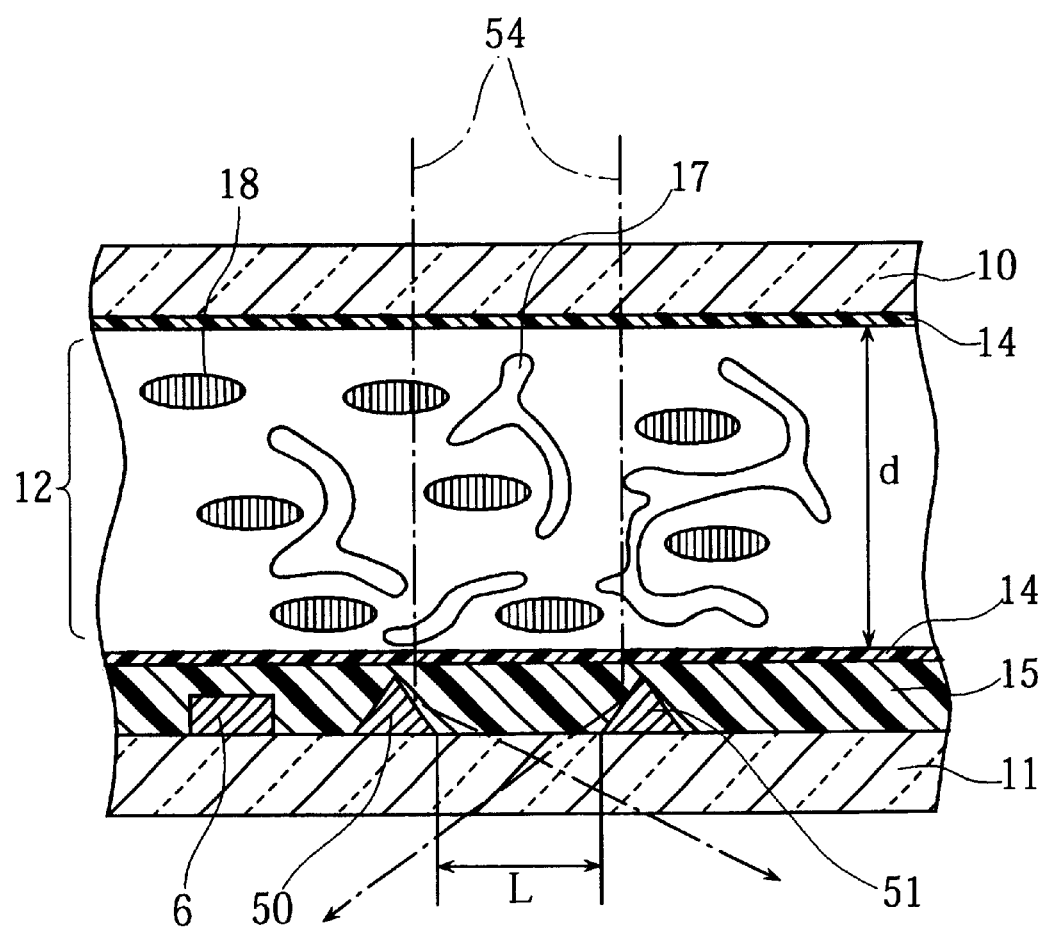
FIG. 18 is a cross sectional view of a liquid crystal display panel according to Embodiment 1-10.

FIG. 18 is a cross sectional view of a polymer dispersion type liquid crystal display panel according to Embodiment 1-10. Embodiment 1-10 is similar to Embodiment 1-1, and a detailed description is omitted by giving the same reference number for a corresponding part. In Embodiment 1-10, a driving electrode 50 and an opposite electrode 51 are substituted for the driving electrode 7 and the opposite electrode 8 in Embodiment 1-1, respectively. A cross sectional form of the driving electrode 50 and the opposite electrode 51 is a triangular form, unlike the driving electrode 7 and the opposite electrode 8 having a rectangular cross sectional form. Except this point, Embodiment 1-10 has a similar composition to Embodiment 1-1.

By using such the driving electrode 50 and the opposite electrode 51, under no application of voltage, an incident light 54 into a panel is reflected on the side of the driving electrode 50 and the opposite electrode 51, and is emitted from an aperture between the electrodes. Consequently, under no application of voltage, the light which transmits through a panel increases and a higher luminance can be intended.

In Embodiment 1-10, like Embodiment 1, when a panel gap d and a gap between the electrodes L satisfy d>L, it is possible to intend a higher luminance, a higher contrast and a lower power consumption.

Next, a method of manufacturing a liquid crystal display panel having the above-mentioned composition is described.

First, the signal line 6, the driving electrode 50, the opposite electrode 51 and the like were formed on the lower substrate 11. Taper etching was executed on the driving electrode 50 and the opposite electrode 51 so that their cross sectional forms are triangular. A width of the electrode on a bottom side was determined at 3 $\mu$m, a height at 1.5 $\mu$m and an electrode gap L at 10 μm. Therefore, a bottom angle of the triangular form was 45°. A transparent flattened layer 15 (silicon oxide, a thickness of 2 μm) was formed on the lower substrate 11. An alignment layer 14 was formed on the flattened layer 15 and rubbing treatment was executed. A rubbing direction was a direction at an angle of 10° with the longest side of the electrode. That is, the angle θ was 10°. An alignment layer 14 was formed on the transparent upper substrate 10, and rubbing treatment was executed in the same direction as a rubbing direction of the alignment layer 14 on the lower substrate 11 so that the liquid crystal 18 is approximately a homogeneous alignment after sticking the substrates. Later, the upper and lower substrates 10, 11 were stuck at a panel gap d of 15 μm, and an empty panel was manufactured.

Next, a polymer dispersion type composition was manufactured comprising 85 wt. % of TL 205 (trade name: manufactured by Melc, Inc.) as a material of a liquid crystal and 15 wt. % of UV curable liquid crystal (manufactured by Dainippon Ink & Chemicals, Inc.) as a liquid crystalline monomer. After injecting with vacuum the polymer dispersion type composition into the above-mentioned empty panel, ultraviolet rays were irradiated. Lastly, an opening for injecting was sealed with a sealing agent and thereby a polymer dispersion type liquid crystal panel was obtained.

Optical characteristics of the liquid crystal display panel thus manufactured were measured in the following procedures. A panel aperture ratio was evaluated on the basis of an intensity of a transmitted light by making a parallel light enter from the upper substrate 10 of the above-mentioned panel. In a conventional panel wherein a cross sectional form of an electrode is rectangular, a panel aperture ratio is low, approximately 35% since a part of a light is shielded by the electrode under an application of voltage. Meanwhile, in the panel having the above-mentioned composition, an incident light was reflected on the triangular side of an electrode and was emitted on a pixel aperture, and thereby a panel luminance increased. Consequently, a panel aperture ratio increased to 55% and a display with a high luminance was obtained. Since a panel gap was thick, 15 μm, a scattering intensity increased and a contrast measured in a projection type optical system was high, 190.

A triangular cross sectional form of an electrode is not limited to the above-mentioned examples and may be an arbitrary triangle. In the case of a conventional panel wherein a cross sectional form of an electrode is rectangular, an electrode width above 3 μm was necessary for applying an electric field uniformly to a polymer dispersion type liquid crystal layer. Meanwhile, in the case of a panel wherein a cross sectional form of an electrode is triangular, a length of a side of the electrode is more important than a width of the electrode. If the length of a side is above 3 μm, it is possible to apply an electric field uniformly to a polymer dispersion type liquid crystal layer.

If a bottom angle of a triangular form may be above 10° and below 45° besides the above, an effect of improving a luminance and applying an electric field uniformly is obtained.

(Embodiment 1-11)

Figure 19:
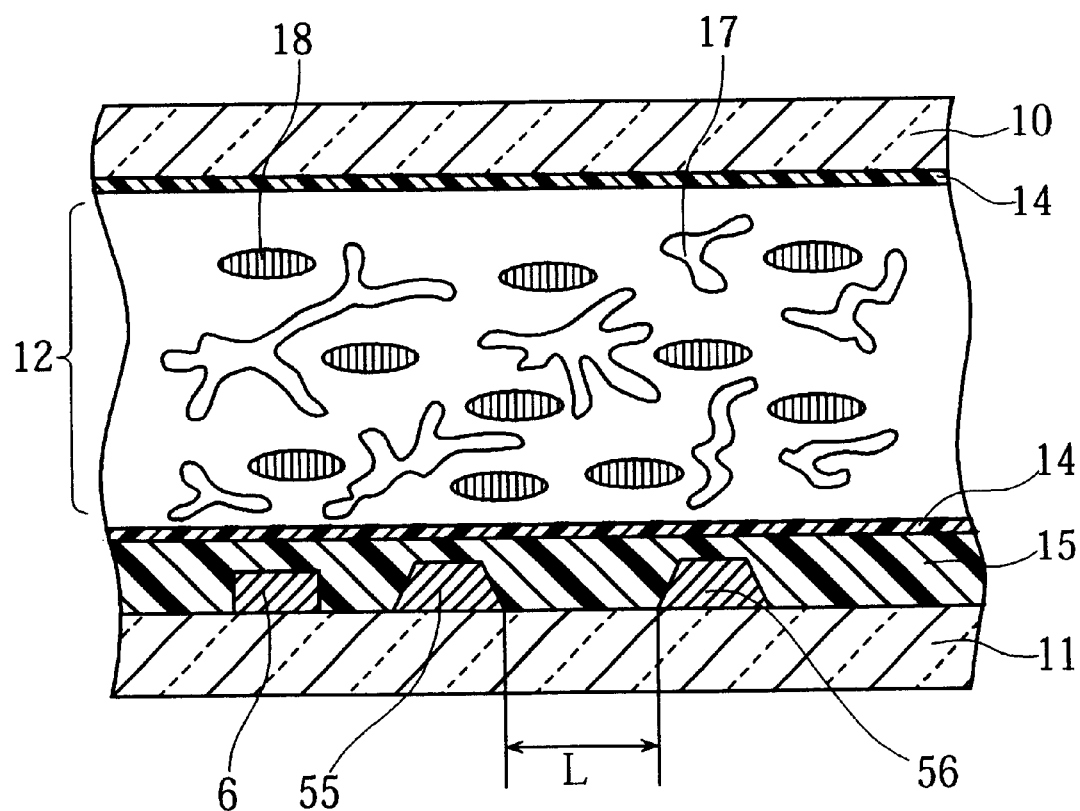
FIG. 19 is a cross sectional view of a liquid crystal display panel according to Embodiment 1-11.

FIG. 19 is a cross sectional view of a liquid crystal display panel according to Embodiment 1-11. Embodiment 1-11 is similar to Embodiment 1-10, and a detailed description is omitted by giving the same reference number for a corresponding part. In Embodiment 1-11, a driving electrode 55 and an opposite electrode 56 are substituted for the driving electrode 50 and the opposite electrode 51 in Embodiment 1-10, respectively. A cross sectional form of the driving electrode 55 and the opposite electrode 56 is a trapezoidal form, unlike the driving electrode 50 and the opposite electrode 51 having a triangular cross sectional form. Except this point, Embodiment 1-11 has a similar composition to Embodiment 1-10.

By means of using such the electrodes 55, 56 having a trapezoidal cross sectional form, the height of an electrode can be made lower than a triangular cross sectional form with the same width of the electrode. Consequently, a thickness of a flattened layer 15 is reduced and an effect of applying an electric field more uniformly than Embodiment 1-10 is obtained.

Next, a liquid crystal display panel having the above-mentioned composition was manufactured under the following conditions. That is, a width of the electrode on a bottom side was determined at 3 μm, a width on a top side at 1 μm, a height at 1 μm, an electrode gap at 10 μm and a thickness of a flattened layer at 1.3 μm. Thus, by means of making a cross sectional form of an electrode a trapezoid, a flattened layer is made thinner than Embodiment 1-10 and an electric field was applied uniformly to a polymer dispersion type liquid crystal layer. Consequently, even if a panel gap was made 15 μm, a uniform display was obtained. A contrast was high, 210, and a display with a high contrast was obtained.

(Embodiment 1-12)

Figure 20:
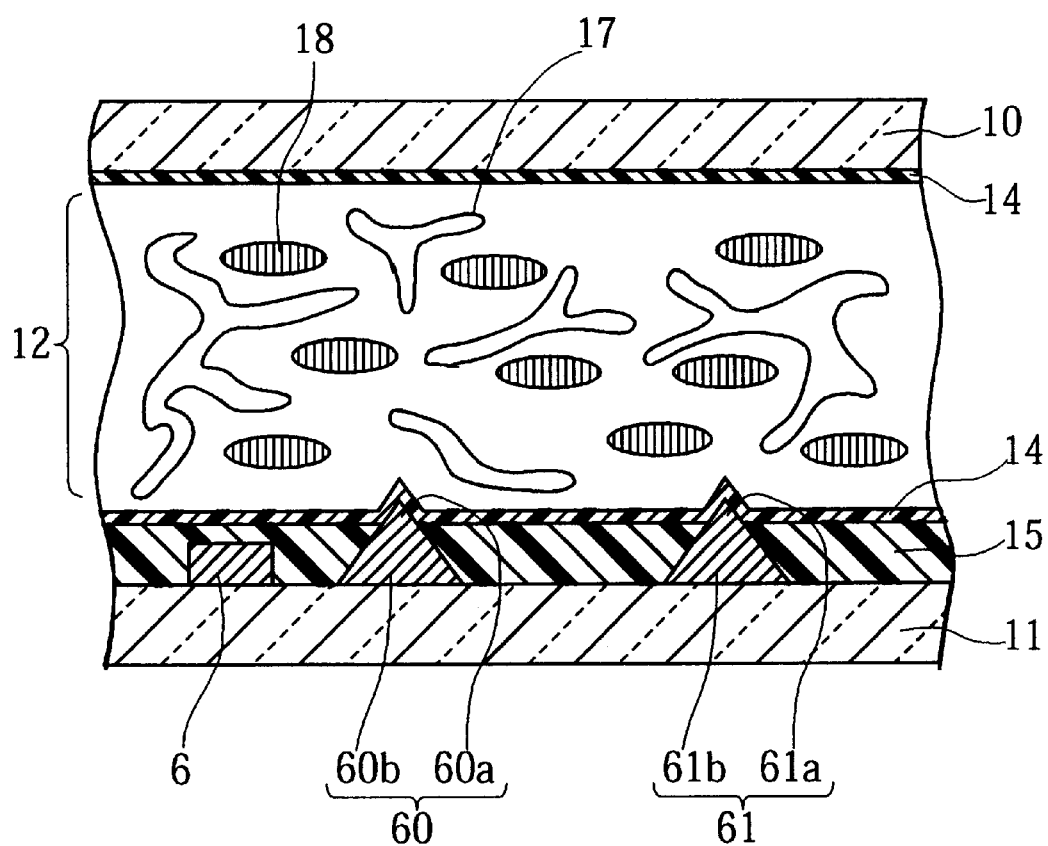
FIG. 20 is a cross sectional view of a liquid crystal display panel according to Embodiment 1-12.

FIG. 20 is a cross sectional view of a polymer dispersion type liquid crystal display panel according to Embodiment 1-12. Embodiment 1-12 is similar to Embodiment 1-10, and a detailed description is omitted by giving the same reference number for a corresponding part. The point at which Embodiment 1-12 is different from Embodiment 1-10 is that Embodiment 1-12 has a structure in which a part of a driving electrode and an opposite electrode projects out of the flattened layer 15 although Embodiment 1-10 has a structure in which the flattened layer 15 covers a driving electrode and an opposite electrode completely. More specifically, upper areas 60a, 61a of each of a driving electrode 60 and an opposite electrode 61 exist in the polymer dispersion type liquid crystal layer 12, and lower areas 60b, 61b of each of the driving electrode 60 and the opposite electrode 61 exist in the flattened layer 15. According to such a composition, it is possible to intend the uniformity of electric field intensity and the reduction of display irregularity. The reason is detailed below.

(1) When the flattened layer 15 covers the driving electrode 60 and the opposite electrode 61 completely, as shown in FIG. 21(a), the electric field intensity is high and the electric field direction is approximately parallel in an area S1 in the flattened layer 15, while it is assumed that the electric field intensity is low and the electric field direction is not parallel in an area S2 in the polymer dispersion type liquid crystal layer 12 since the area is away from the electrode. Consequently, it is impossible to apply an electric field uniformly in a direction parallel with the substrate. Meanwhile, since Embodiment 1-12 has a structure in which the flattened layer 15 does not completely cover the driving electrode 60 and the opposite electrode 61, as shown in FIG. 21(b), the electric field intensity is high and the electric field direction is approximately parallel in both areas S3, S4 in the polymer dispersion type liquid crystal layer 12. The reason is that it is assumed that the electric field intensity and the electric field direction in the area S4 is approximately equal to the electric field intensity and the electric field direction in the area S3 since the area S4 is extremely dose to the electrode as compared with the area S2. Therefore, in Embodiment 1-12, it is possible to apply a parallel and uniform electric field to the polymer dispersion type liquid crystal layer while driving.

(2) Meanwhile, in the case of no flattened layer, since a form of an electrode is triangular, a part of an electrode projects largely into the polymer dispersion type liquid crystal layer, and an alignment of a liquid crystal and a liquid crystalline polymer near the electrode has an irregularity and thereby display irregularity occurs. As regards this point, in Embodiment 1-12, since the flattened layer is formed only in a lower area of the electrode, the projection of the electrode can be reduced and the display irregularity resulting from the alignment irregularity can be reduced.

Thus, in Embodiment 1-12, both the uniformity of electric field intensity and the reduction of display irregularity can be intended by the above-mentioned (1) and (2).

(3) For reference, when Embodiment 1-12 is compared with a conventional example (in Japanese Unexamined Patent Publication No. 8-286211) wherein a nematic liquid crystal is driven with an IPS mode, it is common to use an electrode having a triangular cross sectional form. However, in Embodiment 1-12, it is an advantage that the uniformity of electric field intensity and a higher contrast can be obtained as compared with the above-mentioned conventional example. The reason is described below. Generally, in the case of using an electrode having a triangular cross sectional form for a liquid crystal display panel in an IPS mode, it is assumed that it is proper to bury the electrode completely in a flattened layer. The reason is that if any part of an electrode projects into a liquid crystal layer, an alignment of a liquid crystal near the electrode has an irregularity, and the alignment direction is slightly different from a polarized direction of a polarizer, and display irregularity (a desirable black is not displayed) occurs resulting from this. However, in the case of burying an electrode completely in a flattened layer, the electric field direction is not parallel and the uniformity of electric field intensity is not intended as described above. As regards this point, since a polymer dispersion type liquid crystal, which is a scattering type liquid crystal, is used in the conventional example, display performance is not largely affected even if a part of an electrode projects into the polymer dispersion type liquid crystal layer and an alignment of a liquid crystal near the electrode has an irregularity. Rather, if a liquid crystal has an alignment irregularity under no application of voltage, it is a merit that a scattering intensity gets higher. Based on such a reason, in Embodiment 1-12, according to a composition in which a part of an electrode projects into the polymer dispersion type liquid crystal layer, a higher contrast and the uniformity of electric field intensity can be intended as compared with the above-mentioned conventional example.

Next, a liquid crystal display panel having the above-mentioned composition was manufactured under the following conditions, and a contrast and the like were measured. The conditions of the liquid crystal display panel were as follows: a width of the electrode on a bottom side was determined at 3 μm, a height at 1.5 μm and an electrode gap L at 10 μm. A thickness of the flattened layer 15 was determined at 1 μm. Therefore, approximately 0.5 μm of an upper area of the driving electrode 60 and the opposite electrode 61 existed in a polymer dispersion type liquid crystal layer. A panel gap d was determined at 18 μm.

A panel aperture ratio in the above-mentioned liquid crystal display panel was high, 55%, like Embodiment 1-10, and thereby a display with a high luminance was obtained Since the flattened layer 15 was thin, 1 μm, it was easier to apply an electric field to a polymer dispersion type liquid crystal layer. Consequently, even if a panel gap was made thicker than Embodiment 8, a uniform display was obtained. Since a panel gap was thick, a contrast was 250 and a display with a high contrast was obtained.

The upper area of the electrode in a polymer dispersion type liquid crystal layer was low, approximately 0.5 μm in height, and an alignment of a liquid crystal and a liquid crystalline polymer was uniform. A thickness of the flattened layer is not limited to the above-mentioned examples and may be composed so as to cover the lower area of the electrode. A larger height of the electrode in a polymer dispersion type liquid crystal layer results in an irregular alignment of a liquid crystal and a liquid crystalline polymer near the electrode, and the reduction of luminance. Then, if a height of the electrode in a polymer dispersion type liquid crystal layer is below 2 μm, both a high luminance and a high contrast can be obtained.

When a polymer dispersion type liquid crystal in a reverse mode is used for a transmission type panel, a black display is executed by utilizing a scattering under an application of voltage. Then, since an irregular alignment near the electrode has an effect of increasing a scattering intensity, it is an advantage that a contrast does not largely decrease even by the irregular alignment. However, when an irregular alignment occurs near the electrode, a white luminance is reduced under no application of voltage. Consequently, a height of the electrode in a polymer dispersion type liquid crystal layer is desirably below 2 μm.

(Embodiment 1-13)

Figure 22:
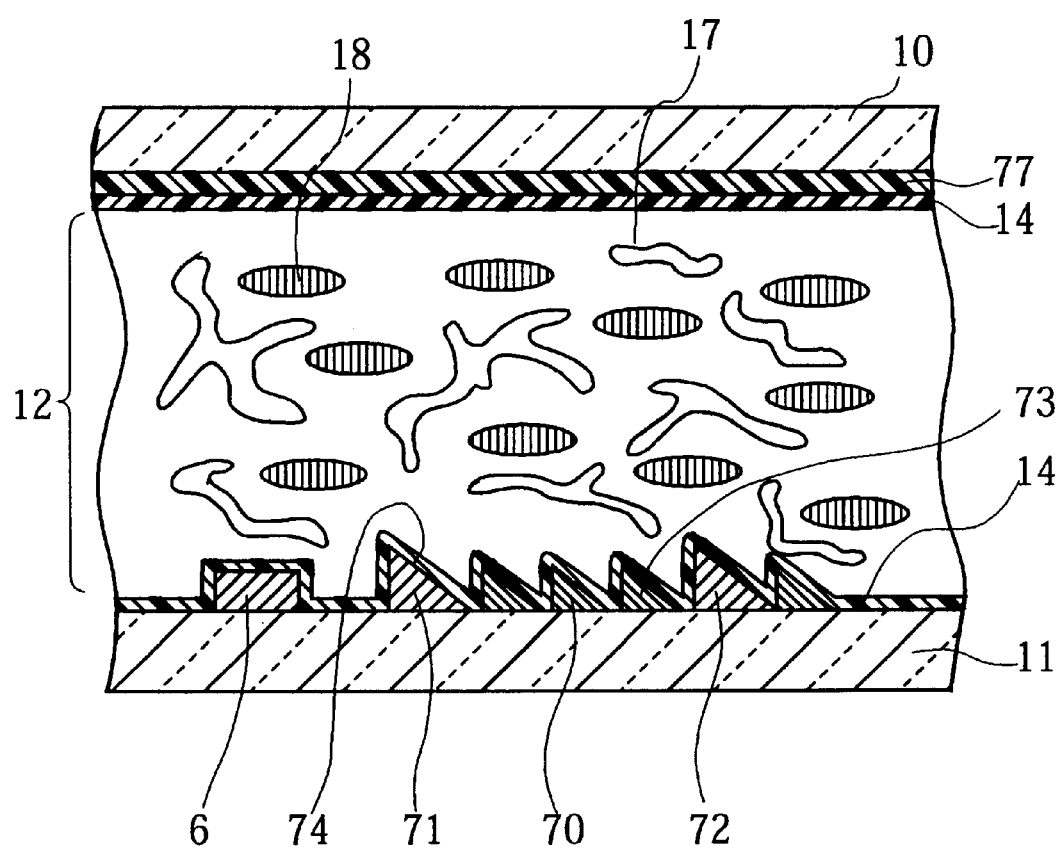
FIG. 22 is a cross sectional view of a liquid crystal display panel according to Embodiment 1-13.

FIG. 22 is a cross sectional view of a liquid crystal display panel according to Embodiment 1-13. Embodiment 1-13 is similar to Embodiment 1-10, and a detailed description is omitted by giving the same reference number for a corresponding part. The point at which Embodiment 1-13 is different from Embodiment 1-10 is that a liquid crystal display panel in Embodiment 1-10 is a transmission type liquid crystal display panel, while a liquid crystal display panel in Embodiment 1-13 is a reflection type liquid crystal display panel. A color filter 77 is formed on the inside of the upper substrate 10 in Embodiment 1-13. A reflection layer 70 is formed on the lower substrate 11 of a liquid crystal display panel in Embodiment 1-13. The reflection layer 70 is formed so as to cover the whole aperture between a driving electrode 71 and an opposite electrode 72. Moreover, the reflection layer 70 has a saw-toothed shape, which provides multiple inclined planes 73 in the same inclined direction and at approximately the same tilt angle. According to such a inclined plane 73, at least a part of an incident light into the reflection layer 70 can be reflected at an angle different from a regular reflection direction when a light enters a plane parallel with the substrates. Thus, a regularly reflected light in the reflection layer 70 can be restrained, and a tone reversal and a reflection of a peripheral light can be reduced.

Figure 23:
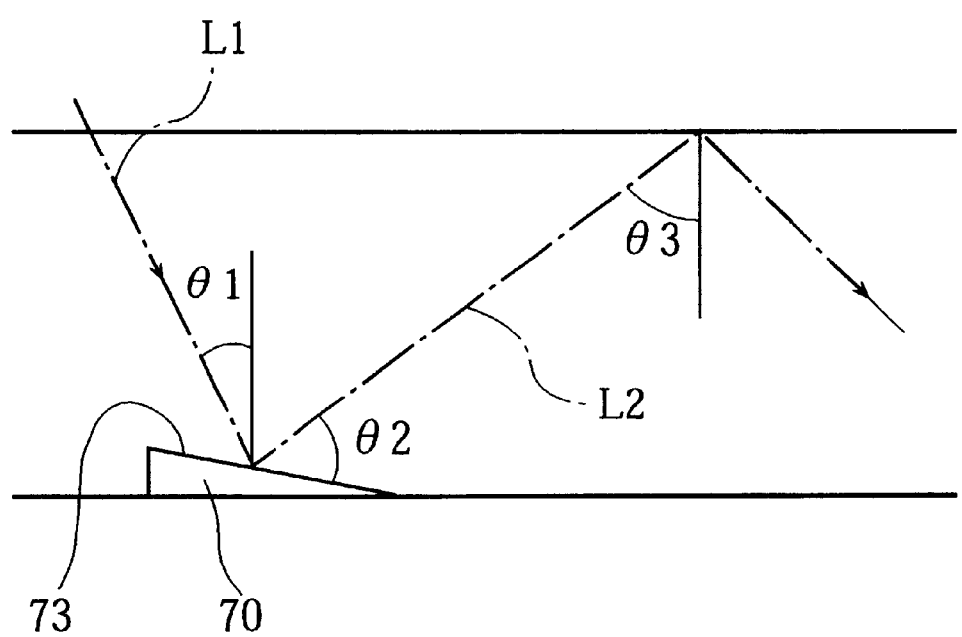
FIG. 23 is a view for describing a reflection state of an incident light in a liquid crystal display panel according to Embodiment 1-13.

A principle is described concretely below referring to FIG. 23. A refraction when an incident light L1 and a reflected light L2 transmit through a substrate is not referred to in the following description for simplifying the description. For instance, when an incident light L1 enters a panel at an angle θ1, a reflected light L2 is emitted at an angle θ2 (θ2 >θ1) since the incident light L1 is reflected on the inclined plane 73 of the reflection layer 70. Then, if the angle θ2 is smaller than a total reflection angle θ3 with the substrate 11, the reflected light L2 is emitted at an angle θ2 on the front side of the substrate. This means that an emission angle of a regularly reflected light with an incident light into a panel gets larger. If the angle θ2 is larger than a total reflection angle θ3, the reflected light L2 is reflected on the substrate and is not emitted on the front side of the substrate. Thus, a regularly reflected light of the light, which enters the panel from a diagonal direction, is restrained.

The electrodes 71, 72 have a shape corresponding to the reflection layer 70. More specifically, a cross sectional form of the electrodes 71, 72 is a right triangle having an inclined plane 74 in the same inclined direction and at approximately the same tilt angle as the inclined plane 73. By means of providing such inclined plane 74, like the above-mentioned inclined plane 73, at least a part of an incident light into the electrodes 71, 72 can be reflected at an angle different from a regular reflection direction, and thereby a reflection of a peripheral light can be reduced further together with the inclined plane 73.

Also in a reflection type liquid crystal display panel of Embodiment 1-13, by means of satisfying d>L, a scattering intensity increases under no application of voltage without increasing a driving voltage, and thereby a higher contrast can be intended.

Next, a method of manufacturing a liquid crystal display panel having the above-mentioned composition is described. First, the signal line 6, the driving electrode 71, the opposite electrode 72 and the like were formed on the lower substrate 11. Taper etching was executed on the driving electrode 71 and the opposite electrode 72 by a diagonal exposure so that their cross sectional forms are right triangles. A width of the electrode on a bottom side was determined at 3 μm, a height at 0.8 μm and an electrode gap L at 10 μm. Therefore, a bottom angle of the right triangle was 15°. That is, a tilt angle of the inclined plane 74 was determined at 15°. The saw-toothed reflection layer 70 comprising multiple layers of dielectric film was formed at a pixel aperture. More specifically, after laminating a photoresist on the substrate 11, a saw-toothed base was formed by a diagonal exposure and a dielectric film was laminated on the base. Thus, multiple saw-toothed layers of dielectric film were formed and the reflection layer 70 was manufactured. Then, a width of the saw-toothed shape was determined at 2 μm, a bottom angle at 15°. Accordingly, a tilt angle of the inclined plane 73 was 15°, equal to the tilt angle of the inclined plane 74. The inclined plane 73 and the inclined plane 74 may be different in a tilt angle.

An alignment layer 14 was formed on the lower substrate 11 and rubbing treatment was executed. A rubbing direction was a direction at an angle of 10° with the longest side of the electrode. That is, the angle θ was determined at 10°. An alignment layer 14 was formed on the transparent upper substrate 10 having the color filter 77, and rubbing treatment was executed in the same direction as a rubbing direction of the alignment layer 14 on the lower substrate 11 so that the liquid crystal 18 is approximately a homogeneous alignment after sticking the substrates. Later, the upper and lower substrates 10, 11 were stuck at a panel gap of 13 μm and an empty panel was manufactured.

A polymer dispersion type composition was manufactured comprising 85 wt. % of TL 205 (trade name: manufactured by Melc, Inc.) as a material of a liquid crystal and 15 wt. % of UV curable liquid crystal (manufactured by Dainippon Ink & Chemicals, Inc.) as a liquid crystalline monomer, and after injecting with vacuum the polymer dispersion type composition into the above-mentioned empty panel, ultraviolet rays were irradiated. Lastly, an opening for injecting was sealed with a sealing agent and thereby a polymer dispersion type liquid crystal panel was obtained.

A visibility of the liquid crystal display panel thus manufactured were observed in the case of irradiating a light from a direction at an angle of 30° with the front of the panel. Then, since the electrodes 71, 72 and the reflection layer 70 were inclined, an emission angle of a regularly reflected light with an incident light into a panel got larger. More specifically, an incident light from a direction at an angle of 30° was emitted at an angle of above 60°, and a preferable display was obtained within an angle of 50° with the front, which is a usual range for use.

A cross sectional form of an electrode is not limited to the above-mentioned examples and may be an arbitrary triangle. If an angle of an emitted light from a panel is above 60° with the front, there is no problem in usual visibility. Accordingly, it is preferred to determine a tilt angle of the inclined plane 71 so that an angle of an emitted light from a panel is above 60°.

(Embodiment 1-14)

Figure 24:
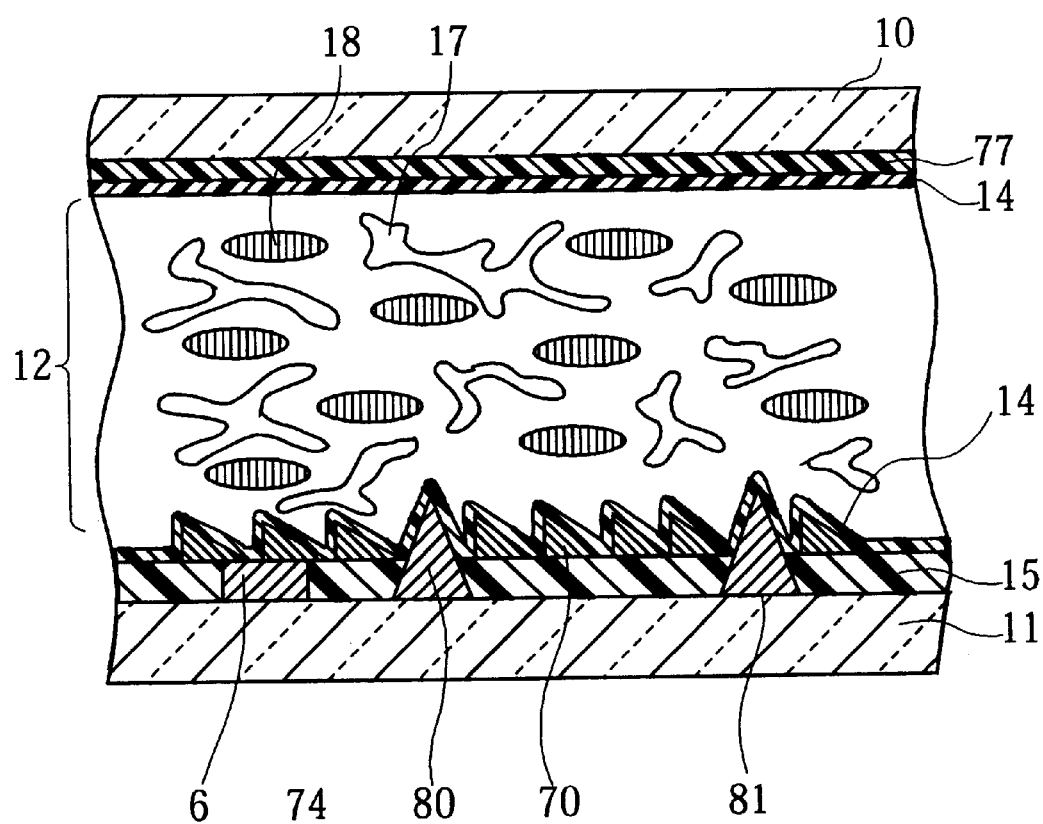
FIG. 24 is a cross sectional view of a liquid crystal display panel according to Embodiment 1-14.

FIG. 24 is a cross sectional view of a liquid crystal display panel according to Embodiment 1-14. Embodiment 1-14 is similar to Embodiment 1-13, and a detailed description is omitted by giving the same reference number for a corresponding part. The point at which Embodiment 1-14 is different from Embodiment 1-13 is that a driving electrode 80 and an opposite electrode 81 having a triangular cross sectional form are substituted for the driving electrode 71 and the opposite electrode 72. The flattened layer 15 is formed in a lower area of an electrode and an upper area of an electrode exists in a polymer dispersion type liquid crystal layer. Thus, both the uniformity of electric field intensity and the reduction of display irregularity can be intended by forming the flattened layer 15 only in a lower area of an electrode.

Although a liquid crystal with a positive dielectric anisotropy is used in the above-mentioned Embodiments 1-10 to 1-14, a liquid crystal with a negative dielectric anisotropy may be used. In this case, an angle θ which is formed by an opposite electrode and an alignment treatment direction of a substrate is 45 degrees or more and below 90 degrees like the above-mentioned Embodiment 1-2.

Next, a composition of a panel is described concretely referring to FIG. 24. A cross sectional form of the driving electrode 80 and the opposite electrode 81 was determined in a triangle. The flattened layer 15 was formed on the lower substrate 11. Then, the flattened layer 15 was formed so as to cover the lower area of the electrode. The reflection layer 70 with multiple saw-toothed shapes was formed on the flattened layer 15. Since the reflection layer 70 was provided on the flattened layer 15, a pixel aperture ratio was improved greatly to 70%. The flattened layer 15 was formed in a lower area of the driving electrode 80 and the opposite electrode 81, and an upper area of the electrode existed in a polymer dispersion type liquid crystal layer. According to this composition, an electric field intensity applied to a liquid crystal did not decrease and was uniform.

The inventors of the present invention manufactured and experimented a liquid crystal display panel which is formed so as to bury the electrode completely in the flattened layer. As a result, it was found that a sufficient electric field could not be applied to a polymer dispersion type liquid crystal layer since the decrease of voltage occurred in a reflection layer comprising multiple layers of dielectric film.

Thus, an upper area of the electrode existed in a polymer dispersion type liquid crystal layer, whereby both a higher luminance with a high aperture ratio and a uniform display were intended.

(Other Embodiments)

(1) Although a driving electrode and an opposite electrode are comb-shaped electrodes in the above-mentioned Embodiments 1-1 to 1-14, the present invention is not limited to a comb-shaped electrode. It is preferred that an electrode has a shape in which an electric field can be applied in parallel with a substrate, for instance, a plurality of rectangular shapes.

(2) Although a driving electrode and an opposite electrode are comb-shaped electrodes as shown in FIG. 3 in the above-mentioned Embodiments 1-1 to 1-7, it is possible to use a shape in which a comb-shaped part of an electrode is bent as shown in FIG. 9 and a shape in which a corner of an electrode is roundish as shown in FIG. 10. When a comb-shaped electrode as shown in FIG. 3 is used, the driving electrode can be disposed uniformly at a rectangular pixel and an effect of improving a pixel aperture ratio is produced. When a shape in which a comb-shaped part of an electrode is bent is used, an effect of improving scattering further is produced since a liquid crystal molecule rotates in a reverse direction on both sides of the bent part. A polarization dependence of scattered light by a viewing angle is averaged and a uniform characteristic of a viewing angle is obtained In the case of a shape in which a corner of an electrode is roundish, the nonuniformity of an alignment at an electrode end is restrained and an effect of actualizing a uniform display performance is produced since an influence of the concentration of electric field on the corner is relaxed.

In Embodiments 1-10 to 1-14, it is possible to use an electrode having a triangular cross sectional form and a shape, for instance, in which a part of the electrode is bent as shown in FIGS. 9 and 10.

(3) Although a polymer is a liquid crystalline polymer in Embodiments except Embodiments 1-6 and 1-8, the polymer may be a mixture of a liquid crystalline polymer and a polymer which is not liquid crystalline. In addition, the polymer may be a polymer which is not liquid crystalline. However, in view of intending the improvement of scattering performance, it is desirable that the polymer is a liquid crystalline polymer.

(4) Although an alignment treatment of a substrate is executed by rubbing as described below in Embodiments 1-1 to 1-14, the alignment treatment may be executed by irradiating ultraviolet rays. In this case, a bi-functional monomer should be used as a liquid crystalline monomer which is a precursor of a liquid crystalline polymer.

(5) A rubbing treatment may be executed only on the substrate 10 in Embodiments using a liquid crystal which is not twisted among the above-mentioned Embodiments 1-1 to 1-14. The reason is that a sufficiently desirable alignment of a liquid crystal and a polymer is obtained by rubbing only on the substrate 10 if a liquid crystal is not twisted. In particular, since it is difficult to execute rubbing treatment on the lower substrate 11 in Embodiments 1-12 to 1-14 wherein a part of an electrode projects into a polymer dispersion type liquid crystal layer, it is effective to execute rubbing treatment only on the upper substrate 10.

Comparative Example 1

A conventional polymer dispersion type liquid crystal panel in a reverse mode, wherein a display is executed by applying an electric field in a direction of a panel gap between opposite substrates, was manufactured by using the same composition as Embodiment 1-1. The panel gap d was determined at 13 $\mu$m like Embodiment 1.

Then, since a nematic liquid crystal stood up in a gap direction and a scattering state was obtained, a difference in a refractive index between the nematic liquid crystal and UV curable liquid crystal around it was smaller than Embodiment 1. Consequently, scattering performance under an application of voltage was low and a contrast was 30. Since a panel gap d was 13 $\mu$m and larger than an electrode gap (L=10 $\mu$m) in Embodiment 1, a driving voltage V10 was high, 20V Meanwhile, when the panel gap d was made larger, the contrast was increased, and the driving voltage also was increased in proportion to the panel gap d. Thus, in a conventional polymer dispersion type liquid crystal panel in a reverse mode, the difference in a refractive index between the nematic liquid crystal and UV curable liquid crystal was small in a scattering state, and scattering performance was low, and additionally, it was difficult to intend the improvement of both a contrast and a driving voltage.

EMBODIMENT 2

The summary of Embodiment 2 is, basically, a composition wherein a polymer dispersion type liquid crystal layer comprising a liquid crystalline polymer and a liquid crystal is held between a pair of substrates, and the polymer is aligned and fixed in a direction by an alignment treatment executed on the pair of substrates, and the liquid crystal is aligned so as to be along a wall surface of the polymer under no application of voltage (an initial state) and thereby a scattering state is obtained since the liquid crystal is aligned at random in view of the whole polymer dispersion type liquid crystal layer, and a transparent state is obtained since the liquid crystal is aligned in the same direction as an alignment direction of the polymer under an application of voltage (an initial state). According to Embodiment 2, the following effect is produced.

(1) It is possible to intend both an improvement of a transparent characteristic in a transparent state and an improvement of a scattering characteristic in a scattering state.

(2) In the third conventional example (IRIS type liquid crystal display panel), since a polymer and a liquid crystal are aligned in the same direction on a substrate plane in a transparent state, a tint of an image differs by a difference in a visual direction, in other words, a coloration occurs. As regards this point, in Embodiment 2, since a polymer and a liquid crystal are aligned in a direction vertical to a substrate in a transparent state, a tint of an image has no dependence on a visual direction and the above-mentioned coloration never occurs.

(3) An improvement of a display performance can be intended by reducing an optical hysteresis in appearance.

The contents of Embodiment 2 will be detailed by exemplifying Embodiments 2-1 to 2-4 below.

(Embodiment 2-1)

Figure 25:
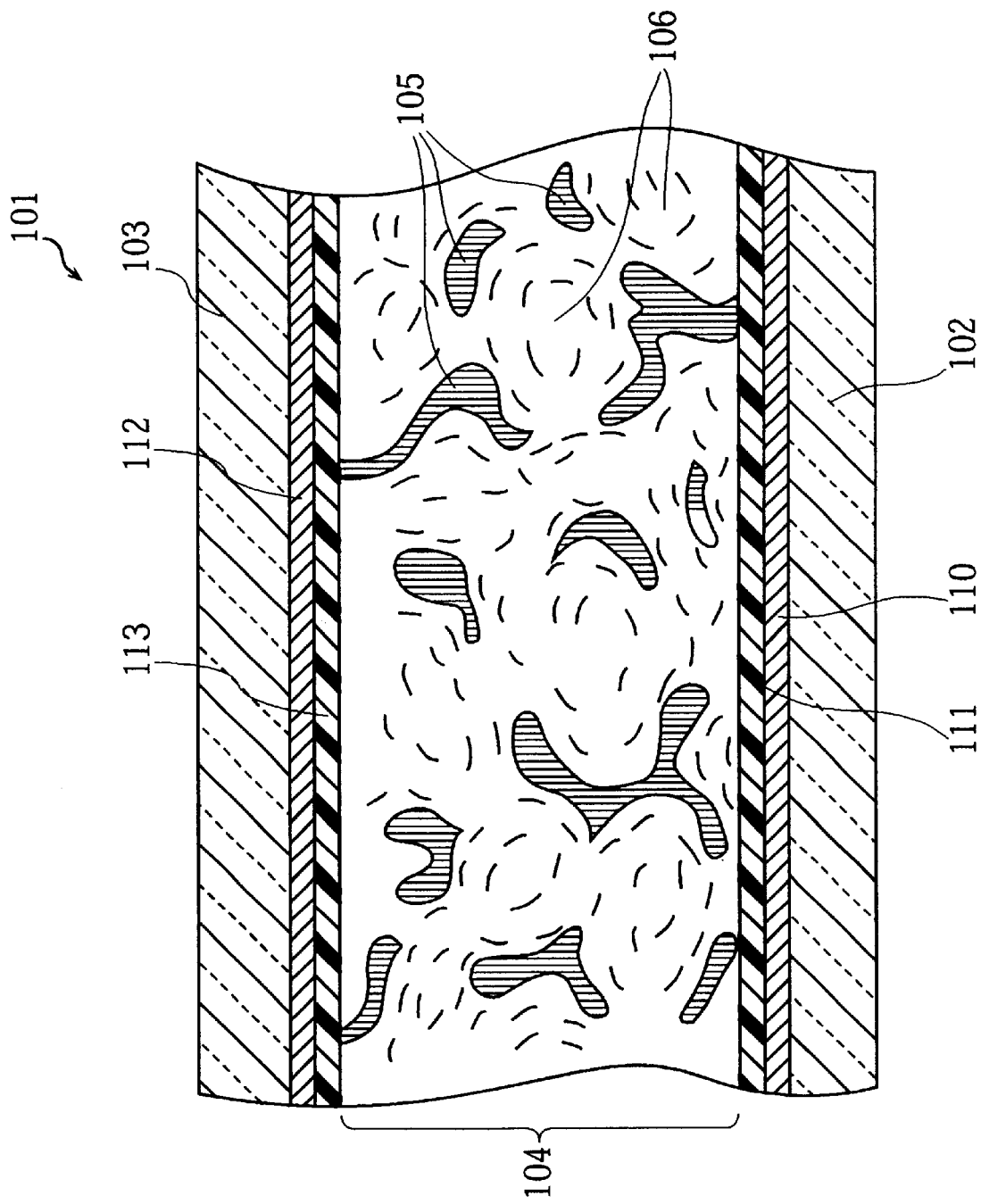
FIG. 25 is a schematic cross sectional view of a liquid crystal display panel 101 according to Embodiment 2-1.

FIG. 25 is a schematic cross sectional view of a liquid crystal display panel according to Embodiment 2-1. In FIG. 25, a part which is unnecessary for describing is omitted, and some parts are enlarged or contracted to make a description easy. The above is applied to the Figures below. A liquid crystal display panel 101 comprises a pair of transparent substrates 102, 103 and a polymer dispersion type liquid crystal layer 104 which is held between the substrates 102, 103. The above-mentioned pair of substrates 102, 103 are generally made of glass and may be made of plastic films. A transparent electrode 10 as a pixel electrode, a metal wiring (an image signal line, a scanning signal line), a thin film transistor (TFT) as a pixel switching panel and the like are formed inside the substrate 2, and additionally an alignment layer 111 made of polyimide is formed on the transparent electrode 110. In FIG. 25, the metal wiring, the TFT and the like are omitted. A transparent electrode 112 as an opposite electrode is formed inside the substrate 103, and additionally an alignment layer 113 made of polyimide is formed on the transparent electrode 112. A color filter may be formed on the substrate 103.

The above-mentioned polymer dispersion type liquid crystal layer 104 is composed of a liquid crystalline polymer 105 and a liquid crystal 106, and has a structure in which the polymer 105 and the liquid crystal 106 are dispersed independently of each other. A weight ratio of the liquid crystal 106 to the polymer dispersion type liquid crystal layer 104 is determined at 60%. The polymer 105 is fixed in an alignment state in a direction vertical to a substrate. Meanwhile, the liquid crystal 106 is aligned so as to be along a wall surface of the polymer 105, and is in an alignment state at random in view of the whole polymer dispersion type liquid crystal layer 104. A polymer, which is compatible with the liquid crystal 106 in a liquid crystalline phase and later is phase-separated from the liquid crystal 106 while curing, is used as the polymer 105. More specifically, a polymer precursor comprises a liquid crystalline monomer. A liquid crystal with a positive dielectric anisotropy, which is aligned in parallel with an electric field direction, is used as the liquid crystal 106.

An alignment treatment is executed on the above-mentioned alignment layers 111, 113 so as to align the polymer 105 in a direction vertical to a substrate. The polymer 105 is fixed in an alignment state in a direction vertical to a substrate by such alignment layers 111, 113. Consequently, even if an electric field is applied, the polymer 105 is not aligned in an electric field direction and is kept in an alignment state in a direction vertical to a substrate. Meanwhile, the liquid crystal 106 is aligned in an electric field direction by an application of an electric field since an alignment state of the liquid crystal 106 is not fixed.

Figure 26:
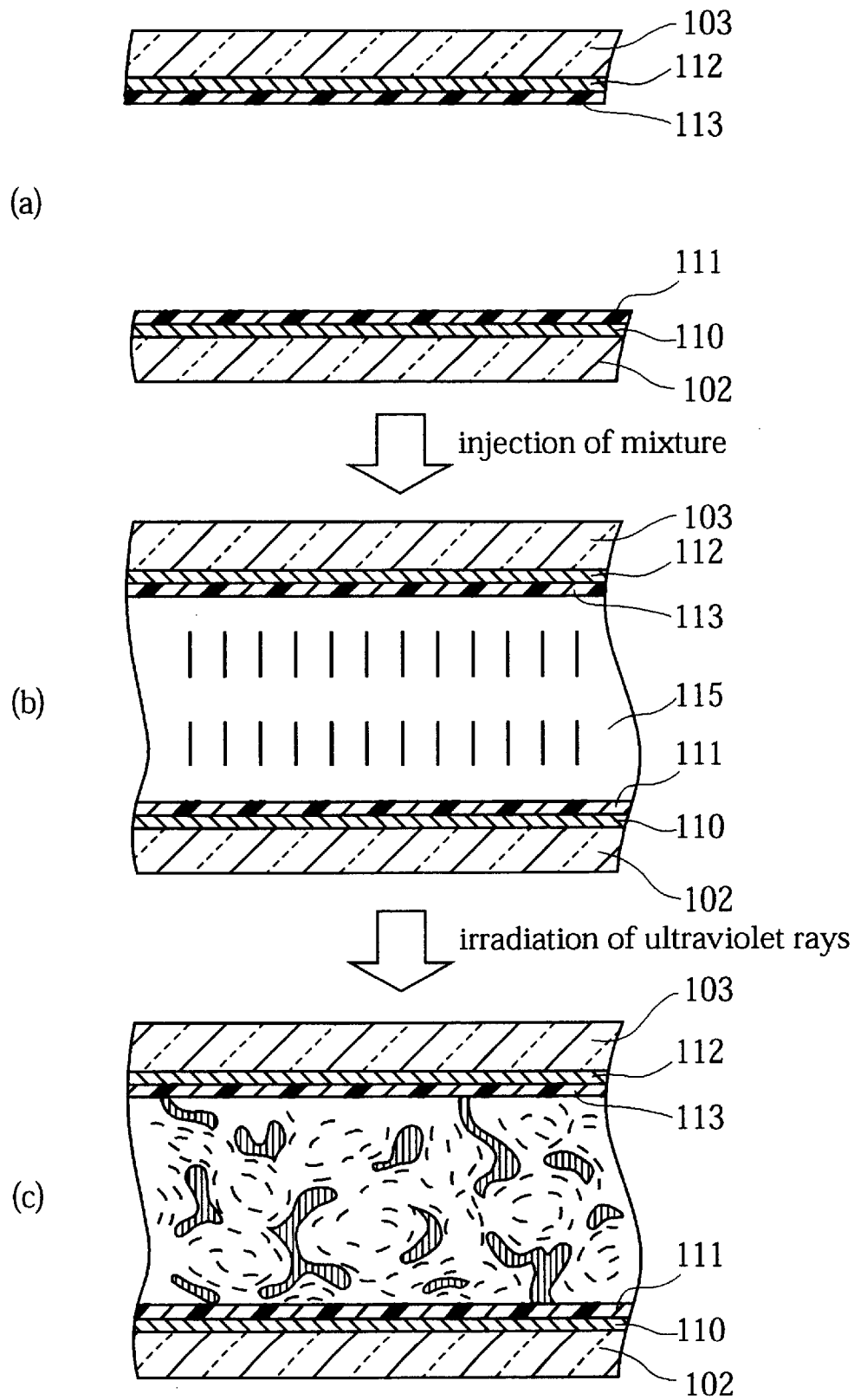
FIG. 26 is a view showing a manufacturing process of a liquid crystal display panel 101 according to Embodiment 2-1.

FIG. 26 is a view showing a manufacturing process of a liquid crystal display panel in the present invention. A method of manufacturing a liquid crystal display panel is described below referring to FIG. 26.

(1) First, a substrate 102 with a transparent electrode 110 and a substrate 103 with a transparent electrode 112 are prepared, and an alignment layer 111 on which a vertical alignment treatment is executed is formed on the transparent electrode 110 on the substrate 102 and an alignment layer 113 on which a vertical alignment treatment is executed is formed on the transparent electrode 112 on the substrate 103. The alignment layers 111, 113 are made opposite, the substrates 102, 103 are put together and thereby a liquid crystal panel is manufactured (refer to FIG. 26(a)). Then, a predetermined gap is kept by dispersing a resin spacer between the substrates 102, 103. In Embodiment 2-1, the gap is determined at 10 μm.

(2) Secondly, a mixture 15 in a solution comprising a liquid crystal material, a polymeric monomer, a polymeric oligomer and a polymerization initiator is injected between the substrates 102, 103 (refer to FIG. 26(b)). A content of the liquid crystal material in the whole mixture 115 in a solution is determined at 60 wt. %. A liquid crystalline monomer is used as the polymeric monomer. A monomer represented in Chemical Formulae 1 to 7 is mentioned as an example of the liquid crystalline monomer.

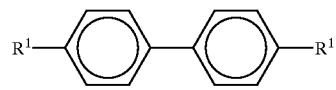

[Chemical Formula 1]

(In the Formula, $R^1$ indicates $CH_2$=CH—COO—$C_6H_{12}OH$—O—.)

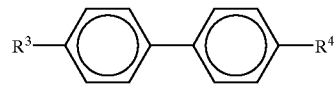

[Chemical Formula 2]

(In the Formula, $R^3$ indicates $CH_2$=CH—COO— and $R^4$ indicates $CH_2$=CH—OCO—.)

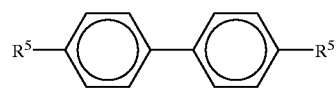

[Chemical Formula 3]

(In the Formula, $R^5$ indicates $CH_2$=CH—COO—.)

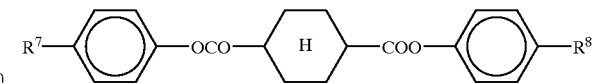

[Chemical Formula 4]

(In the Formula, $R^7$ indicates $CH_2$=CH—COO—$CH_2$—$CH_2$— and $R^8$ indicates $CH_2$=CH—OCO—$CH_2$—$CH_2$—.)

[Chemical Formula 5]

[Chemical Formula 6]

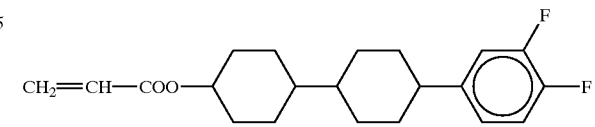

[Chemical Formula 7]

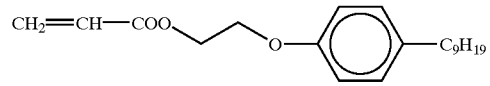

A monomer represented in Chemical Formulae 1 to 4 is a bi-functional monomer having a functional group at both ends of its molecule. A monomer represented in Chemical Formulae 5 to 7 is a mono-functional monomer. The inventors of the present invention have discussed whether a liquid crystal 106 is aligned so as to be along a wall surface of a polymer 105 as to a monomer represented in Chemical Formulae 1 to 7. As a result, it is confirmed that it is desirable that a liquid crystalline monomer comprises a bi-functional monomer and a content of a bi-functional monomer in the whole liquid crystalline monomer is determined at above 80% in order to obtain the above-mentioned alignment of the liquid crystal 106. In Embodiment 2-1, the content of a bi-functional monomer is determined at 80%. Furthermore, in Embodiment 2-1, a monomer represented in Chemical Formula 1 is used as a bi-functional monomer. A monomer represented in any one of Chemical Formulae 2 to 4 may be used as a bi-functional monomer.

Thus, the mixture 115 in a solution indicates a liquid crystalline phase by using a liquid crystalline monomer. In addition, since the alignment layers 111, 113 in a vertical alignment are formed on the substrates 102, 103, the mixture 15 in a solution which indicates a liquid crystalline phase tends to be aligned in a direction vertical to the substrates 102, 103 as shown in FIG. 26(b).

(3) Lastly, ultraviolet rays are irradiated to the mixture 115 in a solution, a resin component of a monomer and the like is solidified and thereby a crystalline component is precipitated (refer to FIG. 26(c)). In this polymerizing process, since a monomer component tends to be aligned vertically to the substrates before polymerizing, the polymer 105 indicates a tendency of an initial alignment after polymerizing. That is, the polymer 105 is fixed in an alignment state in a direction vertical to the substrates 102, 103 after polymerizing. Meanwhile, the liquid crystal 6 is aligned so as to be along a wall surface of the polymer 5, and is in a state of a random alignment in view of the whole polymer dispersion type liquid crystal layer 104. Thus, a liquid crystal display panel 101 is manufactured.

As described above, under no application of voltage, the liquid crystal 106 is aligned so as to be along a wall surface of the polymer 105 and is in a state of a random alignment in view of the whole polymer dispersion type liquid crystal layer 104, and thereby a scattering between a liquid crystal and a liquid crystal is obtained. In addition, since the scattering between a liquid crystal and a liquid crystal is extremely larger than a scattering between a polymer and a liquid crystal, the liquid crystal display panel 101 has a high scattering intensity under no application of voltage.

Thus, a characteristic of the present invention is that the scattering between a liquid crystal and a liquid crystal is obtained under no application of voltage. The reason for an alignment of a liquid crystal under no application of voltage which presupposes the scattering between a liquid crystal and a liquid crystal, namely, an alignment of the liquid crystal 106 along a wall surface of the polymer 105 is detailed below.

The inventors of the present invention have concluded from a result of various experiments and studies that an alignment of a liquid crystal in an initial state (no application of voltage) depends on a precipitation state in a process of forming a polymer dispersion type liquid crystal layer. A structure of a polymer dispersion type liquid crystal is manufactured, as described above, by irradiating ultraviolet rays to a mixture of a liquid crystal and a monomer material and phase-separating them. Then, one of the liquid crystal and the polymer is precipitated from the mixture, and an alignment under no application of voltage depends on this. When the liquid crystal is precipitated from the mixture, the liquid crystal is precipitated in a liquid crystal droplet and is aligned so as to be along an interface shape of the polymer. Then, a light is scattered under no application of voltage. However, when the polymer is precipitated from the mixture, the liquid crystal is aligned along an alignment treatment direction and a transparent state is obtained under no application of voltage.

The present invention is a type wherein a liquid crystal is precipitated and meanwhile IRIS, a conventional device, is a type wherein a polymer is precipitated.

According to an experiment by the inventors of the present invention, it is confirmed that a higher content of a bi-functional monomer leads to a tendency for a liquid crystal to precipitate and a scattering state is obtained under no application of voltage by making a content of a bi-functional monomer more than 60%. However, a content of a bi-functional monomer needs to be made more than 80% for actualizing a sufficient scattering. When a content of a bi-functional monomer is low, a structure which is characteristic of a type wherein a polymer is precipitated is found, and a transparent state is obtained under no application of voltage.

In a liquid crystal display panel 101 thus manufactured, a liquid crystal 106 is in a state of a random alignment in view of the whole polymer dispersion type liquid crystal layer 104.

A display action of a liquid crystal display panel 101 which is manufactured in the above-mentioned method is described below. FIG. 27 is a view for describing an action of a liquid crystal display panel 101, and FIG. 27(a) shows a state under no application of voltage and FIG. 27(b) shows a state under an application of voltage.

Under no application of voltage, as shown in FIG. 27(a), a liquid crystal molecule is aligned so as to be along an interface shape of a polymer and is in a state of a random alignment in view of the whole polymer dispersion type liquid crystal layer 104. Since a refractive index of a liquid crystal is different between a major axis direction and a minor axis direction of a molecule, a mismatch of the refractive index occurs between a liquid crystal and a liquid crystal in the case of a random alignment and thereby light is scattered. In the case of a difference in a refractive index between a liquid crystal and a polymer, a scattering occurs also on an interface between a liquid crystal and a polymer, and thereby a scattering state (turbid state) is obtained under no application of voltage. In Embodiment 2-1 wherein a weight ratio of a liquid crystal to a polymer dispersion type liquid crystal layer is determined at 60%, particularly, a scattering between a liquid crystal and a liquid crystal is extremely large, and a high scattering characteristic can be obtained. If the weight ratio is determined at above 60%, an even higher scattering characteristic can be obtained.

Under an application of voltage, as shown in FIG. 27(b), a liquid crystal molecule is aligned in an electric field direction because of a positive dielectric anisotropy of a liquid crystal. Since a liquid crystal is aligned uniformly, a refractive index is not different between a liquid crystal and a liquid crystal. An alignment direction of a liquid crystal and a polymer is the same; therefore, when a refractive index of a liquid crystal and a polymer is approximately equal, a refractive index is scarcely different between a liquid crystal and a polymer against a light in a direction vertical to a substrate and a diagonal light, and thereby a light is transmitted without being scattered. That is, a transparent state is obtained.

It is noticeable in a liquid crystal display panel 101 according to Embodiment 2-1 that a liquid crystal near an interface of a polymer also responds sufficiently to an electric field. That is, as shown in FIG. 28(b), a liquid crystal molecule 131 near an interface 130 of a polymer tends to be aligned in an electric field direction (a direction vertical to a substrate). The reason is that the polymer 5 is aligned and has an anisotropy in a vertical direction. Since a molecule of the polymer 105 is aligned in a vertical direction, the liquid crystal molecule 131 which contacts with the molecule of the polymer 105 has a characteristic of being easily aligned in a vertical direction.

In this respect, since a polymer 105 does not have an anisotropy in a conventional polymer dispersion type liquid crystal, the polymer 105 does not have a tendency to be aligned easily in a vertical direction like the present invention. Rather, the polymer 105 tends greatly to be fixed firmly along a surface shape, and it is considered that a liquid crystal molecule 131, which contacts with an interface 130 of a polymer, is adsorbed into the polymer 105 and fixed. Therefore, under a sufficient application of voltage, as shown in FIG. 28(*a*), since the liquid crystal molecule 131 keeps an alignment state depending on the interface 130 of a polymer, the liquid crystal molecule 131 does not respond to an electric field. Consequently, a scattering occurs near the interface 130 of a polymer and thereby a transparency is reduced.

Thus, in Embodiment 2-1, since a liquid crystal molecule near an interface of a polymer is aligned in an electric field direction as well as a scattering does not occur against a diagonal light, an improvement of a transparent characteristic in a transparent state can be intended as compared with a conventional polymer dispersion type liquid crystal display panel.

Thus, according to the present invention, a liquid crystal display panel 101, wherein a scattering state is obtained under no application of voltage and a transparent state is obtained under an application of voltage, can be actualized.

A high scattering characteristic in a scattering state and a high transparent characteristic in a transparent state are desirable for a liquid crystal display panel in a scattering mode in which a scattering state and a transparent state are switched like the present invention. A high scattering characteristic in a scattering state and a high transparent characteristic in a transparent state are obtained by the above-mentioned composition in a liquid crystal display panel 101 according to Embodiment 2-1. In addition, a deterioration of a display performance resulting from an optical hysteresis can be prevented. These points are described concretely while comparing with conventional examples (the first to third conventional examples).

(1) A Scattering Characteristic in a Scattering State

In the first conventional example (a conventional polymer dispersion type liquid crystal), a high scattering is easily obtained. The reason is that a liquid crystal in a scattering state is in a random alignment state and thereby a scattering occurs by a mismatch of the refractive index between a liquid crystal and a liquid crystal as well as a mismatch of the refractive index between a liquid crystal and a polymer. Meanwhile, in the second and third conventional examples, a scattering characteristic is low. The reason is that a mismatch of the refractive index between a liquid crystal and a polymer occurs in the second and third conventional examples; however, a mismatch of the refractive index between a liquid crystal and a liquid crystal does not occur since a liquid crystal is aligned in the same direction as a whole, and thereby a scattering intensity is low because of only the mismatch of the refractive index between a liquid crystal and a polymer.

As regards this respect, in Embodiment 2-1, since a liquid crystal in a scattering state is in a random alignment state, a high scattering is obtained for the same reason as the first conventional example.

(2) A High Transparent Characteristic in a Transparent State

In the first conventional example, a transparent characteristic is comparatively low. The reason is that a liquid crystal molecule near an interface between a liquid crystal and a polymer does not stand up as shown in FIG. 28(*a*) under an application of voltage.

Meanwhile, in a liquid crystal display panel according to Embodiment 2-1, as described above, a liquid crystal molecule near an interface of a polymer also responds comparatively easily to an electric field, and additionally, like the second and third conventional examples, an improvement of a transparent characteristic as to a diagonal light results in a high transparent characteristic in a transparent state as a whole.

(3) A Reduction of an Optical Hysteresis

In a liquid crystal display panel 101 according to Embodiment 2-1, such an effect is produced that an optical hysteresis in appearance is reduced. The effect is described concretely below. A case of applying the liquid crystal display panel 101 to a direct-vision type display is mentioned. In this case, a black plate or a reflector plate is disposed on the backside of the liquid crystal display panel 101. Under no application of voltage, a scattering state, 'white state', is obtained. Under an application of voltage, since the black plate on the backside is seen or a regular reflection is obtained, 'black state', is obtained. That is, the liquid crystal display panel 101 is a device in a normally white mode. Meanwhile, in the case of applying the third conventional example (IRIS type liquid crystal display panel) to the same direct-vision type display as the above, the third conventional example is a device in a normally white mode. An optical hysteresis is a phenomenon which results from a slight difference in an alignment state of a liquid crystal molecule between increasing and decreasing voltage even under an application of the same voltage. A degree of the above-mentioned difference in an alignment state of a liquid crystal molecule gets smaller in an area of a high voltage, and larger in an area of a low voltage because of accumulating. Therefore, both an optical hysteresis (refer to FIG. 29(*a*)) in the case of the third conventional example and an optical hysteresis (refer to FIG. 29(*b*)) in the case of the liquid crystal display panel 101 get smaller in an area of a high voltage, and larger in an area of a low voltage. However, in the case of the liquid crystal display panel 101, an optical hysteresis is large in a white display state, and in the case of the third conventional example, an optical hysteresis is large in a black display state.

It is understood that a tone resolution of human eyes is high in black and a recognition is low in white. Consequently, in the case of comparing the liquid crystal display panel 101 with the third conventional example, even if a maximum value of an optical hysteresis is the same, the optical hysteresis of the liquid crystal display panel 101 gets smaller in appearance than the third conventional example since the optical hysteresis is large in a white display state. As a result, a deterioration of a display performance resulting from an optical hysteresis can be prevented.

(4) Others

For reference, even in the case of using a liquid crystal monomer and a vertical alignment layer, when a liquid crystal with a negative dielectric anisotropy is used, a liquid crystal display panel in a reverse mode is obtained wherein an initial state is a transparent state and a scattering state is obtained under an application of voltage, contrary to a liquid crystal display panel 101. However, the above-mentioned liquid crystal display panel is a liquid crystal display panel wherein a liquid crystal does not depend on a surface shape of a polymer, and the liquid crystal and the polymer are aligned in the same direction. Accordingly, the above-mentioned liquid crystal display panel is included in a category of IRIS type liquid crystal display panel (the third conventional example) and, like IRIS type liquid crystal display panel (the third conventional example), a mismatch of the refractive index between a liquid crystal and a liquid crystal does not occur and thereby a high scattering characteristic can not be obtained.

Thus, according to the above-mentioned (1) to (4), in a liquid crystal display panel 101 according to Embodiment 2-1, it is possible to intend both an improvement of a scattering characteristic in a scattering state and an improvement of a transparent characteristic in a transparent state and, additionally, to prevent a deterioration of a display performance resulting from an optical hysteresis.

In the above-mentioned examples, although a structure of a polymer dispersion type liquid crystal layer is described as a polymer network structure, the structure of a polymer dispersion type liquid crystal layer is not particularly limited. The structure of a polymer dispersion type liquid crystal layer may be a type wherein a liquid crystal droplet is dispersed into a polymer, a type wherein a liquid crystal is dispersed in a network into a polymer or a type wherein a polymer is precipitated in a ball into a liquid crystal like the third conventional example. However, according to an experiment by the inventors of the present invention, the highest scattering intensity is obtained in a polymer dispersion type and the lowest scattering intensity is obtained in a polymer ball type.

Since a liquid crystal monomer is used as an initial material of a polymer, the polymer has a birefringence more or less. In the present invention, since the purpose is to determine an alignment of a liquid crystal on a surface of a polymer, it is not necessary that a birefringence of a liquid crystal monomer and a polymer is equalized to that of a liquid crystal material. However, if a ratio of a liquid crystal to a polymer is less than 1.5, the problem is that a transparency in a transparent state is reduced. Furthermore, when the ratio is lower, a scattering between a liquid crystal and a liquid crystal is not sufficiently obtained. Therefore, it is desirable that the ratio of a liquid crystal is above 60% in view of obtaining a sufficient scattering between a liquid crystal and a liquid crystal and a prevention of a reduction in a transparency in a transparent state as well as obtaining an initial alignment of the above-mentioned liquid crystal (an alignment of a liquid crystal along a surface shape of a polymer).

In the above-mentioned examples, although a vertical alignment layer is used in order to align a liquid crystal and a polymer vertically to a substrate, other means of aligning may be used. For instance, it is possible to cure a mixture with ultraviolet rays while leaving the mixture in a strong magnetic field. However, a method of using a vertical alignment layer is the easiest and the most effective. In this case, rubbing treatment is unnecessary. When any DC (direct current) component is applied to a panel, the panel has a characteristic of no application of the DC component to a polymer dispersion type liquid crystal layer since the DC component is applied to the film by using a film with a high insulation such as polyimide film. A liquid crystal display panel using an insulation film (refer to Japanese Unexamined Patent Publication No. 2-319026) has been proposed since before, and it is possible to actualize an improvement of characteristics without an addition of a particular process by utilizing the insulation film effectively.
(Embodiment 2-2)

Figure 30:
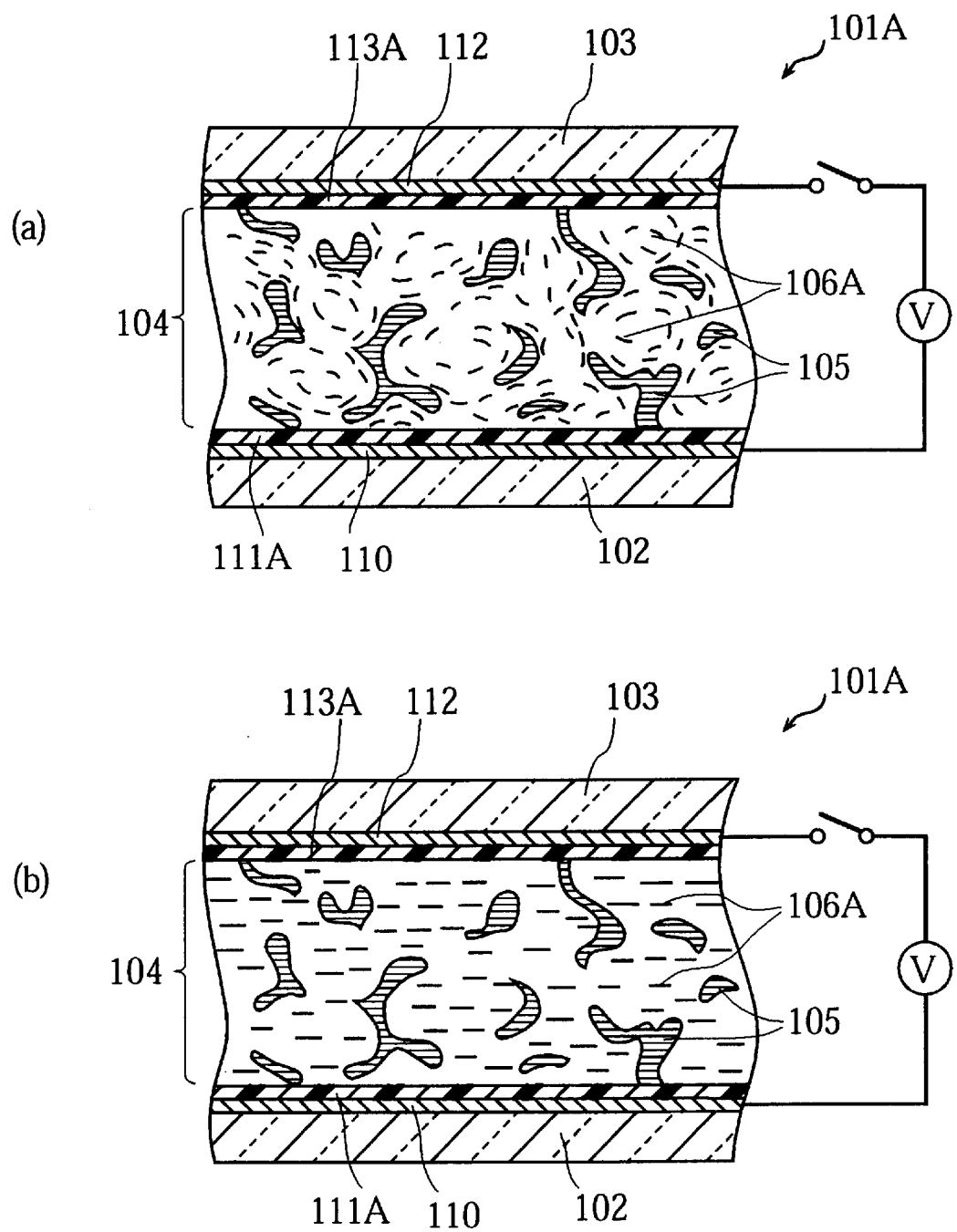
FIG. 30 is a schematic cross sectional view of a liquid crystal display panel 101A according to Embodiment 2-2.

FIG. 30 is a schematic cross sectional view of a liquid crystal display panel 101A according to Embodiment 2-2. A detailed description is omitted by giving the same reference number for a similar part to Embodiment 2-1. In Embodiment 2-2, alignment layers 111A, 113A on which a horizontal alignment treatment is executed by rubbing are substituted for alignment layers 111, 113 and a liquid crystal 106A with a negative dielectric anisotropy is substituted for a liquid crystal 106. A liquid crystal monomer is polymerized in an alignment state in a rubbing direction by using the alignment layers 111A, 113A and thereby a polymer 105 with a birefringence which is aligned in a rubbing direction is formed. Meanwhile, the liquid crystal 106A is aligned along an interface of a polymer like Embodiment 2-1. Accordingly, the liquid crystal 106A is in a state of a random alignment in view of the whole polymer dispersion type liquid crystal layer 104 like Embodiment 2-1. Therefore, under no application of voltage (in an initial state), a scattering between a liquid crystal and a liquid crystal as well as a scattering between a liquid crystal and a polymer is obtained, and thereby a scattering state is obtained (refer to FIG. 30(a)).

Under an application of voltage, since a dielectric anisotropy of the liquid crystal 106A is negative, the liquid crystal 106A attempts to be aligned in a direction vertical to an electric field (a direction parallel with the substrates 102, 103). Then, since the polymer 105 is aligned in a rubbing direction, this affects the liquid crystal 106A and a direction, in which the liquid crystal 106A is aligned, is the same as the rubbing direction. Consequently, the liquid crystal 106A and the polymer 105 are aligned in the same direction on a substrate plane (refer to FIG. 30(b)). As a result, a mismatch of a refractive index does not occur between the liquid crystal 106A and the polymer 105, and thereby a transparent state is obtained.

Thus, it is possible to actualize a liquid crystal display panel, wherein a scattering state is obtained under no application of voltage and a transparent state is obtained under an application of voltage. Also in Embodiment 2-2, a high scattering characteristic in a scattering state and a high transparent characteristic in a transparent state are obtained like Embodiment 2-1, and additionally, a deterioration of a display performance resulting from an optical hysteresis can be prevented.

In Embodiment 2, it is possible to choose materials for an alignment layer easily and align with a high uniformity by a composition using a horizontal alignment layer, as compared with Embodiment 2-1. The reason is that a horizontal alignment layer is general as an alignment layer and a limitation in a choice of materials for an alignment layer is caused by improving a uniformity of a vertical alignment.
(Embodiment 2-3)

Figure 31:
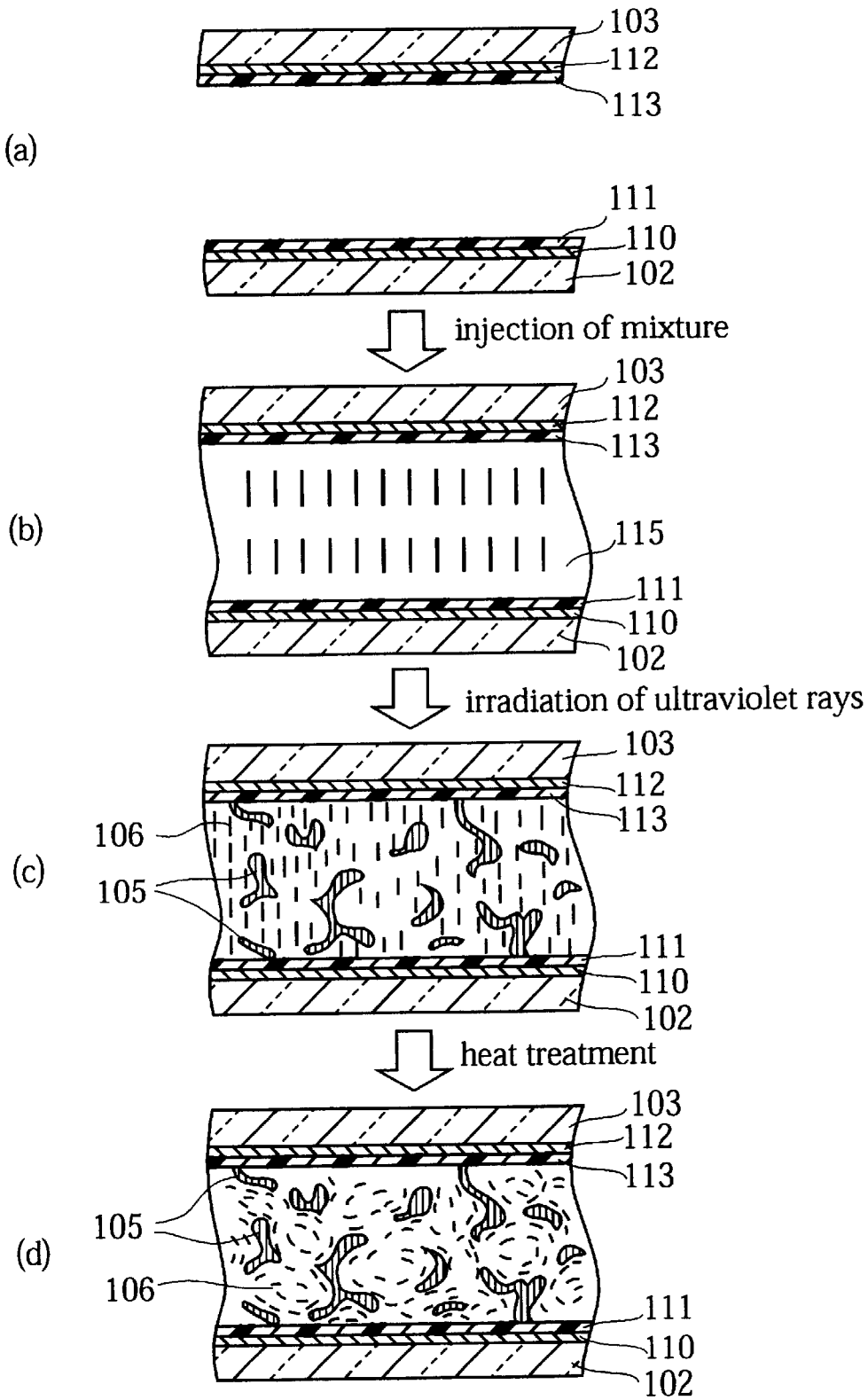
FIG. 31 is a view showing a manufacturing process (another manufacturing process of a liquid crystal display panel 101) of a liquid crystal display panel according to Embodiment 2-3.
Figure 33:
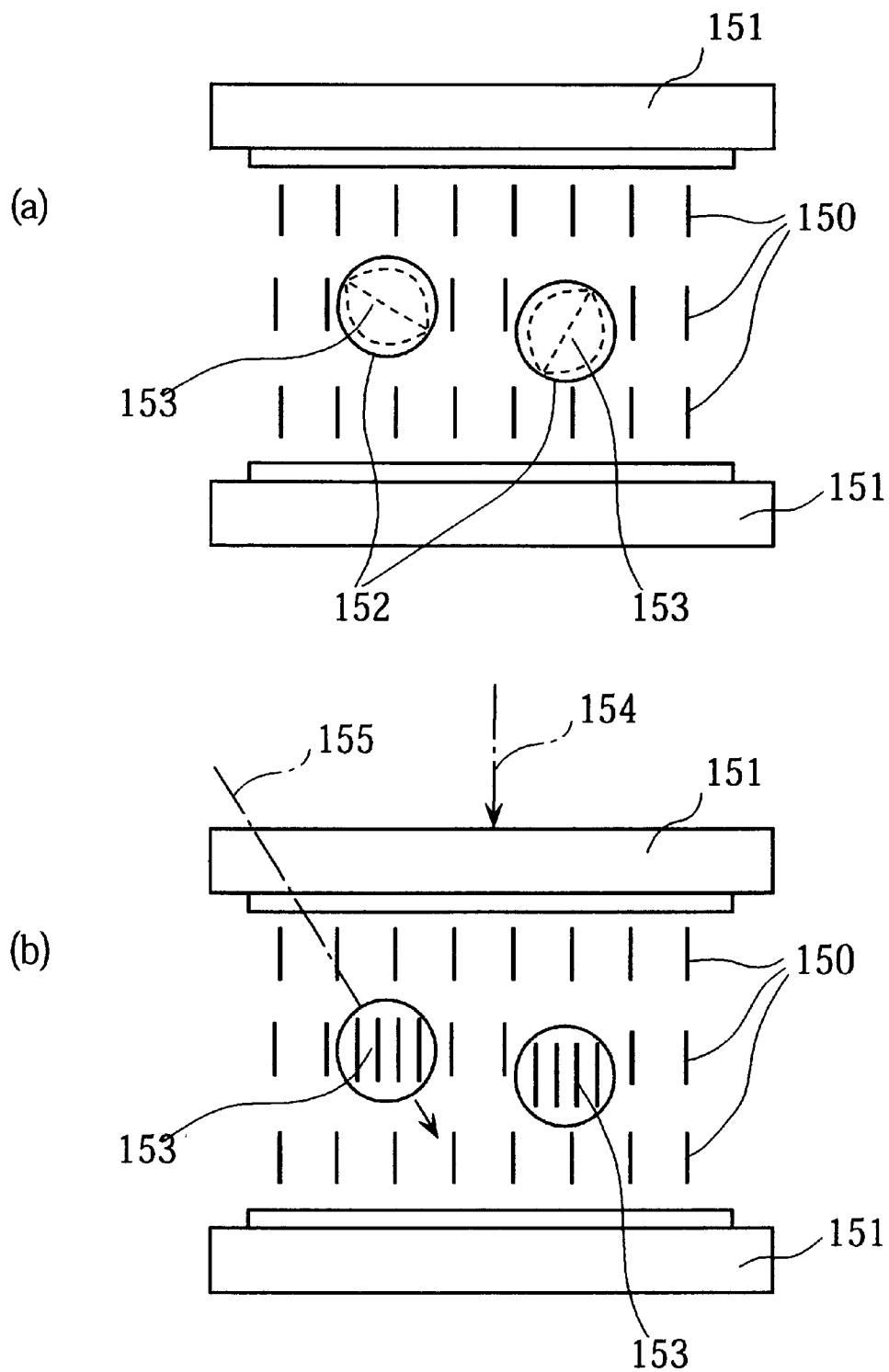
FIG. 33 is a view for describing a display action of the second conventional example.
Figure 34:
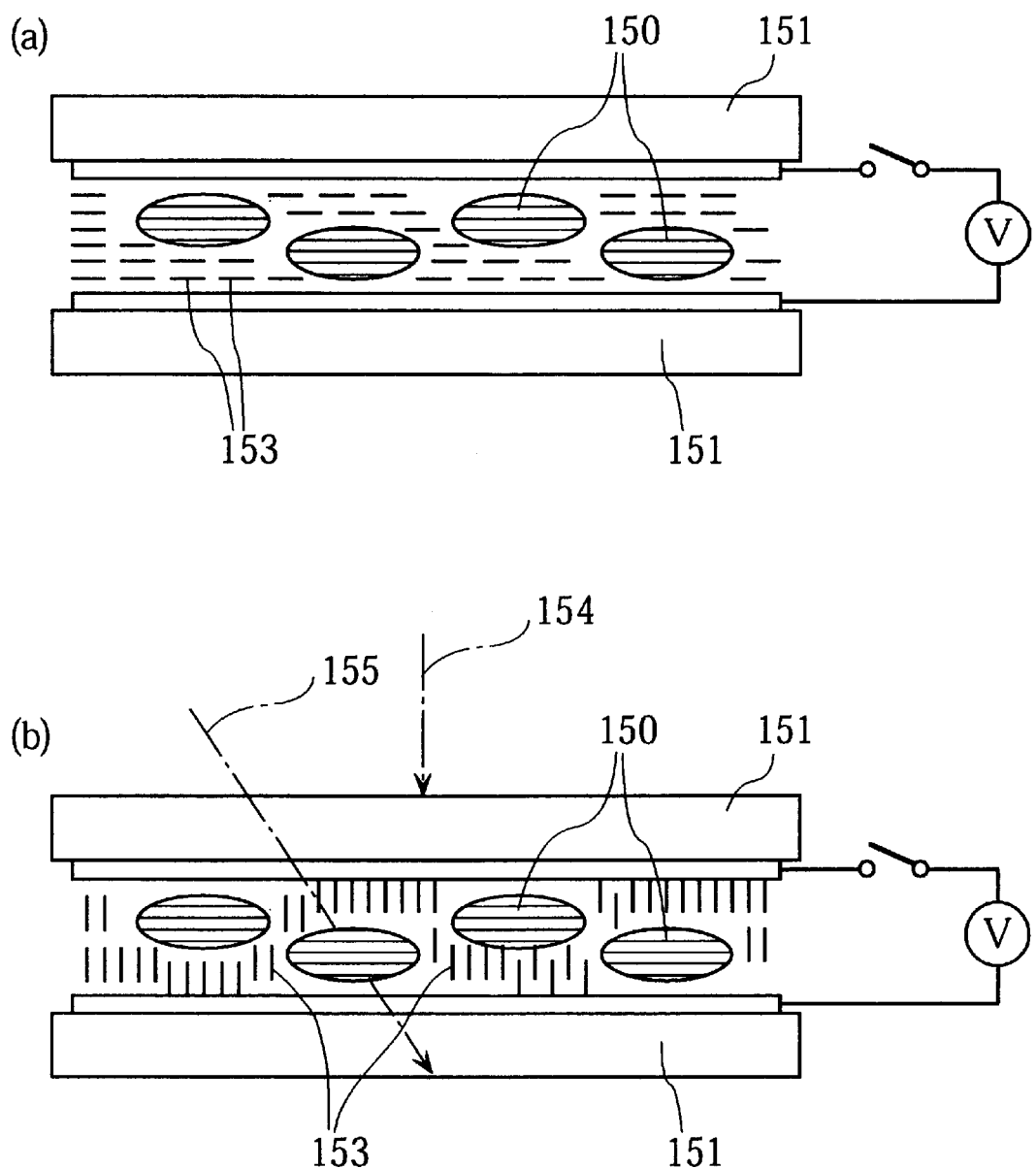
FIG. 34 is a view for describing a display action of the third conventional example.

FIG. 31 is a view showing a process in another method of manufacturing a liquid crystal display panel 101. The method is a method in which a thermal polymerization process (FIG. 31(d)) is added to a manufacturing process of Embodiment 2-1. It is possible to manufacture a liquid crystal display panel wherein an initial scattering state in Embodiment 2-1 is further improved by adding such a thermal polymerization process (FIG. 31(d)). A process shown in FIG. 31(a) to (c) is the same as a process shown in FIG. 26(a) to (c).

According to an experiment by the inventors of the present invention, when a content of a bi-functional monomer in the whole liquid crystalline monomer was low, approximately 55%, an irregular state occurred in an initial alignment. It was confirmed in this case that a change of an alignment occurred in a part of the above-mentioned liquid crystal by executing a heat treatment and the part of the liquid crystal tended to be aligned along a surface shape of a polymer (refer to FIG. 31(d)). Therefore, even if a content of a bi-functional monomer is low, an execution of a heat treatment makes it possible to obtain a liquid crystal display panel with the same scattering characteristic as a liquid crystal display panel which is manufactured in the case of an appropriate content of a bi-functional monomer.

According to an experiment by the inventors of the present invention, when a heat treatment of 90° C. was continued for 12 hours, an improvement of scattering intensity was confirmed. In some polymer materials, an effect of improving scattering intensity was obtained by a heat treatment of 80° C. for one hour.

(Embodiment 2-4)

FIG. 32 is a schematic cross sectional view of a liquid crystal display panel 101B according to Embodiment 2-4. FIG. 32(a) shows a state under no application of voltage and FIG. 32(b) shows a state under an application of voltage. In Embodiment 2-4, a detailed description is omitted by giving the same reference number for a similar part to Embodiment 2-1. A liquid crystal display panel 101B according to Embodiment 2-4 is a liquid crystal display panel in IPS (In-Plane Switching) mode wherein an electric field is applied in a direction parallel with a substrate. A pair of comb-shaped electrodes 120, 121 are formed only on a substrate 102 as a means of applying an electric field, and thereby voltage can be applied in a lateral direction. An alignment layer of a horizontal alignment is used as alignment layers 111B, 113B and rubbing treatment is executed so that rubbing direction is the same as an electric field direction. A liquid crystal with a positive dielectric anisotropy is used as a liquid crystal 106. The comb-shaped electrodes 120, 121 are coated with an insulation film 122. Other points are similar to Embodiment 2-1.

Since the alignment layers 111B, 113B are in a horizontal alignment and rubbing treatment is executed on them, a liquid crystal monomer is polymerized in an alignment state in a rubbing direction. Consequently, a polymer 105 having a refractive anisotropy in a rubbing direction is formed. Meanwhile, the liquid crystal 106 is aligned along an interface of the polymer. Therefore, under no application of voltage, the liquid crystal 106 is in a state of a random alignment in view of the whole polymer dispersion type liquid crystal layer 104, and thereby a scattering state is obtained (FIG. 32(a)).

Under an application of voltage, since a dielectric anisotropy of the liquid crystal 6 is positive, a liquid crystal molecule is aligned in an electric field direction (FIG. 32(b)). Then, since rubbing direction is the same as an electric field direction, a liquid crystal molecule is aligned in a rubbing direction. The polymer 105 also is aligned in a rubbing direction as described above. Consequently, since a matching of a refractive index between a liquid crystal and a liquid crystal as well as between a liquid crystal and a polymer is obtained, light is transmitted.

Thus, it is possible to actualize a liquid crystal display panel, wherein a scattering state is obtained under no application of voltage and a transparent state is obtained under an application of voltage.

In Embodiment 2-2, there is a problem in uniformity in a direction of a liquid crystal under an application of voltage. Since an alignment direction of a liquid crystal is the same as an electric field direction by a composition in which a lateral electric field is applied like Embodiment 2-4, it is possible to actualize a liquid crystal display panel with a high uniformity and a high transparency.

Generally, the problem is that a liquid crystal display panel in IPS mode has a low aperture ratio and a transmission type has an insufficient brightness. However, since both an electrode and a reflector plate are used in a reflection type device, an aperture ratio matters little. In terms of this point, a liquid crystal display panel of Embodiment 2-4 is feasible, particularly, for a reflection type panel.

INDUSTRIAL APPLICABILITY

According to a composition of the present invention as described above, it is possible to solve each problem of the present invention satisfactorily. The concrete solutions are as follows:

(1) A driving electrode is formed on only one of substrates and a polymer dispersion type liquid crystal panel in a reverse mode is driven with a lateral electric field mode, whereby a higher contrast can be actualized without increasing a driving voltage.

(2) In a polymer dispersion type liquid crystal panel in a reverse mode which is driven with a lateral electric field mode, an effect of improving a luminance and a contrast is obtained by making a cross sectional form of an electrode a triangular form or a trapezoidal form, and additionally, covering only a lower area of an electrode with a flattened layer.

(3) Both an improvement of a transparent characteristic in a transparent state and an improvement of a scattering characteristic in a scattering state can be intended.

(4) In the third conventional example (IRIS type liquid crystal display panel), since a polymer and a liquid crystal are aligned in the same direction on a substrate plane in a transparent state, a tint of an image differs by a difference in a visual direction, in other words, a coloration occurs. As regards this point, in the present invention, since a polymer and a liquid crystal are aligned in a direction vertical to a substrate in a transparent state, a tint of an image has no dependence on a visual direction and the above-mentioned coloration never occurs.

(5) An improvement of a display performance can be intended by reducing an optical hysteresis in appearance.

What is claimed is:

1. A polymer dispersion type liquid crystal display panel comprising:

a pair of substrates at least one of which is transparent;

a polymer dispersion type liquid crystal layer composed of a polymer and a liquid crystal, which is held between said pair of substrates; and a first driving electrode and a second driving electrode which are provided at each pixel for applying an electric field to said polymer dispersion type liquid crystal layer and driving the polymer dispersion type liquid crystal layer as a light valve;

wherein:

said polymer dispersion type liquid crystal layer is a polymer dispersion type liquid crystal layer with a high ratio of the liquid crystal to the polymer having a structure in which the liquid crystal is filled between the substrates and the polymer is dispersed into the filled liquid crystal so that the polymer and the liquid crystal can be aligned according to an alignment treatment of the substrates;

said first driving electrode and said second driving electrode are formed on one of said pair of substrates in a disposition state of applying an electric field approximately in parallel with said substrates; and under no application of voltage, said liquid crystal and the polymer, which is adjacent to the liquid crystal and composes an interface, are aligned in an approximately same direction on a plane parallel with the substrates according to an alignment treatment of the substrates as well as under an application of voltage, the liquid crystal rotates on a plane parallel with the substrates and the polymer and the liquid crystal are in a disposition state of making an angle on a plane parallel with the substrates.

2. A polymer dispersion type liquid crystal display panel according to claim 1, wherein:

said polymer comprises a liquid crystalline polymer.

3. A polymer dispersion type liquid crystal display panel according to claim 1, wherein:

d>L is satisfied when a gap in a direction of an electric field between said first driving electrode and said second driving electrode is made L and a panel gap is made d.

4. A polymer dispersion type liquid crystal display panel according to claim 2, wherein:

d>L is satisfied when a gap in a direction of an electric field between said first driving electrode and said second driving electrode is made L and a panel gap is made d.

5. A polymer dispersion type liquid crystal display panel according to claim 1, wherein:

said first driving electrode and said second driving electrode are transparent electrodes.

6. A polymer dispersion type liquid crystal display panel according to claim 3, wherein:

said first driving electrode and said second driving electrode are transparent electrodes.

7. A polymer dispersion type liquid crystal display panel according to claim 4, wherein:

said first driving electrode and said second driving electrode are transparent electrodes.

8. A polymer dispersion type liquid crystal display panel according to claim 5, wherein:

a width of said first driving electrode and said second driving electrode is 6 $\mu$m or less.

9. A polymer dispersion type liquid crystal display panel according to claim 6, wherein:

a width of said first driving electrode and said second driving electrode is 6 $\mu$m or less.

10. A polymer dispersion type liquid crystal display panel according to claim 7, wherein:

a width of said first driving electrode and said second driving electrode is 6 $\mu$m or less.

11. A polymer dispersion type liquid crystal display panel according to claim 1, wherein:

an alignment of the liquid crystal in the polymer dispersion type liquid crystal layer is a homogeneous alignment under no application of voltage, in which a major axis of a liquid crystal molecule is approximately parallel with the substrates and the major axis is not twisted.

12. A polymer dispersion type liquid crystal display panel according to claim 2, wherein:

an alignment of the liquid crystal in the polymer dispersion type liquid crystal layer is a homogeneous alignment under no application of voltage, in which a major axis of a liquid crystal molecule is approximately parallel with the substrates and the major axis is not twisted.

13. A polymer dispersion type liquid crystal display panel according to claim 1, wherein:

an alignment of the liquid crystal in the polymer dispersion type liquid crystal layer is a twisted nematic alignment under no application of voltage, in which a major axis of a liquid crystal molecule is twisted successively between the substrates.

14. A polymer dispersion type liquid crystal display panel according to claim 2, wherein:

an alignment of the liquid crystal in the polymer dispersion type liquid crystal layer is a twisted nematic alignment under no application of voltage, in which a major axis of a liquid crystal molecule is twisted successively between the substrates.

15. A polymer dispersion type liquid crystal display panel according to claim 13, wherein:

a twist angle in said twisted nematic alignment is 180 degrees or more.

16. A polymer dispersion type liquid crystal display panel according to claim 14, wherein:

a twist angle in said twisted nematic alignment is 180 degrees or more.

17. A polymer dispersion type liquid crystal display panel according to claim 11, wherein:

a dielectric anisotropy of said liquid crystal is positive; and an angle $\theta$, which is formed by an alignment treatment direction of said substrates and the second driving electrode, is 45 degrees or less.

18. A polymer dispersion type liquid crystal display panel according to claim 12, wherein:

a dielectric anisotropy of said liquid crystal is positive; and an angle $\theta$, which is formed by an alignment treatment direction of said substrates and the second driving electrode, is 45 degrees or less.

19. A polymer dispersion type liquid crystal display panel according to claim 11, wherein:

a dielectric anisotropy of said liquid crystal is negative; and an angle $\theta$, which is formed by an alignment treatment direction of said substrates and the second driving electrode, is 45 degrees or more and below 90 degrees.

20. A polymer dispersion type liquid crystal display panel according to claim 12, wherein:

a dielectric anisotropy of said liquid crystal is negative; and an angle $\theta$, which is formed by an alignment treatment direction of said substrates and the second driving electrode, is 45 degrees or more and below 90 degrees.

21. A polymer dispersion type liquid crystal display panel according to claim 1, wherein:

said first driving electrode and said second driving electrode are a comb-shaped electrode opposite to each other.

22. A polymer dispersion type liquid crystal display panel according to claim 2, wherein:

said first driving electrode and said second driving electrode are a comb-shaped electrode opposite to each other.

23. A polymer dispersion type liquid crystal display panel according to claim 21, wherein:

said comb-shaped electrode has a shape in which a part of the electrode is bent.

24. A polymer dispersion type liquid crystal display panel according to claim 22, wherein:
said comb-shaped electrode has a shape in which a part of the electrode is bent.

25. A polymer dispersion type liquid crystal display panel according to claim 21, wherein:
said comb-shaped electrode has a shape in which a corner of an electrode is roundish.

26. A polymer dispersion type liquid crystal display panel according to claim 22, wherein:
said comb-shaped electrode has a shape in which a corner of an electrode is roundish.

27. A polymer dispersion type liquid crystal display panel comprising:
a pair of substrates which are transparent;
a polymer dispersion type liquid crystal layer composed of a polymer and a liquid crystal, which is held between said pair of substrates; and
a first driving electrode and a second driving electrode which are provided at each pixel for applying an electric field to said polymer dispersion type liquid crystal layer and driving the polymer dispersion type liquid crystal layer as a light valve;
wherein:
said polymer dispersion type liquid crystal layer is a polymer dispersion type liquid crystal layer with a high ratio of the liquid crystal to the polymer having a structure in which the liquid crystal is filled between the substrates and the polymer is dispersed into the filled liquid crystal so that the polymer and the liquid crystal can be aligned according to an alignment treatment of the substrates;
said first driving electrode and said second driving electrode are formed on one of said pair of substrates in a disposition state of applying an electric field approximately in parallel with said substrates and further have a shape in which at least a part of an incident light into the driving electrode can be reflected in a pixel aperture; and
under no application of voltage, said liquid crystal and the polymer, which is adjacent to the liquid crystal and composes an interface, are aligned in an approximately same direction on a plane parallel with the substrates according to an alignment treatment of the substrates as well as under an application of voltage, the liquid crystal rotates on a plane parallel with the substrates and the polymer and the liquid crystal are in a disposition state of making an angle on a plane parallel with the substrates.

28. A polymer dispersion type liquid crystal display panel according to claim 27, wherein:
said polymer comprises a liquid crystalline polymer.

29. A polymer dispersion type liquid crystal display panel according to claim 27, wherein:
a cross sectional form of said first driving electrode and said second driving electrode is a triangular form so that at least a part of an incident light can be reflected in a pixel aperture.

30. A polymer dispersion type liquid crystal display panel according to claim 28, wherein:
a cross sectional form of said first driving electrode and said second driving electrode is a triangular form so that at least a part of an incident light can be reflected in a pixel aperture.

31. A polymer dispersion type liquid crystal display panel according to claim 27, wherein:
a cross sectional form of said first driving electrode and said second driving electrode is a trapezoidal form so that at least a part of an incident light can be reflected in a pixel aperture.

32. A polymer dispersion type liquid crystal display panel according to claim 28, wherein:
a cross sectional form of said first driving electrode and said second driving electrode is a trapezoidal form so that at least a part of an incident light can be reflected in a pixel aperture.

33. A polymer dispersion type liquid crystal display panel according to claim 29, wherein:
a flattened layer is formed on a substrate with said first driving electrode and said second driving electrode;
a lower area of each driving electrode is covered with said flattened layer; and
an upper area of each driving electrode projects into said polymer dispersion type liquid crystal layer.

34. A polymer dispersion type liquid crystal display panel according to claim 30, wherein:
a flattened layer is formed on a substrate with said first driving electrode and said second driving electrode;
a lower area of each driving electrode is covered with said flattened layer; and
an upper area of each driving electrode projects into said polymer dispersion type liquid crystal layer.

35. A polymer dispersion type liquid crystal display panel according to claim 31, wherein:
a flattened layer is formed on a substrate with said first driving electrode and said second driving electrode;
a lower area of each driving electrode is covered with said flattened layer; and
an upper area of each driving electrode projects into said polymer dispersion type liquid crystal layer.

36. A polymer dispersion type liquid crystal display panel according to claim 32, wherein:
a flattened layer is formed on a substrate with said first driving electrode and said second driving electrode;
a lower area of each driving electrode is covered with said flattened layer; and
an upper area of each driving electrode projects into said polymer dispersion type liquid crystal layer.

37. A polymer dispersion type liquid crystal display panel according to claim 27, wherein:
d>L is satisfied when a gap in a direction of an electric field between said first driving electrode and said second driving electrode is made L and a panel gap is made d.

38. A polymer dispersion type liquid crystal display panel according to claim 28, wherein:
d>L is satisfied when a gap in a direction of an electric field between said first driving electrode and said second driving electrode is made L and a panel gap is made d.

39. A polymer dispersion type liquid crystal display panel comprising:
a pair of substrates;
a polymer dispersion type liquid crystal layer composed of a polymer and a liquid crystal, which is held between said pair of substrates; and
a first driving electrode and a second driving electrode which are provided at each pixel for applying an electric field to said polymer dispersion type liquid crystal layer and driving the polymer dispersion type liquid crystal layer as a light valve;

wherein:
one of said pair of substrates is a transparent substrate and the other substrate forms a saw-toothed reflection layer inside the substrate;

said polymer dispersion type liquid crystal layer is a polymer dispersion type liquid crystal layer with a high ratio of the liquid crystal to the polymer having a structure in which the liquid crystal is filled between the substrates and the polymer is dispersed into the filled liquid crystal so that the polymer and the liquid crystal can be aligned according to an alignment treatment of the substrates;

said first driving electrode and said second driving electrode are formed on one of said pair of substrates in a disposition state of applying an electric field approximately in parallel with said substrates and further have a shape in which at least a part of an incident light into the driving electrode can be reflected at a different angle from a regular reflection direction when a light enters a plane parallel with the substrates; and under no application of voltage, said liquid crystal and the polymer, which is adjacent to the liquid crystal and composes an interface, are aligned in an approximately same direction on a plane parallel with the substrates according to an alignment treatment of the substrates as well as under an application of voltage, the liquid crystal rotates on a plane parallel with the substrates and the polymer and the liquid crystal are in a disposition state of making an angle on a plane parallel with the substrates.

40. A polymer dispersion type liquid crystal display panel according to claim 39, wherein:
said polymer comprises a liquid crystalline polymer.

41. A polymer dispersion type liquid crystal display panel according to claim 39, wherein:
a cross sectional form of said driving electrodes is a triangular form.

42. A polymer dispersion type liquid crystal display panel according to claim 40, wherein:
a cross sectional form of said driving electrodes is a triangular form.

43. A polymer dispersion type liquid crystal display panel according to claim 41, wherein:
a flattened layer is formed on a substrate with said first driving electrode and said second driving electrode;
a lower area of each driving electrode is covered with said flattened layer; and
an upper area of each driving electrode projects into said polymer dispersion type liquid crystal layer.

44. A polymer dispersion type liquid crystal display panel according to claim 42, wherein:
a flattened layer is formed on a substrate with said first driving electrode and said second driving electrode;
a lower area of each driving electrode is covered with said flattened layer; and
an upper area of each driving electrode projects into said polymer dispersion type liquid crystal layer.

45. A polymer dispersion type liquid crystal display panel according to claim 39, wherein:
d>L is satisfied when a gap in a direction of an electric field between said first driving electrode and said second driving electrode is made L and a panel gap is made d.

46. A polymer dispersion type liquid crystal display panel according to claim 40, wherein:
d>L is satisfied when a gap in a direction of an electric field between said first driving electrode and said second driving electrode is made L and a panel gap is made d.

* * * * *

UNITED STATES PATENT AND TRADEMARK OFFICE
CERTIFICATE OF CORRECTION

PATENT NO.  : 6,429,914 B1
DATED       : August 6, 2002
INVENTOR(S) : Hirofumi Kubota, Tsuyoshi Uemura, Kenji Nakao and Seiji Nishiyama It is certified that error appears in the above-identified patent and that said Letters Patent is hereby corrected as shown below:

Column 57,
Line 7, change "comer" to -- corner --.

Signed and Sealed this

Eighteenth Day of February, 2003

JAMES E. ROGAN
*Director of the United States Patent and Trademark Office*